United States Patent
Miyazaki et al.

(10) Patent No.: US 9,050,949 B2
(45) Date of Patent: Jun. 9, 2015

(54) BRAKING APPARATUS

(75) Inventors: Tetsuya Miyazaki, Toyota (JP);
Takayuki Yamamoto, Toyota (JP);
Koichi Kokubo, Kariya (JP); Yoshio Masuda, Kariya (JP)

(73) Assignees: TOYOTA JIDOSHA KABUSHIKI KAISHA, Toyota-shi (JP); ADVICS CO., LTD., Kariya-shi (JP)

( * ) Notice: Subject to any disclaimer, the term of this patent is extended or adjusted under 35 U.S.C. 154(b) by 963 days.

(21) Appl. No.: 13/139,670

(22) PCT Filed: Nov. 20, 2009

(86) PCT No.: PCT/JP2009/006289
§ 371 (c)(1),
(2), (4) Date: Jun. 14, 2011

(87) PCT Pub. No.: WO2011/061808
PCT Pub. Date: May 26, 2011

(65) Prior Publication Data
US 2011/0241417 A1   Oct. 6, 2011

(51) Int. Cl.
*B60T 8/88* (2006.01)
*B60T 7/04* (2006.01)
*B60T 8/40* (2006.01)
*B60T 8/42* (2006.01)
(Continued)

(52) U.S. Cl.
CPC ............... *B60T 7/042* (2013.01); *B60T 8/404* (2013.01); *B60T 8/4081* (2013.01); *B60T 8/4275* (2013.01); *B60T 8/4872* (2013.01); *B60T 8/885* (2013.01); *B60T 8/94* (2013.01); *B60T 13/166* (2013.01);
(Continued)

(58) Field of Classification Search
USPC .............. 303/3, 15, 20, 122, 122.04, 11
See application file for complete search history.

(56) References Cited

U.S. PATENT DOCUMENTS

2007/0267915 A1   11/2007   Shimada et al.
2009/0039702 A1   2/2009    Nishino et al.

FOREIGN PATENT DOCUMENTS

JP   2000 261982   9/2000
JP   2001 138882   5/2001
(Continued)

OTHER PUBLICATIONS

International Search Report issued Dec. 22, 2009 in PCT/JP09/06289 filed Nov. 20, 2009.

*Primary Examiner* — Robert A Siconolfi
*Assistant Examiner* — Vu Q Nguyen
(74) *Attorney, Agent, or Firm* — Oblon, McClelland, Maier & Neustadt, L.L.P.

(57) ABSTRACT

A braking apparatus according to an embodiment includes: a fluid pressure circuit that is provided between a master cylinder and a wheel cylinder, and that includes both a first system flow channel connecting a reservoir and at least one of the plurality of wheel cylinders, and a second system flow channel connecting at least one of the plurality of wheel cylinders and the master cylinder, and that forms a flow channel for supplying operating fluid to each of the wheel cylinders; and a pump provided in the first system flow channel and driven by the motor to increase the fluid pressure of the operating fluid to be supplied from the reservoir to the wheel cylinders. A control unit controls the driving state of the pump in order to drive, when a predetermined fail standard for braking control has been satisfied, the motor in accordance with the information detected by an operating state detection means, and executes fail-safe control for providing braking force by supplying the operating fluid discharged from the pump to the fluid pressure chamber in the master cylinder.

23 Claims, 27 Drawing Sheets

(51) Int. Cl.
*B60T 8/48* (2006.01)
*B60T 8/94* (2006.01)
*B60T 13/16* (2006.01)
*B60T 13/68* (2006.01)

(52) U.S. Cl.
CPC ......... *B60T 13/686* (2013.01); *B60T 2270/413* (2013.01)

(56) References Cited

FOREIGN PATENT DOCUMENTS

| | | |
|---|---|---|
| JP | 2003 212105 | 7/2003 |
| JP | 2008 174221 | 7/2008 |
| JP | 2008 239114 | 10/2008 |
| JP | 2009 040290 | 2/2009 |
| JP | 2009 262836 | 11/2009 |

BRAKING APPARATUS

TECHNICAL FIELD

The present invention relates to braking control for controlling the braking force provided to a wheel of a vehicle.

BACKGROUND TECHNOLOGY

Conventionally, a braking apparatus has been known in which braking force is provided by generating, in a fluid pressure circuit, the fluid pressure in accordance with the operation amount of a brake pedal and by supplying the fluid pressure to the wheel cylinder in each of the wheels (see, for example, Patent Document 1). Various electromagnetic valves, such as pressure-increasing valve to be opened when fluid pressure is supplied, pressure-reducing valve to be opened when fluid pressure is released, and switch valve to be opened/closed when the supply channel of fluid pressure is switched, etc., are provided between a fluid pressure source and each of the wheel cylinders. The braking apparatus adjusts the supply/discharge amount of brake fluid to/from the wheel cylinder by controlling the opening/closing of these electromagnetic valves, and provides suitable braking force to each of the wheels by controlling the fluid pressure. Each actuator in the braking apparatus, such as these electromagnetic valves, is drive-controlled by an electronic control unit (hereinafter, referred to as an "ECU"), which is mounted in a vehicle, outputting a control command to the drive circuit of each actuator.

Such a braking apparatus executes so-called brake-by-wire braking control in which each actuator is driven by electronic control so as to obtain the demanded braking force that is calculated based on the operation amount of the brake pedal, not by directly transmitting the fluid pressure as it is to the wheel cylinder, the fluid pressure being generated by an operation of the brake pedal. Accordingly, it is needed that the ECU always functions normally, and even if the CPU, etc., breaks down, high fail-safety is demanded.

As a means for securing such fail-safety, a technique is known in which, for example, two ECU systems are provided such that, if one of the two ECU systems is breaks down, the other normal ECU system continuously executes the braking control (see, for example, Patent Document 2). In this technique, while a motor control apparatus for providing braking force to a wheel is provided for each of the wheels, a central control apparatus intensively controls a plurality of the motor control apparatuses. During a normal state, the central control apparatus calculates target braking force based on the inputs of the various sensors, and outputs a control command to each of the motor control apparatuses. Because each of the motor control apparatuses also receives the inputs of the various sensors, each of the motor control apparatuses drives the motor based on the inputs of the sensors if the central control apparatus brakes down. As a result, the minimum necessary amount of braking force can be secured.

Patent Documents

[Patent Document 1] Japanese Patent Application Publication No. 2008-174221

[Patent Document 2] Japanese Patent Application Publication No. 2001-138882

DISCLOSURE OF THE INVENTION

Problem to be Solved by the Invention

However, when the ECU is divided into multiple systems as stated above, a plurality of CPUs, in accordance with the multiple systems, are needed, and each of the CPUs needs inputs of various sensors. Also, because each of the sensors generally needs an operating voltage, a power source for it must be secured. Accordingly, the electrical configuration becomes complicated, which causes the problem that the cost is increased due to multiplexing of the power supply sources. It is also demanded that, if CPUs, etc., break down, the braking control by them is not completely abandoned, but the residual performance of the control is secured to some extent.

Therefore, a purpose of the present invention is to achieve fail-safe control surely and at low cost, even if part of the control unit in a braking apparatus breaks down.

Means for Solving the Problem

A braking apparatus according to an embodiment of the present invention, which generates braking force by driving a motor, comprises: a reservoir for retaining operating fluid; a wheel cylinder provided in each of a plurality of wheels; a brake pedal operated by a driver; an operating state detection means configured to detect an operating state of the brake pedal; a master cylinder including both a fluid pressure chamber into/from which the operating fluid can be introduced or discharged, and a piston configured to slide in the direction where the pressure of the operating fluid in the fluid pressure chamber is increased/reduced in accordance with a stepping-on operation of the brake pedal; a fluid pressure circuit that is provided between the master cylinder and the wheel cylinder, and that includes both a first system flow channel connecting the reservoir and at least one of the plurality of wheel cylinders and a second system flow channel connecting at least one of the plurality of wheel cylinders and the master cylinder, and that forms a flow channel for supplying the operating fluid to each of the wheel cylinders; a pump provided in the first system flow channel and driven by the motor to increase the fluid pressure of the operating fluid to be supplied from the reservoir to the wheel cylinders; and a control unit configured to control the driving state of the pump in order to drive, when a predetermined fail standard for braking control has been satisfied, the motor in accordance with the information detected by the operating state detection means, and configured to execute fail-safe control for providing braking force by supplying the operating fluid discharged from the pump to the fluid pressure chamber in the master cylinder.

Herein, the "fail standard" may be one in which a condition, under which it is unable or difficult for the control unit to deal with the information detected by the operating state detection means, is preset. For example, the "fail standard" may be a failure in a calculation unit (such as CPU, etc.) executing arithmetic processing by acquiring the information detected by the operating state detection means, or a condition that is set in order for the operating state detection means to specify a fail state or a possible-fail state. Part of the control unit may be a drive circuit for receiving a command signal from the calculation unit, and the drive circuit may execute the fail-safe control. When a signal indicating that the brake pedal has been operated is inputted into the drive circuit from the operating state detection means in spite of the signal input from the calculation unit to the drive circuit being interrupted, it may be made that the drive circuit drives the motor, assuming that the fail standard has been satisfied. According to this embodiment, while a fluid pressure power source capable of supplying the fluid pressure whose pressure is increased by the drive of the pump is achieved in the first system flow channel, a fluid pressure manual source capable of supplying the fluid pressure whose pressure is increased in the master cylinder in accordance with a stepping-on operation of the brake pedal is achieved in the second system flow channel. When the pump has been driven by the fail standard being satisfied, the operating fluid is supplied from the pump to the master cylinder, so that the pressure in the master cylinder is increased in addition to the pressure generated by an operation of the brake pedal. As a result, the operating fluid whose pressure is sufficiently increased in the master cylinder is supplied to the wheel cylinder connected with the second system flow channel, thereby braking force through the wheel cylinder can be secured. As a result, the vehicle can be stably stopped even in a fail state. Further, with the drive of the pump, sufficient fluid pressure with good response can be supplied to the wheel cylinder when the brake pedal is stepped on. Alternatively, the braking apparatus may further comprise an opening/closing valve provided in a connection flow channel connecting the pump and the master cylinder. It may be made that the control unit cuts off the supply of the operating fluid from the pump to the fluid pressure chamber in the master cylinder by closing the opening/closing valve during a normal control operation, and permits the supply of the operating fluid discharged from the pump to the fluid pressure chamber in the master cylinder by opening the opening/closing valve when the fail standard has been satisfied. Herein, the "connection flow channel" may be what forms at least part of the second system flow channel, or what connects the first system flow channel and the second system flow channel. The "opening/closing valve" may be a normally-open electromagnetic valve that can be opened when power supply is cut off.

According to the embodiment, because the opening/closing valve holds a closed state during a normal control operation, the supply of the operating fluid from the pump to the master cylinder through the connection flow channel is regulated, and accordingly the supply of the operating fluid to each of the wheel cylinders, with the use of a fluid pressure power source, is secured, and thereby the braking force enough for a normal control operation can be secured. On the other hand, when the pump is driven by the fail standard being satisfied, the supply of the operating fluid from the pump to the master cylinder through the connection flow channel is permitted, and accordingly the pressure in the master cylinder is increased in addition to the pressure generated by an operation of the brake pedal.

The master cylinder may include: a housing in which a first fluid pressure chamber and a second fluid pressure chamber are formed within it as the fluid pressure chamber; a first piston that is slidably provided in the housing and that receives operating force of the brake pedal at one end thereof; and a second piston that is slidably provided in the housing and that forms the first fluid pressure chamber between one end thereof and the first piston and forms the second fluid pressure chamber between the other end thereof and the housing. And, it may be made that, when the drive of the motor is initiated by the fail standard being satisfied, the operating fluid discharged from the pump is supplied to one of the first fluid pressure chamber and the second fluid pressure chamber, or to both of them.

According to the embodiment, in the fail-safe control, the pressure in the wheel cylinder that leads to the fluid pressure chamber located on the side different from the side where the operating fluid discharged from the pump is supplied, is increased such that braking force can be generated. In addition, the first fluid pressure chamber and the second fluid pressure chamber may be configured such that the pressure of each of them is alternately increased. Alternatively, it may be made that the operating fluid discharged from the pump is supplied to one of the first fluid pressure chamber and the second fluid pressure chamber, and thereby the operating fluid whose pressure has been increased in the other fluid pressure chamber is supplied to the wheel cylinder.

When the volume of the operating fluid in the fluid pressure chamber is greater than or equal to a predetermined volume due to the introduction of the operating fluid discharged from the pump, the master cylinder may be configured such that the piston slides in the direction where the stepping-on amount of the brake pedal is reduced, and thereby the fluid pressure chamber is capable of communicating with the reservoir.

According to the embodiment, the fluid pressure in the master cylinder (also referred to as the "master cylinder pressure") can be discharged toward the reservoir by a driver relaxing the stepping-on of the brake pedal, and thereby the fluid pressure can be reduced. That is, even in a fail state, braking force can be controlled by adjusting a stepping-on amount of the brake pedal, and thereby the braking control in accordance with the feeling of the driver can be achieved.

The braking apparatus may comprise, as an operating state detection means: an operation amount sensor configured to detect an operation amount of the brake pedal; and an operation detection switch that is turned on when an operation amount of the brake pedal exceeds a preset reference value such that a signal indicating that the brake pedal has been operated is outputted. And, it may be made that the control unit controls braking force based on the information detected by the operation amount sensor during a normal control operation, and drives the motor in accordance with the state of the operation detection switch to provide braking force when the fail standard has been satisfied.

Herein, the "operation amount sensor" may be what needs a power source for the operation thereof. The "operation detection switch" may be what can be operated without a power source. The "reference value" may be a value in which looseness in a brake operation, etc., is taken into consideration. For example, when a brake operational member is displaced due to the vibrations occurring while a vehicle is being driven, the reference value may be one by which such a noise is cut. That is, the operation detection switch outputs a signal indicating that the brake has been operated when a brake operational member has been operated by a predetermined amount. The "fail standard" may be one in which a condition, under which it is unable or difficult for the control unit to deal with the information detected by the operation amount sensor, is preset. For example, the "fail standard" may be a failure in a calculation unit (such as CPU, etc.) executing arithmetic processing by acquiring the signal of the operation amount sensor, a failure in a power source supplying an operating voltage to the operation amount sensor, or a condition that is set for specifying a fail state or a possible-fail state, such as a decrease in the operating voltage, etc. Part of the control unit may be a drive circuit for receiving a command signal from the calculation unit, and the drive circuit may execute the fail-safe control. In the case, it may be configured that the signal outputted from the operation detection switch is directly inputted into the drive circuit. When a signal indicating that a brake operational member has been operated is inputted into the drive circuit from the operation detection switch in spite of the signal input from the calculation unit to the drive circuit being interrupted, it may be made that the drive circuit drives the motor, assuming that the fail standard has been satisfied.

According to the embodiment, it becomes possible that braking force in a fail state is secured by using an operation detection switch, which can be configured more simply and at a lower cost than an operation amount sensor. Accordingly, even if part of the control unit in a braking apparatus breaks down, it becomes possible to achieve the fail-safe control thereof at a low cost. Even if a power source breaks down, it also becomes possible to surely execute the fail-safe control by using an operation detection switch that can be operated without a power source, The baking apparatus may comprise a plurality of differential pressure regulating valves that are respectively provided between the plurality of wheel cylinders and the pump, and that are respectively opened/closed to adjust the flow rate of the operating fluid to be supplied to the wheel cylinders through the first system flow channel. The connection flow channels may be provided so as to connect the pump and the master cylinder on the upstream side of the differential pressure regulating valves.

According to the embodiment, during a normal control operation, the fluid pressure in each of the wheel cylinders (also referred to as the "wheel cylinder pressure") is adjusted by the control of the opening/closing of the plurality of differential pressure regulating valves, and thereby suitable braking force can be provided. On the other hand, because the connection flow channel is provided so as to connect the pump and the master cylinder on the upstream side of the differential pressure regulating valve, the operating fluid discharged from the pump is surely supplied to the master cylinder when the drive of the motor is initiated by the fail standard being satisfied in spite of the opening/closing states of the differential pressure regulating valve, and thereby the aforementioned fail-safe control can be surely executed.

Also, the braking apparatus may comprise an accumulator that is connected between the pump and the differential pressure regulating valve in the first system flow channel to accumulate pressure by introducing the operating fluid discharged from the pump. And, it may be made that the connection flow channel is provided so as to connect a position between the pump and the accumulator in the first system flow channel, and the master cylinder, and that a check valve configured to prevent the reverse flow of the operating fluid from the accumulator to the connection flow channel is provided between the connection point in the connection flow channel and the accumulator in the first system flow channel.

According to the embodiment, it is possible that, during a normal control operation, the fluid pressure in the accumulator (also referred to as the "accumulator pressure") is made to be within a predetermined range by the drive of the motor such that the accumulator pressure is supplied as the fluid pressure from a fluid pressure power source. The frequency at which the motor is driven during a normal control operation can be reduced by securing the accumulator pressure. On the other hand, the reverse flow of the operating fluid from the accumulator to the connection flow channel in a fail state can be prevented by proving a check valve, and thereby it can be prevented that the fluid pressure with excessively high-pressure may be supplied to the master cylinder.

Alternatively, the braking apparatus may comprise an opening/closing valve that is provided between each of the plurality of the wheel cylinders and the pump, and that is opened/closed to adjust the flow rate of the operating fluid to be supplied to the wheel cylinder through the first system flow channel, and is opened when the differential pressure between the fluid pressure on the upstream side and that on the downstream side is greater than or equal to a predetermined valve-opening pressure that has been set for each of the opening/closing valves. In the case, it may be made that a plurality of the opening/closing valves are provided, and among them, the specific opening/closing valve, the flow channel on the downstream side of which is connected with the second system flow channel, is only set so as to have valve-opening pressure lower than those of other opening/closing valves.

According to the embodiment, it becomes possible that a specific opening/closing valve is only opened in a fail state to supply the operating fluid whose pressure has been increased to the master cylinder through the specific opening/closing valve. In the case, because the valve opening pressure of each of other opening/closing valves is relatively high, the closed state thereof can be held, thereby it can be prevented that the fluid pressure that has been increased by the drive of the motor may be decreased by being scattered into other opening/closing valves. As a result, sufficient fluid pressure can be added to the pressure in the master cylinder in a fail state. Further, according to the embodiment, because it becomes possible, in the fail-safe control, to make a specific opening/closing valve function to be opened in a fail state, the flow channels and the control valves, which are used in a normal control operation, can be used as they are. That is, the braking apparatus can be achieved at a low cost because dedicated parts for a fail state are not needed.

Alternatively, the braking apparatus may comprise an accumulator that is provided between the pump and the differential pressure regulating valve in the first system flow channel, and that accumulates pressure by introducing the operating fluid discharged from the pump. When the motor is driven by the fail standard being satisfied, the fluid pressure in the accumulator may be supplied to the master cylinder through an opening/closing valve.

According to the embodiment, it becomes possible during a normal control operation that the accumulator pressure is accumulated to be within a predetermined range by the drive of the motor and the accumulator pressure is supplied as the fluid pressure from a fluid pressure power source. The accumulator can also be used in a fail state. As the opening/closing valve, if an opening/closing valve that is used in a normal control operation can be used as it is, dedicated parts for a fail state are not needed, and thereby the braking apparatus can be achieved at a low cost.

In the case, the control unit may control the motor such that the discharge flow rate per unit time of the pump during a preset period of time after the drive of the motor has been initiated by the fail standard being satisfied, is larger than that after the preset period of time has elapsed. The master cylinder pressure can be rapidly enhanced to serve the fail-safe control by sufficiently securing the accumulator pressure as stated above.

Alternatively, it may be made that the control unit executes duty control as the power supply control for the motor, in which, after the continuous drive of the motor for a preset period of time, the motor is intermittently driven, and the duty ratio for a predetermined period of time after the intermittent drive has been initiated is set to be higher than that after the predetermined period of time has elapsed. According to the embodiment, the fluid pressure during the initial phase when the fail-safe control has been initiated, during which strong braking force is required, can be secured, and necessary and sufficient braking force can be generated by gradually reducing the duty ratio when the continuous drive is changed to the intermittent drive, and thereby power consumption can also be saved.

Alternatively, it may be made that the control unit controls the motor in a way in which the discharge flow rate per unit time of the pump during a preset time after the drive of the motor has been initiated by the fail standard being satisfied, is larger than that after the preset time has elapsed.

Alternatively, the control unit may control the motor in a way in which, when the drive of the motor has been initiated by the fail standard being satisfied, the discharge amount of the pump is made smaller than in a normal control operation. According to the embodiment, it can be prevented that the supply amount of the operating fluid to the master cylinder in a fail state may be an excessive amount, and that the brake pedal may be pushed back more than necessary. That is, when a driver operates the brake pedal, it becomes possible to keep the operability thereof and the feeling of a driver well.

More specifically, the master cylinder may include: a housing in which a first fluid pressure chamber and a second fluid pressure chamber are formed within it as the fluid pressure chamber; a first piston that is slidably provided in the housing and that receives the operating force of the brake pedal at one end thereof; a second piston that is slidably provided in the housing and that forms the first fluid pressure chamber between one end thereof and the first piston and forms the second fluid pressure chamber between the other end thereof and the housing; and a regulating member configured to regulate the displace amount of the second piston toward the first piston. And, it may be configured that, when the drive of the motor is initiated by the fail standard being satisfied, the operating fluid discharged from the pump is supplied to the first fluid pressure chamber.

In this embodiment, the displacement amount of the second piston toward the first piston is regulated to keep the function of the master cylinder well, but the pressure-increasing operation in the fail-safe control is not hampered because the operating fluid discharged from the pump is supplied to the first fluid pressure chamber in the control. That is, because the second piston is pressed in the direction where the second piston is away from the first piston by the pressure-increasing operation, the pressure-increasing operation itself is not regulated, and accordingly the fail-safe control can be surely executed.

Alternatively, the master cylinder may include: a housing in which a first fluid pressure chamber and a second fluid pressure chamber are formed within it as the fluid pressure chamber; a first piston that is slidably provided in the housing and that receives the operating force of the brake pedal at one end thereof; and a second piston that is slidably provided in the housing and that forms the first fluid pressure chamber between one end thereof and the first piston and forms the second fluid pressure chamber between the other end thereof and the housing. The braking apparatus may comprise, as the second system flow channel, a first flow channel to be connected with the first fluid pressure chamber and a second flow channel to be connected with the second fluid pressure chamber. The braking apparatus may comprise, as the pump, a first pump provided in the first flow channel and a second pump provided in the second flow channel. The braking apparatus may comprise, as the motor, a first motor configured to drive the first pump and a second motor configured to drive the second pump. When the fail standard is satisfied, the control unit may first drive one of the first motor and the second motor in accordance with the state of the operation detection switch, and subsequently may stop the selected motor and drive the other motor.

According to the embodiment, the first motor and the second motor are alternately driven when the fail standard is satisfied, thereby the pressure in each of the wheel cylinders connected with the first fluid pressure chamber and the second fluid pressure chamber is alternately increased. Accordingly, braking force can be exerted in good balance and thereby it becomes possible to stably stop the vehicle.

Alternatively, the master cylinder may include: a housing in which a first fluid pressure chamber and a second fluid pressure chamber are formed within it as the fluid pressure chamber; a first piston that is slidably provided in the housing and that receives the operating force of the brake pedal at one end thereof; a second piston that is slidably provided in the housing and that forms the first fluid pressure chamber between one end thereof and the first piston and forms the second fluid pressure chamber between the other end thereof and the housing; and a regulating structure configured to regulate the spacing between the first piston and the second piston. And, it may be configured that, when the drive of the motor is initiated by the fail standard being satisfied, the operating fluid discharged from the pump is supplied to the second fluid pressure chamber.

In this embodiment, a master cylinder, etc., can be supposed in which the first piston and the second piston form a so-called suspension structure. Although the movement of both pistons in the spacing direction is regulated in this embodiment, the pressure-increasing operation in the fail-safe control is not hampered because the operating fluid discharged from the pump is supplied to the second fluid pressure chamber in the control. That is, because the second piston is pressed near to the first piston by the pressure-increasing operation, the pressure-increasing operation itself is not regulated, and accordingly the fail-safe control can be surely executed.

Further, it may be made that the motor increases braking force by the positive rotation thereof, and reduces it by the reverse rotation thereof, and that, in the case where the fail standard has been satisfied, the control unit increases braking force by making the motor rotate positively when the operation detection switch is turned on, and reduces it by making the motor reversely rotate when the operation detection switch is turned off. According to the embodiment, because braking force is increased/reduced by ON/OFF of stepping-on of the brake pedal, braking control can be executed in accordance with an intention of a driver.

In the case where the drive of the motor has been initiated by the fail standard being satisfied, the control unit may stop the drive of the motor when the number of rotations of the motor reaches the preset maximum value. According to the embodiment, an excessive braking effect can be prevented, and thereby the feeling of a driver can be kept well.

Alternatively, the reservoir may be provided in the fluid pressure circuit as an internal reservoir, and the reservoir may include: a reservoir housing in which a reservoir chamber into/from which the operating fluid can be introduced/discharged is formed; a piston that is slidably provided in the reservoir housing and that changes the volume of the reservoir chamber by being displaced in accordance with the drive state of the pump; and a biasing member configured to bias the piston toward the side where the reservoir chamber is expanded.

According to the embodiment, it becomes possible that a certain amount of the operating fluid is always retained in the reservoir by being biased such that the reservoir chamber is expanded by the biasing member. As a result, the operating fluid can be used immediately after shifted to the fail-safe control, and thereby control with good response can be achieved.

It may be made that: the control unit is configured to be capable of communicating with a specific control unit that controls another control target, different from the braking apparatus, in order to output, only when the operation detection switch is turned on, a specific signal indicating that the specific control unit is allowed to execute specific control;

and when the drive of the motor has been initiated by the fail standard being satisfied, the control unit outputs the specific signal to the specific control unit even if the operation detection switch is turned off. According to the embodiment, even if in a fail state, execution of specific control that is to be originally executed in a specific control unit, which is another control unit, can be secured.

It may be made that the control unit includes: a drive circuit configured to drive the motor; and a calculation circuit configured to calculate target braking force based on the information detected by the operation amount sensor and to output a control command to the drive circuit based on the target braking force, during a normal control operation, and that an output signal of the operation detection switch is inputted into the drive circuit, and that the drive circuit executes the fail-safe control when the fail standard has been satisfied by a signal indicating that the brake pedal has been operated being inputted from the operation detection switch, while the input from the calculation circuit is being interrupted. According to the embodiment, even if the calculation circuit is in a fail state, the fail-safe control can be executed only by the driving circuit, and thereby stable stop of the vehicle can be secured with a simple configuration.

Advantage of the Invention

According to the present invention, even if part of the control unit in a braking apparatus breaks down, the fail-safe control thereof can be achieved surely and at a low cost.

REFERENCE NUMERALS

10 BRAKING APPARATUS
12 BRAKE PEDAL
14 MASTER CYLINDER
14A PRIMARY CHAMBER
14B SECONDARY CHAMBER
16 FLUID PRESSURE ACTUATOR
20 WHEEL CYLINDER
22 STROKE SENSOR
24 RESERVOIR TANK
32, 34, 36, 38 PUMP
40 FIRST MOTOR
42 SECOND MOTOR
80 HOUSING
82 FIRST PISTON
84 SECOND PISTON
210 BRAKING APPARATUS
212 ELECTRICAL BOOSTER
214 MOTOR
310 BRAKING APPARATUS

314 MASTER CYLINDER
316 FLUID PRESSURE ACTUATOR
332, 334 FLUID PRESSURE PUMP
336 ELECTRICAL MOTOR
352, 354 RESERVOIR
410 BRAKING APPARATUS
416 FLUID PRESSURE ACTUATOR
610 BRAKING APPARATUS
616 FLUID PRESSURE ACTUATOR
632 MOTOR
634 PUMP
650 ACCUMULATOR
710 BRAKING APPARATUS
716 FLUID PRESSURE ACTUATOR
810 BRAKING APPARATUS
813 HYDRO BOOSTER UNIT
816 FLUID PRESSURE ACTUATOR
838 PUMP
839 MOTOR
848 ACCUMULATOR
850 PRESSURE-INCREASING VALVE
856 PRESSURE-REDUCING VALVE
914 MASTER CYLINDER
982 FIRST PISTON
984 SECOND PISTON
200, 205, 206, 207, 208, 209 BRAKE ECU

BEST MODE FOR CARRYING OUT THE INVENTION

Preferred embodiments for carrying out the present invention will now be described with reference to accompanying drawings.

First Embodiment

Figure 1:
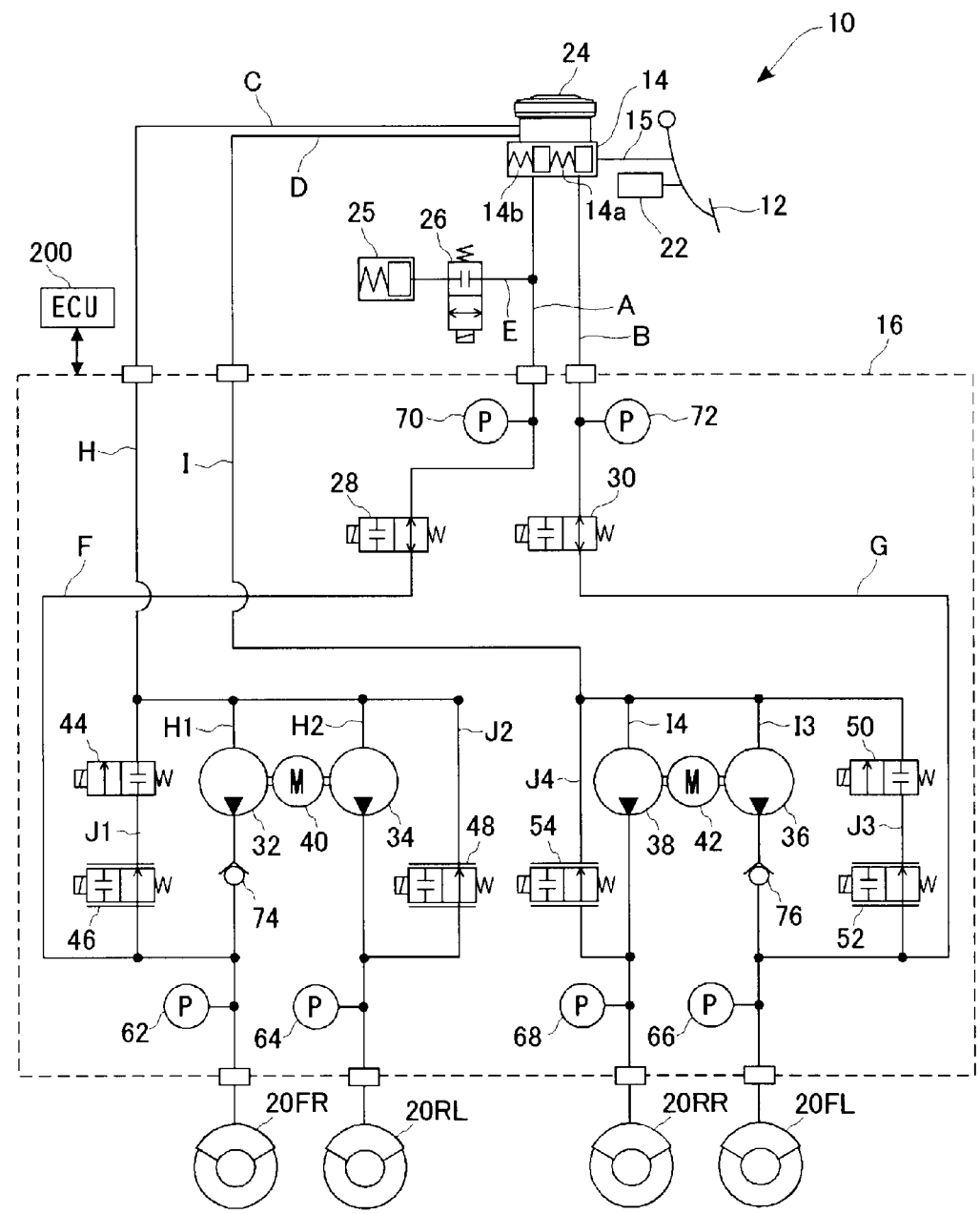
FIG. 1 is a systematic view illustrating a braking apparatus according to a first embodiment of the present invention, centered on the fluid pressure circuit thereof.

FIG. 1 is a systematic view illustrating a braking apparatus according to a first embodiment of the invention, centered on the fluid pressure circuit thereof. In the embodiment, a so-called X-shaped fluid pressure circuit including a system in which the right front wheel and the left rear wheel are connected and that in which the left front wheel and the right rear wheel are connected, is adopted.

A braking apparatus 10 comprises a brake pedal 12, a master cylinder 14, a fluid pressure actuator 16, and wheel cylinders 20FL, 20FR, 20RL, and 20RR (hereinafter, sometimes collectively referred to as "wheel cylinder 20"). The braking apparatus 10 also comprises a brake ECU 200 as a control unit (braking control apparatus) for controlling the operation of each part thereof. The braking apparatus 10 provides braking force to each of the wheels by supplying, as an operating fluid, brake fluid to the wheel cylinder 20 and by controlling the fluid pressure (hereinafter, referred to as the "wheel cylinder pressure"). A stroke sensor 22 (which corresponds to an operation amount sensor) is provided in the brake pedal 12. A reservoir tank 24 is connected with the master cylinder 14, and a stroke simulator 25 is connected with a discharge port on one side of the master cylinder 14 through a opening/closing valve 26.

When a driver steps on the brake pedal 12, a pedal stroke is inputted into the stroke sensor 22 as an operation amount of the brake pedal 12, so that a detection signal corresponding to the pedal stroke is outputted from the stroke sensor 22. The detection signal is inputted into the brake ECU 200 and the pedal stroke of the brake pedal 12 is detected by the brake ECU 200. Herein, the stroke sensor 22 is taken as an example of an operation amount sensor for detecting an operation amount of a brake operational member; however, the stroke sensor 22 may be replaced by a tread force sensor, etc., for detecting the tread force applied to the brake pedal 12.

The brake pedal 12 is connected with a push rod 15, etc., for transmitting the pedal stroke to the master cylinder 14. Fluid pressure (hereinafter, referred to as the "master cylinder pressure") is generated in a primary chamber 14a and a secondary chamber 14b, which are fluid pressure chambers in the master cylinder 14, by the push rod 15 being pressed. The configuration and operation of the master cylinder 14 will be described in detail later. The pipelines B and A each extending toward the fluid pressure actuator 16 are connected with the primary chamber 14a and the secondary chamber 14b in the master cylinder 14, respectively.

When the brake pedal 12 is at the initial position, the reservoir tank 24 is communicated with each of the primary chamber 14a and the secondary chamber 14b through a non-illustrated channel in order to supply the brake fluid into the master cylinder 14 and retain the excessive brake fluid in the master cylinder 14. Pipelines C and D each extending toward the fluid pressure actuator 16 are connected with the reservoir tank 24.

The stroke simulator 25 is connected with a pipeline E leading to the pipeline A to introduce the brake fluid in the secondary chamber 14b. A opening/closing valve 26 is provided in the pipeline E. The opening/closing valve 26 is a normally-closed electromagnetic valve that is in a closed state when not powered and changed to an open state when an operation of the brake pedal 12 by a driver has been detected. The stroke simulator 25 creates the reaction force corresponding to the operating force of the brake pedal 12 by a driver.

The fluid pressure actuator 16 is provided with a pipeline F connected with the pipeline A so as to connect the secondary chamber 14b in the master cylinder 14 and the wheel cylinder 20FR corresponding to the right front wheel FR. The pipeline F is provided with a cut-off valve 28. The cut-off valve 28 is a normally-open electromagnetic valve that is in an open state (communication state) when not powered and in a closed state (cut-off state) when powered. A communication/cut-off state of the pipeline F is controlled by the cut-off valve 28, and thereby the supply of the brake fluid into the wheel cylinder 20FR through the pipelines A and F is controlled.

The fluid pressure actuator 16 is provided with a pipeline G connected with the pipeline B so as to connect the primary chamber 14a in the master cylinder 14 and the wheel cylinder 20FL corresponding to the left front wheel FL. The pipeline G is provided with a cut-off valve 30. The cut-off valve 30 is a normally-open valve that is in an open state when not powered and in a closed state when powered. A communication/cut-off state of the pipeline G is controlled by the cut-off valve 30, and thereby the supply of the brake fluid into the wheel cylinder 20FL through the pipelines B and G is controlled.

Also, the fluid pressure actuator 16 is provided with both a pipeline H connected with the pipeline C and a pipeline I connected with the pipeline D, that respectively extends from the reservoir tank 24. The pipeline H branches into two pipelines H1 and H2, which are respectively connected with the wheel cylinders 20FR and 20RL. The pipeline I branches into two pipelines I3 and I4, which are respectively connected with the wheel cylinders 20FL and 20RR. The wheel cylinders 20FL and 20FR correspond to the left front wheel FL and the right front wheel FR, respectively. The wheel cylinders 20RL and 20RR correspond to the left rear wheel RL and the right rear wheel RR, respectively.

Each of the pipelines H1, H2, I3, and I4 is provided with each of the pumps 32, 34, 36, and 38 in this order. Each of the pumps 32 to 38 is composed of, for example, a trochoid pump excellent in quietness, and is connected with each of the wheel cylinders 20FR, 20RL, 20FL, and 20RR in this order. The pumps 32 and 34 are driven by the first motor 40, and the pumps 36 and 38 are driven by the second motor 42. In the present embodiment, these four pumps 32 to 38 function as fluid pressure power sources. Each of the pumps 32 to 38 supplies an amount of the brake fluid, the amount corresponding to the rotation speed of the first motor 40 or the second motor 42, to each wheel cylinder 20.

The fluid pressure actuator 16 is provided with pipelines J1, J2, J3, and J4 are provided in parallel with the pumps 32 to 38, respectively. A communication valve 44 and a fluid pressure regulating valve 46 are provided in series in the pipeline J1. It is arranged that the communication valve 44 is located on the suction port side of the pump 32 (i.e., on the downstream side of the flow direction of the brake fluid in the pipeline J1), and the fluid pressure regulating valve 46 is located on the discharge port side of the pump 32 (i.e., on the upstream side thereof in the pipeline J1). That is, it is configured such that communication/cut-off between the reservoir tank 24 and the fluid pressure regulating valve 46 can be controlled by the communication valve 44. The communication valve 44 is a normally-closed electromagnetic valve that is in a closed state when not powered and in an open state when powered. The fluid pressure regulating valve 46 is a normally-open linear valve that is in an open state when not powered and in a closed state when powered, the opening degree of which is adjusted by power supply control. The pipeline J2 is provided with a fluid pressure regulating valve 48. The fluid pressure regulating valve 48 is a normally-open linear valve likewise with the fluid pressure regulating valve 46.

A communication valve 50 and a fluid pressure regulating valve 52 are provided in series in the pipeline J3. It is arranged that the communication valve 50 is located on the suction port side of the pump 36 (i.e., on the downstream side of the flow direction of the brake fluid in the pipeline J3), and the fluid pressure regulating valve 52 is located on the discharge port side of the pump 36 (i.e., on the upstream side thereof in the pipeline J3). That is, it is configured such that communication/cut-off between the reservoir tank 24 and the fluid pressure regulating valve 52 can be controlled by the communication valve 50. The communication valve 50 is a normally-closed electromagnetic valve that is in a closed state when not powered and in an open state when powered. The fluid pressure regulating valve 52 is a normally-open linear valve that is in an open state when not powered and in a closed state when powered, the opening degree of which is adjusted by power supply control. The opening degree of the fluid pressure regulating valve 52 is adjusted by power supply control such that the amount of the brake fluid in the wheel cylinder 20FL is adjusted. The pipeline J4 is provided with a fluid pressure regulating valve 54. The fluid pressure regulating valve 54 is a normally-open linear valve likewise with the fluid pressure regulating valve 52.

Each of fluid pressure sensors 62, 64, 66, and 68 is arranged between each of the pumps 32 to 38 and each of the wheel cylinders 20FR, 20RL, 20FL and 20RR in the pipelines H1, H2, I3, and I4, so that the fluid pressure in each of the wheel cylinders 20FR, 20RL 20FL, and 20RR can be detected. Fluid pressure sensors 70 and 72 are also arranged on the upstream side from the cut-off valves 28 and 30 (i.e., near to the master cylinder 14) in the pipelines F and G, so that the master cylinder pressure generated in each of the primary chamber 14a and the secondary chamber 14b in the master cylinder 14 can be detected. Also, check valves 74 and 76 are provided in the discharge port of the pump 32 for increasing the pressure in the wheel cylinder 20FR and in the discharge port of the pump 36 for increasing the pressure in the wheel cylinder 20FL, respectively. Each of the check valves 74 and 76 prohibits the reverse flow of the brake fluid from each side of the wheel cylinders 20FR and 20FL toward each of the pumps 32 and 36.

In the braking apparatus 10 configured as stated above, a first piping system is composed of: a fluid pressure circuit including both circuits connecting the reservoir tank 24 and the wheel cylinders 20FR and 20RL through the pipelines C, H, H1, and H2, and circuits of the pipelines J1 and J2 that are connected in parallel with the pumps 32 and 34; and a fluid pressure circuit connecting the secondary chamber 14b and the wheel cylinder 20FR through the pipelines A and F. In addition, a second piping system is composed of: a fluid pressure circuit including both circuits connecting the reservoir tank 24 and the wheel cylinders 20FL and 20RR through the pipelines D, I, I3, and I4, and circuits of the pipelines J3 and J4 that are connected in parallel with the pumps 36 and 38; and a fluid pressure circuit connecting the primary chamber 14a and the wheel cylinder 20FL through the pipelines B and G.

The detection signals from the stroke sensor 22 and each of the fluid pressure sensors 62 to 68 are inputted into the brake ECU 200, and it is configured that, based on the pedal stroke, the fluid pressure in each of the wheel cylinders, and the master cylinder pressure, which are determined from each of these detection signals, control signals for driving the opening/closing valve 26, the cut-off valves 28 and 30, the communication valves 44 and 50, the fluid pressure regulating valves 46, 48, 52, and 54, the first motor 40, and the second motor 42, are outputted from the brake ECU 200.

In the braking apparatus 10, the wheel cylinders 20FR and 20RL, and the wheel cylinders 20FL and 20RR, are respectively connected by the pipelines C and H, or the pipelines D and I, which are different from each other. Accordingly, it becomes possible that a larger amount of the brake fluid is supplied to each of the wheel cylinders 20FR, 20RL, 20FL, and 20RR, in comparison with the case where the wheel cylinders 20FR, 20RL, 20FL, and 20RR, and the reservoir tank 24 are connected by a single pipeline. Further, even if the pipeline on one side breaks down, the brake fluid can be supplied to the wheel cylinders connected with the pipeline on the other side through the pipeline on the other side, and hence a situation can be avoided in which the pressure in every wheel cylinder cannot be increased. As a result, the reliability of the braking apparatus 10 is improved.

In the baking apparatus 10 configured as stated above, when the brake pedal 12 is stepped on and the detection signal of the stroke sensor 22 is inputted into the brake ECU 200 during a normal state, the brake ECU 200 creates the following state by controlling each of the valves 26 to 30, 44 and 45, the first motor 40, and the second motor 42: that is, the cut-off valves 28 and 30 are both powered on, and the communication valves 44 and 50 are also both powered on. Thereby, the cut-off valves 28 and 30 are made to be in cut-off states and the communication valves 44 and 50 are made to be in communication states.

The opening degree of each of the fluid pressure regulating valves 46 to 54 is adjusted in accordance with a power supply current value. The opening/closing valve 26 is powered on. And accordingly, the stroke simulator 25 is in a communication state with the secondary chamber 14b through the pipelines A and E, and when the brake pedal 12 is stepped on, the brake fluid in the secondary chamber 14b is transferred into the stroke simulator 25. Accordingly, it is made that the brake pedal 12 can be stepped on without making the driver feel that stepping on the brake pedal 12 is like stepping on a hard board with respect to the brake pedal 12, the feeling occurring due to the increased master cylinder pressure.

Further, the first motor 40 and the second motor 42 are both powered on, and discharge of the brake fluid from the pumps 32 to 38 into the wheel cylinder 20 is executed, not through an electromagnetic valve. That is, when the pumps 32 to 38 are operated, the brake fluid is supplied to each wheel cylinder 20.

In the case, the supply amount of the brake fluid into the wheel cylinder 20 is controlled with the rotation speed of each of the first motor 40 and the second motor 42 being controlled by the brake ECU 200. In the case, because the cut-off valves 28 and 30 are made to be in cut-off states, the fluid pressure on the downstream side of each of the pumps 32 to 38, i.e., the supply amount of the brake fluid into each wheel cylinder 20 is increased. And, because the communication valves 44 and 50 are made to be in communication states and the opening degree of each of the fluid pressure regulating valves 46 to 52 is controlled, the brake fluid is discharged in accordance with the opening degree of each of them, thereby the fluid pressure in each wheel cylinder 20 is adjusted.

The brake ECU 200 monitors the fluid pressure supplied to each wheel cylinder 20 based on the detection signal of each of the fluid pressure sensors 62 to 68, and by controlling the current value (duty ratio) of the power supplied to each of the fluid pressure regulating valves 46 to 54, the brake ECU 200 makes the fluid pressure in each wheel cylinder 20 to be a desired value. Thereby, the braking force in accordance with the pedal stroke 12 of the brake pedal 12 can be generated.

Figure 2:
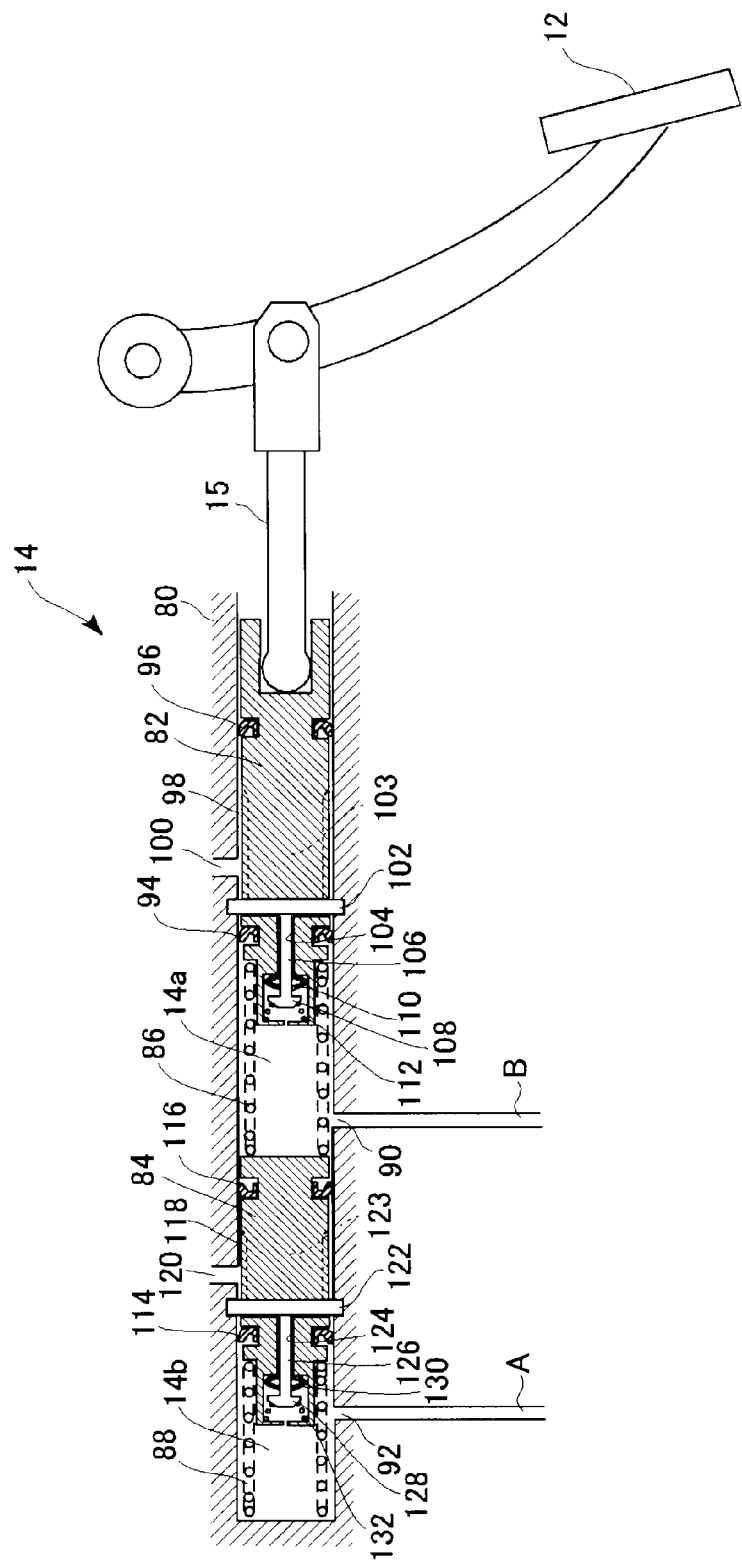
FIG. 2 is a partial sectional view illustrating the configuration of a master cylinder.

FIG. 2 is a partial sectional view illustrating the configuration of the master cylinder. The master cylinder 14 is configured by slidably housing a first piston 82 and a second piston 84 in a bottomed tubular housing 80. The second piston 84 is arranged near to the bottom of the housing 80 and the first piston 82 is arranged near to the opening thereof. The push rod 15 linked to the brake pedal 12 is connected with the end portion of the first piston 82, the end portion being opposite to the second piston 84. The primary chamber 14a (first fluid pressure chamber) is formed between the first piston 82 and the second piston 84, and the secondary chamber 14b (second fluid pressure chamber) is formed between the second piston 84 and the bottom of the housing 80. Also, a first spring 86 configured to bias the first piston 82 and the second piston 84 in the direction where two pistons are away from each other (i.e., the direction where the first fluid pressure chamber is expanded), is provided between the two pistons 82 and 84. A second spring 88 configured to bias the second piston 84 in the direction where the second piston 84 is away from the bottom thereof (i.e., the direction where the second fluid pressure chamber is expanded), is provided between the second piston 84 and the bottom of the housing 80. A first output port 90 is provided in the side portion of the housing 80 that corresponds to the primary chamber 14a, the first output port 80 communicating with the pipeline B. On the other hand, a second output port 92 is provided in the side portion of the housing 80 that corresponds to the secondary chamber 14b, the second output port 92 communication with the pipeline A.

A first coupling 94 and a second coupling 96 are respectively press-fitted onto the outer circumferential surface on one end and on the other end of the first piston 82. These first coupling 94 and the second coupling 96 are sealing members formed of an elastic material, such as rubber, or the like. A first atmospheric pressure chamber 98 is formed between the first coupling 94 and the second coupling 96. The first atmospheric chamber 98 communicates with the reservoir tank 24 through a first input port 100 provided in the side portion of the housing 80.

A stopper pin 102 is provided in slightly front of the first input port 100 of the housing 80 so as to be laid across the diameter of the housing 80, and inserted into a slit 103 formed in the central portion in the longitudinal direction of the first piston 82, the slit 103 having a predetermined width and length. A valve hole 104 extending along the shaft line of the first piston 82 is provided in front of (on left side in FIG. 2) the slit 103 in the first piston 82, and a valve body 106 having a long shape is inserted into the valve hole 104. The front end of the valve body 106 is enlarged in diameter to form a valve portion 108. On the other hand, a valve seat member 110 is provided between the valve hole 104 and the valve portion 108. It is configured that the valve hole 104 (i.e., a first valve) can be opened/closed by attaching/detaching the valve portion 108 to/from the valve seat member 110. That is, the first atmospheric pressure chamber 98 and the primary chamber 14a communicate with each other through the valve hole 104 and the slit 103, and the communication channel between them is opened/cut off by the opening/closing of the first valve. Thereby, the distribution of the brake fluid between the primary chamber 14a and the reservoir tank 24 can be permitted or cut off. Because the valve body 106 is biased in the direction of the valve being closed by the spring 112, the first valve is held to be in a closed state when the first piston 82 is located forward. On the other hand, when the first piston 82 recedes backward as illustrated, the valve body 106 is locked by the stopper pin 102 such that the displacement thereof is blocked, and hence the valve body 106 is displaced relatively forward relative to the body of the first piston 82 and the first valve is made to be in an open state.

Similarly, a first coupling 114 and a second coupling 116 are respectively press-fitted onto the outer circumferential surface on one end and on the other end of the second piston 84. These first coupling 114 and the second coupling 116 are sealing members formed of an elastic material, such as rubber, or the like. A second atmospheric pressure chamber 118 is formed between the first coupling 114 and the second coupling 116. The second atmospheric chamber 118 communicates with the reservoir tank 24 through a second input port 120 provided in the side portion of the housing 80.

A stopper pin 122 is provided in slightly front of the second input port 120 of the housing 80 so as to be laid across the diameter of the housing 80, and inserted into a slit 123 formed in the central portion in the longitudinal direction of the second piston 84, the slit 123 having a predetermined width and length. A valve hole 124 extending along the shaft line of the second piston 84 is provided in front of (on left side in FIG. 2) the slit 123 in the second piston 84, and a valve body 126 having a long shape is inserted into the valve hole 124. The front end of the valve body 126 is enlarged in diameter to form a valve portion 128. On the other hand, a valve seat member 130 is provided between the valve hole 124 and the valve portion 128. It is configured that the valve hole 124 (i.e., a second valve) can be opened/closed by attaching/detaching the valve portion 128 to/from the valve seat member 130. That is, the second atmospheric pressure chamber 118 and the secondary chamber 14b communicate with each other through the valve hole 124 and the slit 123, and the communication channel between them is opened/cut off by the opening/closing of the second valve. Thereby, the distribution of the brake fluid between the secondary chamber 14b and the reservoir tank 24 can be permitted or cut off. Because the valve body 126 is biased in the direction of the valve being closed by the spring 132, the second valve is held to be in a closed state when the second piston 82 is located forward. On the other hand, when the second piston 84 recedes backward as illustrated, the valve body 126 is locked by the stopper pin 122 (which corresponds to the "regulating member") such that the displacement thereof is blocked, and hence the valve body 126 is displaced relatively forward relative to the body of the second piston 84 and the second valve is made to be in an open state.

In the master cylinder 14 configured as stated above, when the first piston 82 advances forward (to the side of the bottom of the housing 80) by the brake pedal 12 being stepped on, the master cylinder pressure is generated in the primary chamber 14a. Because the second piston 84 is displaced at the time such that the anterior-posterior force is balanced, the master cylinder pressure is also generated in the secondary chamber 14b. When the opening/closing valve 26 is closed at the time, pedal reaction force that counters the master cylinder pressure is created in the stroke simulator 25.

Figure 3:
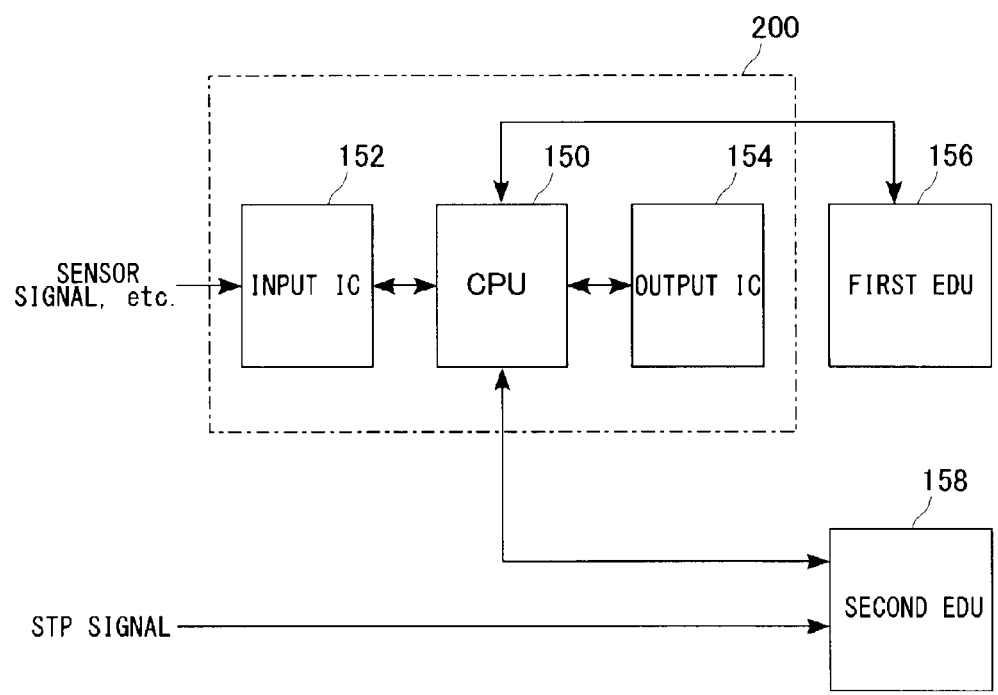
FIG. 3 is a view schematically illustrating the electrical configuration of a brake ECU and the major part of its periphery.

FIG. 3 is a view schematically illustrating the electric configuration of the brake ECU 200 and the major part of its periphery. The brake ECU 200 is configured such that a microcomputer including a CPU 150 is centered, and includes a ROM for storing various programs, a RAM for temporarily storing data, an input/output port, and a communication port, etc., besides the CPU. The brake ECU 200 can communicate with another control unit such as an engine ECU (not illustrated) for controlling an engine, or the like, in order to acquire necessary information on vehicle control states. The CPU 150 calculates target braking force and a control command value based on the vehicle control information acquired from signals and communication, which have been inputted from various sensor switches through an input IC 152. Subsequently, the CPU 150 outputs, through an output IC 154, a control command to each of the electromagnetic control valves, etc., which form the fluid pressure actuator 16. Also, the CPU 150 is connected with a first EDU 156 and a second EDU 158 through communication port ports. Herein, the first EDU 156 is a motor driver including a drive circuit for the first motor 40, and the second EDU 158 is a motor driver including a drive circuit for the second motor 42. In the present embodiment, brushless motors driven with three-phase alternating current are adopted as the first motor 40 and the second motor 42. These motors are rotationally driven based on the control signals from the brake ECU 200. Because the structure of a brushless motor and the configuration of a motor driver themselves are publicly known, detailed descriptions thereof will be omitted.

Subsequently, the fail-safe control in the present embodiment will be described. In the embodiment, braking control processing is executed, centered on the CPU 150 in the brake ECU 200, as stated above. However, even if an unexpected abnormal state, such as a failure in the CPU 150, disconnection of the communication line between the CPU 150 and each drive circuit, or the like, occurs due to any cause, it is needed to lead the vehicle to a safe state. Accordingly, the present embodiment adopts a device in which such a case is supposed. That is, in the embodiment, a signal (hereinafter, referred to as an "STP signal") of a stop lamp switch (which corresponds to the "operation detection switch") is inputted into one of the EDUs (the second EDU 158), as illustrated in FIG. 3. While the second EDU 158 drives the second motor 42 based on the control command signal inputted from the CPU 150 during a normal state as already described, the second EDU 158 drives the second motor 42 in accordance with the presence or absence of the STP signal when the CPU 150, etc., is in a fail state, so that at least the minimum braking force is secured. It is noted that the "fail" includes electric failures, such as failure in the CPU, that in the output IC, disconnection of the main relay, that of electromagnetic valves including a linear valve, etc.

That is, when the CPU 150, etc., is in a fail state, the serial signal, which is to be originally inputted into the second EDU 158 from the CPU 150, is not inputted thereinto even if a driver issues a braking request by stepping on the brake pedal 12. When a signal is not inputted from the CPU 150 in spite of the STP signal being inputted by stepping-on of the brake pedal 12, the second EDU 158 drives the second motor 42 as the fail-safe processing to provide braking force to a predetermined wheel. The solenoid of an electromagnetic valve is not powered when s fail state occurs.

Figure 4:
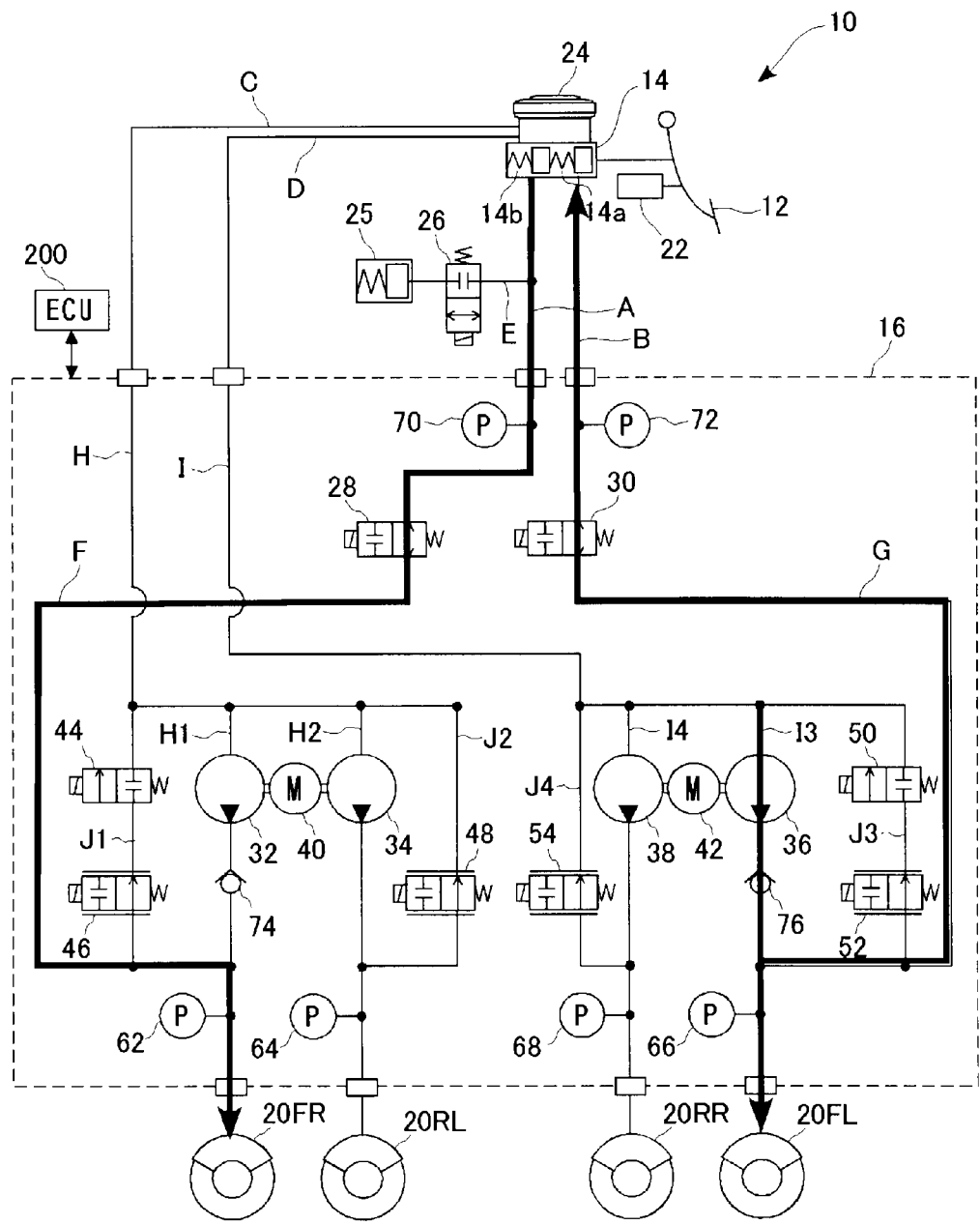
FIG. 4 is a view illustrating a control state by fuel-safe control.
Figure 5A:
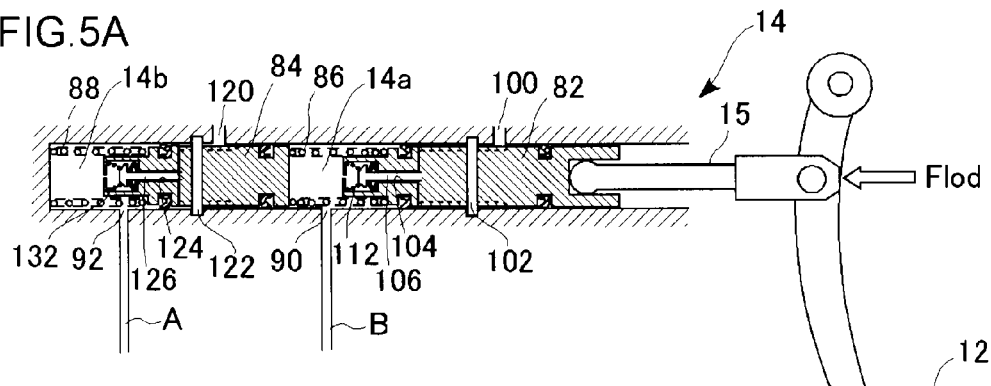
FIGS. 5(A) to 5(C) are views each illustrating an operation of the master cylinder in the fail-safe control.
Figure 5B:
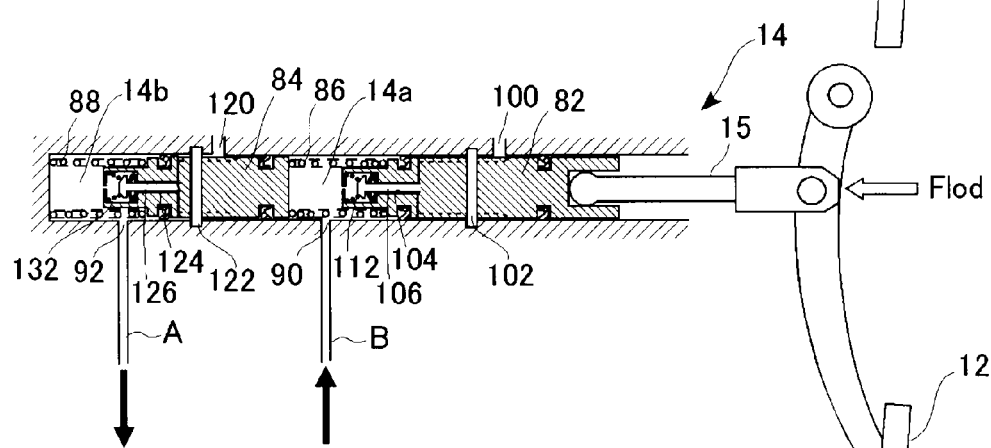
Figure 5C:
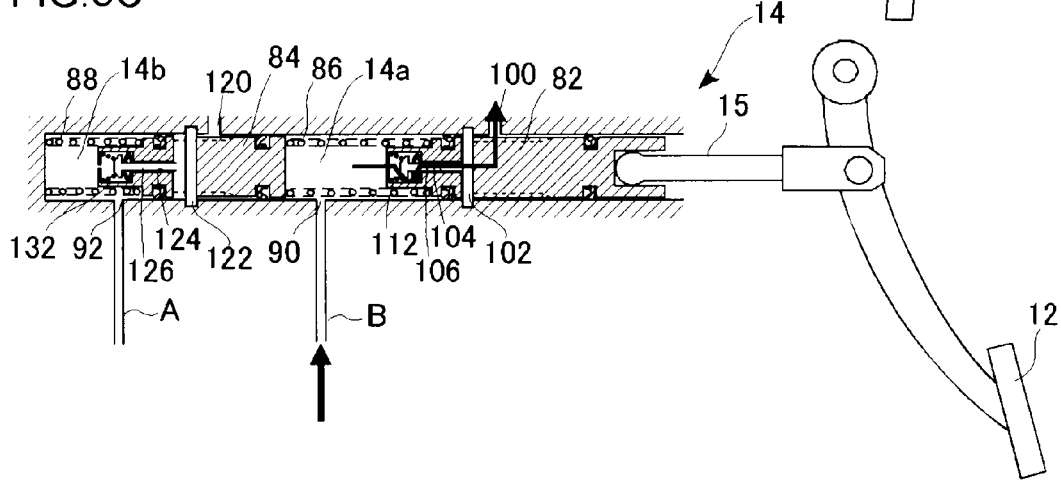
Figure 6A:
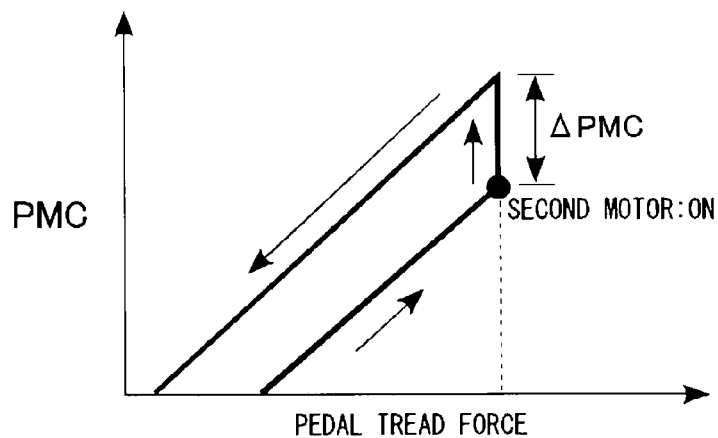
FIGS. 6(A) to 6(C) are explanatory graphs each illustrating a fail-safe control method.
Figure 6B:
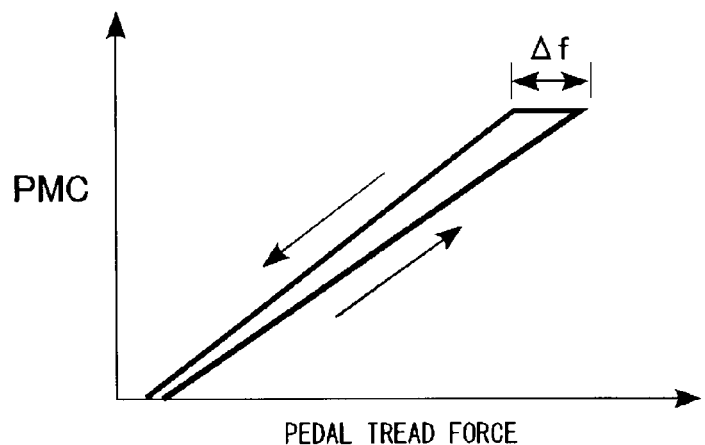
Figure 6C:
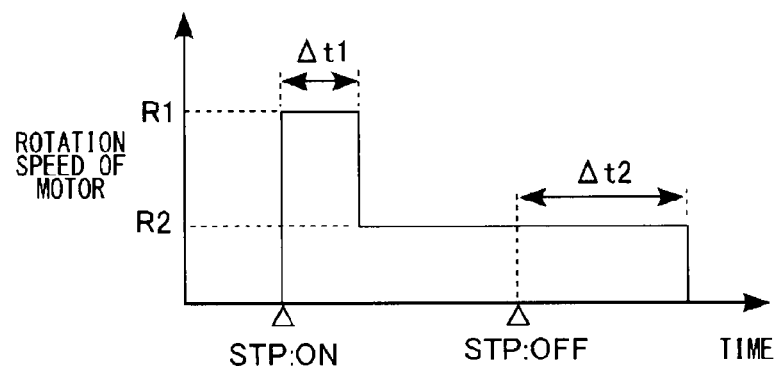

FIG. 4 is a view illustrating a control state by the fail-safe control. The arrows in the view illustrate flows of the brake fluid. FIGS. 5(A) to 5(C) are views each illustrating an operation of the master cylinder in the fail-safe control. FIGS. 5(A) and 5(B) are explanatory views illustrating operating processes thereof. FIGS. 6(A) to 6(C) are explanatory graphs each illustrating a fail-safe control method.

As illustrated in FIG. 4, when the CPU 150, etc., in the brake ECU 200 is in a fail state, each of the actuators, such as the electromagnetic valves forming the fluid pressure actuator 16, is not basically powered to be in a normal state. When the brake pedal 12 stepped on in such a case, the aforementioned fail-safe control is executed. That is, the second EDU 158 assumes that it is in a fail state when an input of a serial signal from the CPU 150 is interrupted in spite of the STP signal being inputted, and then drives only the second motor 42.

At the time, due to the operation of the pump 36, the brake fluid is pumped up from the reservoir tank 24 to increase the fluid pressure in the wheel cylinder 20FL in the left front wheel, as illustrated. Although the pump 38 is also similarly operated at the time, the discharged brake fluid, which also flows through the pipeline J4, is sucked again by the pump 36 or 38 by the fluid pressure regulating valve 54 being in an open state, and accordingly the discharged brake fluid is in a circulating state, providing no trouble to the fluid pressure control. In addition, because the cut-off valve 30 is in an open state, part of the brake fluid is introduced into the primary chamber 14a through the pipelines G and B. As a result, the pressure in the master cylinder is increased. Because the opening/closing valve 26 is in a closed state and the cut-off valve 28 is in an open state at the time, the brake fluid in the secondary chamber 14b is pushed out to be supplied to the wheel cylinder 20FR in the right front wheel through the pipelines A and F. That is, even if the CPU 150, etc., is in a fail state, braking force is provided to the front wheels (which may be the driving wheels) while the brake pedal 12 is being stepped on, and accordingly it becomes possible to stop the vehicle stably.

A mechanism for generating pressure in this case is as follows: that is, the brake pedal 12 is stepped on from the state illustrated in FIG. 2 when a fail state occurs, the first piston 82 is pushed forward through the push rod 15 as illustrated in FIG. 5(A), and hence the valve body 106 is detached from the stopper pin 102, resulting in a closed state of the first valve due to the biasing force of the spring 112. At the time, because the biasing force of the first spring 86 is increased such that the second piston 84 is pushed forward, the valve body 126 is detached from the stopper pin 122, also resulting in a closed state of the second valve due to the biasing force of the spring 132. As a result, the communication state of each of the primary chamber 14a and the secondary chamber 14b, and the reservoir tank 24 is cut off, and accordingly the fluid pressure in each of the fluid pressure chambers (i.e., master cylinder pressure) is increased.

In this case, the following equation (1) is satisfied:

$$PMC\_FL \times S = Flod - F\mu1 - Fs1$$

$$Flod = F/Kratio \times Keff - F0$$

$$PMC\_FR \times S = PMC\_FL \times S - (Fs1 - Fs2) - F\mu \quad (1)$$

where PMC_FL: master cylinder pressure (fluid pressure in the primary chamber 14a)
PMC_FR: master cylinder pressure (fluid pressure in the secondary chamber 14b)
S: section area of fluid pressure chamber in the master cylinder 14
Flod: axial force
F: pedal tread force
F0: load for initiating pedal movement
Fμ1: sliding frictional force of the first piston 82
Fμ2: sliding friction force of the second piston 84
Fs1: spring load of the first spring 86
Fs2: spring load of the second spring 88
Kratio: pedal ratio
Keff: pedal efficiency In addition, because the brake fluid in one of the fluid pressure circuits is introduced into the primary chamber 14a through the pipeline B by the pump 36 being driven as illustrated by the arrow in FIG. 5(B), the pressure in the primary chamber 14a is further increased. The fluid pressure in the secondary chamber 14b is also increased due to the additional fluid pressure, thereby allowing for the brake fluid to be discharged through the pipeline A. As a result, the brake fluid is also provided to the other system of the fluid pressure circuits. Accordingly, even in a fail state, the pressure in each of the wheel cylinders in the front wheels can be increased to generate braking force.

At the time, the following equation (2) is satisfied:

$$PMC\_FL \times S - F\mu1 = Flod - Fs1$$

$$PMC\_FR \times S = PMC\_FL \times S - (Fs1 - Fs2) - F\mu2 \quad (2)$$

In the present embodiment, the pump 36 (i.e., the second motor 42) is driven when the brake pedal 12 is stepped on in a fail state, as illustrated in FIG. 6(A). At the time, the master cylinder pressure PMC is increased by the introduction of the brake fluid into the primary chamber 14a, even when the pedal tread force by a driver is held. This is because the hysteresis, occurring due to the sliding frictional force of the piston, is used. That is, as generally illustrated in FIG. 6(B), the master cylinder pressure PMC is held because the piston is stopped moving by the frictional force before the pedal tread force is reduced by a predetermined amount Δf when the stepping-on of the brake pedal 12 is removed at certain tread force after the brake pedal 12 has been stepped on. In the embodiment, an additional increase in the fluid pressure ΔPMC, occurring due to the drive of the pump, is achieved as illustrated in FIG. 6(A), by using a period of time when the master cylinder pressure PMC is held at a constant value. Subsequently, when the stepping-on of the brake pedal 12 is relaxed, the pump 36 is being continuously driven before the STP signal is turned off, but the brake pedal 12 is gradually pushed back.

In the present embodiment, when the STP signal is inputted, the rotation speed of the second motor 42 is set to be R1 as illustrated in FIG. 6(C). Subsequently, when a predetermined period of time Δt1 (for example, 0.3 seconds) has elapsed, the rotation speed thereof is reduced to R2. Thereafter, when the input of the STP signal is ended by the release of the brake pedal 12, the second motor 42 is stopped after a state in which the rotation speed thereof is held at R2 has been continued for a predetermined period of time Δt2 (for example, 3 seconds). Taking into consideration the possibility that the STP signal may be turned off in a state in which sufficient braking force is not obtained at the time when the braking pedal 12 is returned to some extent, depending on a detection threshold value of the stop lamp switch, the second motor 42 is to be continuously driven for a while after the input of the STP signal has been ended, as stated above. In the present embodiment, it is assumed that R1=2000 rpm and R2=500 rpm; however, it may be assumed that, for example, R1=R2=1000 rpm or R1=R2=500 rpm. The predetermined periods of time Δt1 and Δt2 may also be set appropriately.

If the pump 36 is still being driven when the stepping-on of the brake pedal 12 has been relaxed, the second valve is made to be in a closed state due to the additional fluid pressure, as illustrated in FIG. 5(C). On the other hand, because the first piston 82 is pushed back by the additional fluid pressure, the first valve is opened such that the brake fluid in the primary chamber 14a is returned into the reservoir tank 24 through the first input port 100. As a result, the master cylinder pressure is reduced. That is, because the opening degree of the first valve is changed by the driver's pedal tread force in a situation in which the pump 36 is being driven, the master cylinder pressure can be adjusted by the extent of the stepping-on of the brake pedal.

At the time, the following equation (3) is satisfied:

$$PMC\_FL \times S - F\mu1 = Flod - Fs1$$

$$PMC\_FR \times S = PMC\_FL \times S - (Fs1 - Fs2) - F\mu2$$

$$Q = Cd \times Ag \times (2 \times PMC\_FL/\rho)^{1/2} \quad (3)$$

where Q: flow rate of brake fluid passing though first valve
Cd: flow-rate coefficient in first valve
Ag: opening area of first valve
ρ: density of braking fluid In the present embodiment, because it becomes possible to secure braking force in a fail state by using a stop lamp switch that can be formed more simply and at a lower cost than the stroke sensor 22 as stated above, fail-safe control can be achieved at a low cost even if a CPU, etc., in the braking apparatus 10 breaks down. Further, because the stop lamp switch is what is operated without a power source, fail-safe control can be surely executed if a power source breaks down.

Second Embodiment

Figure 7:
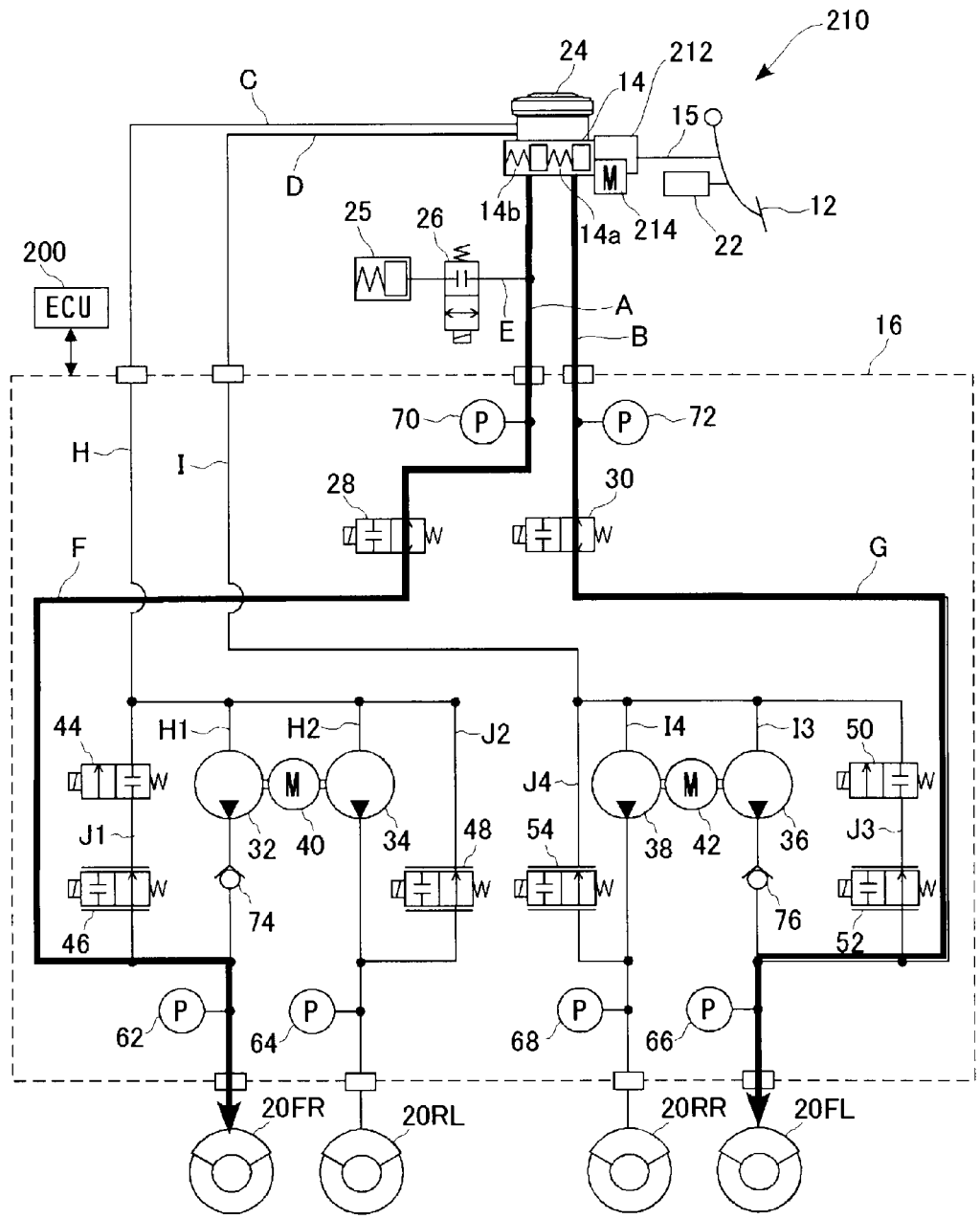
FIG. 7 is a systematic view illustrating a braking apparatus according to a second embodiment, centered on the fluid pressure circuit thereof.
Figure 8:
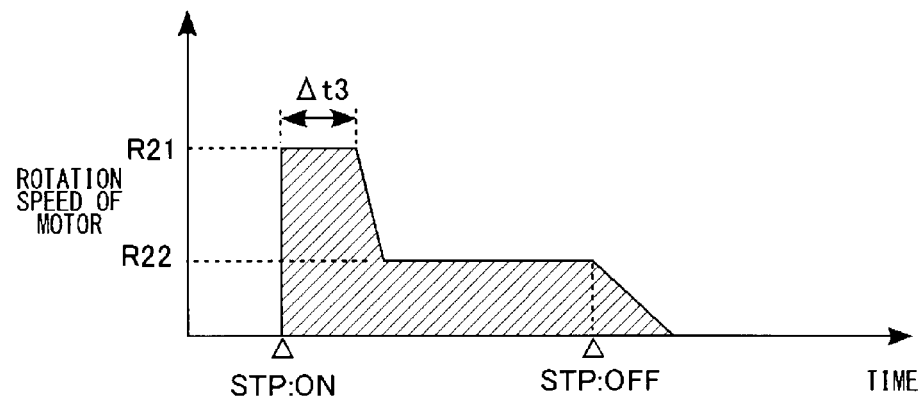
FIG. 8 is a view exemplifying a motor driving method of an electrical booster in a fail state.

Subsequently, a second embodiment according to the present invention will be described. The embodiment is almost the same as the first embodiment, except that an electrical booster is provided in the master cylinder. Accordingly, the configurations that are common with the first embodiment will be denoted with the same reference numerals and descriptions thereof will be omitted. FIG. 7 is a systematic view illustrating a braking apparatus according to the second embodiment, centered on the fluid pressure circuit thereof. FIG. 8 is a view exemplifying a motor driving method of an electrical booster in a fail state. The vertical axis of FIG. 8 represents the rotation speed of the motor and the horizontal axis thereof represents elapsed time.

As illustrated in FIG. 7, in a braking apparatus 210, an electrical booster 212 is provided in the master cylinder 14 such that the stepping-on of the brake pedal 12 can be assisted. The electrical booster 212 includes: a motor 214 that can be rotated normally or reversely to provide back-and-forth force to a first piston that partitions the primary chamber 14a in the master cylinder 14; and a transmission mechanism for transmitting the rotational force of the motor to the first piston after converting it into translational force (for example, a mechanism for converting rotary motion into linear motion, such as ball screw mechanism, etc.). Specifically, for example, the electrical doubling device disclosed in Japanese Patent Application Publication No. 2008-30599 can be incorporated. Because the configuration and basic operations of such an electrical booster are publicly known, detailed descriptions thereof will be omitted. The brake ECU 200 and peripheral configuration thereof in the present embodiment is one in which a third EDU to be connected with the CPU 150 is provided in FIG. 3. The third EDU is a motor driver including a drive circuit for the motor 214, and is operated based on a command signal from the CPU 150 during a normal operation. In the embodiment, the STP signal is inputted into the third EDU. The STP signal may not be inputted into the second EDU 158.

When the brake pedal 12 is stepped on when the CPU 150, etc., is in a fail state, it becomes a state in which the STP signal is inputted to the third EDU although a command signal from the CPU 150 to the third EDU is interrupted. At the time, the third EDU issues a start-up command to the electrical booster 212 so as to rotationally drive the motor 214. As a result, the brake fluid is discharged from each of the fluid pressure chambers as illustrated by the arrows in FIG. 7. That is, because the cut-off valve 30 is in an open state at the time, the brake fluid discharged from the primary chamber 14a is supplied to the wheel cylinder 20FL in the left front wheel through the pipelines B and G. Also, because the opening/closing valve 26 is in a closed state and the cut-off valve 28 is in an open state, the brake fluid discharged from the secondary chamber 14b is supplied to the wheel cylinder 20FR in the right front wheel through the pipelines A and F. That is, even if the CPU 150, etc., is in a fail state, braking force is provided to the front wheels (which may be the driving wheels) while the brake pedal 12 is being stepped on, and accordingly it becomes possible to stop the vehicle stably.

In the present embodiment, the fluid pressure control in a fail state is executed in the pattern illustrated in FIG. 8. That is, when the STP signal is inputted, the rotation speed of the motor 214 is set to be R21, which will be reduced to R22 after a predetermined period of time Δt21 elapses. Subsequently, when the input of the STP signal is ended by the release of the brake pedal 12, the rotation speed thereof is made to gradually approach zero. The rotation speed thereof may be determined by installing a resolver or a hall IC in the motor 214.

In the present embodiment, although the motor 214 is rotated when a fail state occurs, a restriction for pressure increase is provided such that excessive braking force may not be exerted, in which it is made that the integrated value of the number of rotations of the motor 214 (which corresponds to the area portion represented by the diagonal lines in FIG. 8) is not greater than or equal to the reference number of rotations thereof, which has been preset. For example, when the integrated value of the number of rotations thereof is equivalent to 10 mm of a pedal stroke, the same effect as in the case where the stepping-on of 10 mm is added to the stepping-on of a driver's brake operation, can be obtained. The number of rotations may be corrected in accordance with vehicle speed. For example, it may be made that, with the increase in vehicle speed, the restriction for pressure increase is relaxed.

In such a configuration, the following equation (4) is satisfied when there is no restriction for pressure increase, and the following equation (5) is satisfied when there is a restriction therefore:

(No Restriction for Pressure Increase)

$$PMC\_FL \times S = Flod - F\mu - \alpha \quad (4)$$

where Fμ: frictional force of pedal
α: frictional force of piston, spring load of master cylinder, or the like
(A Restriction for Pressure Increase)

$$PMC\_FR \times S - F\mu = Flod + Fp - \alpha \quad (5)$$

where Fp: axial force by drive of motor 214
(Variation)

Figure 9A:
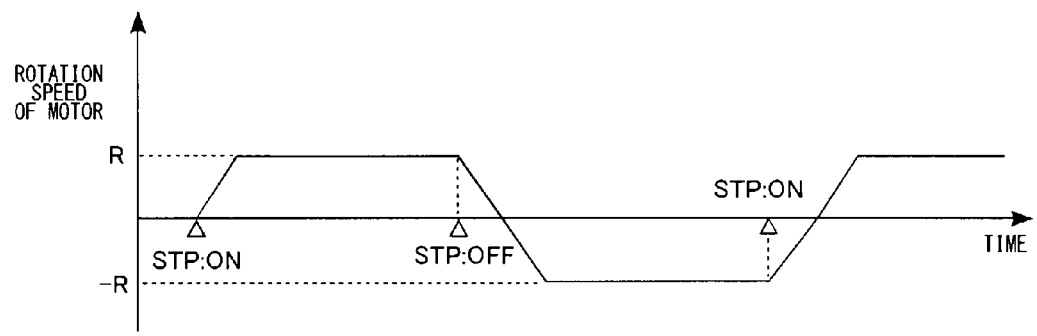
FIGS. 9(A) and 9(B) are timing charts illustrating a fail-safe control method according to a variation of the second embodiment.
Figure 9B:
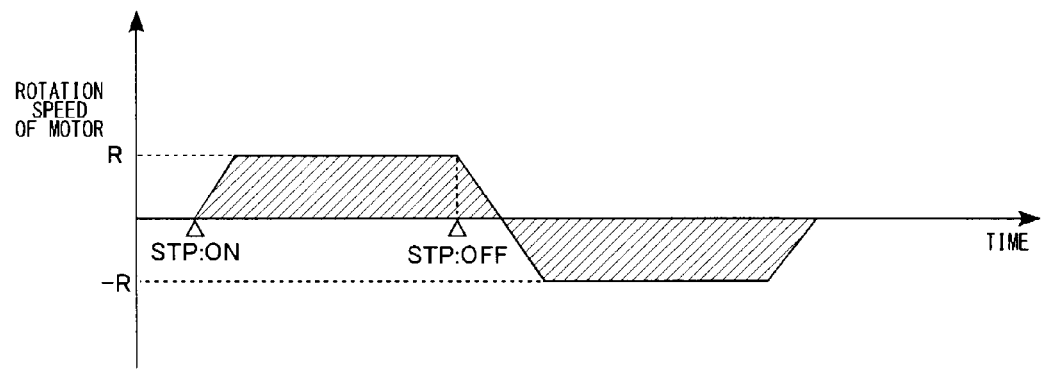

FIGS. 9(A) and 9(B) are timing charts illustrating a fail-safe control method according to a variation of the second embodiment. FIG. 9(A) illustrates one variation thereof and FIG. 9(B) illustrates another variation thereof. In the above second embodiment, an example has been described, in which the drive of the motor 214 is turned off when the number of rotations of the motor 214 reaches a reference number of rotations in the fail-safe control; however, it may be made that the drive of the motor 214 is continued as long as there is a driver's braking request by stepping on the brake pedal 12.

That is, it may be made that, as illustrated in FIG. 9(A), when the STP signal is turned on in a fail state, the rotation of the motor 214 is initiated and held at the maximum rotation speed R; and when the STP signal is turned off, the rotation of the motor 214 is held at the maximum rotation speed R by reversely rotating the motor 214 (in FIG. 9(A), the maximum rotation speed is denoted with "−R" due to its reverse direction). When the STP signal is again turned on during the reverse rotation thereof, the motor may be again rotated normally.

When the STP signal is not turned on during the reverse rotation thereof, it is desirable that the motor 214 is stopped at the time when the integrated values of the numbers of rotations (which correspond to the area portions represented by diagonal lines in FIG. 9(B)) during the normal rotation and during the reverse rotation are almost equal to each other, as illustrated in FIG. 9(B). With such a measure, it can be prevented that the first piston may be returned too much.

Alternatively, a clutch may be provided between the motor 214 and the transmission mechanism. It may be set that a load greater than or equal to a certain value is not transmitted by applying a load to the clutch disk thereof. It may be made that, with the aforementioned measure, excessive braking force is not exerted when the rotation of the motor 214 is continued by turning the STP signal on.

Third Embodiment

Figure 10:
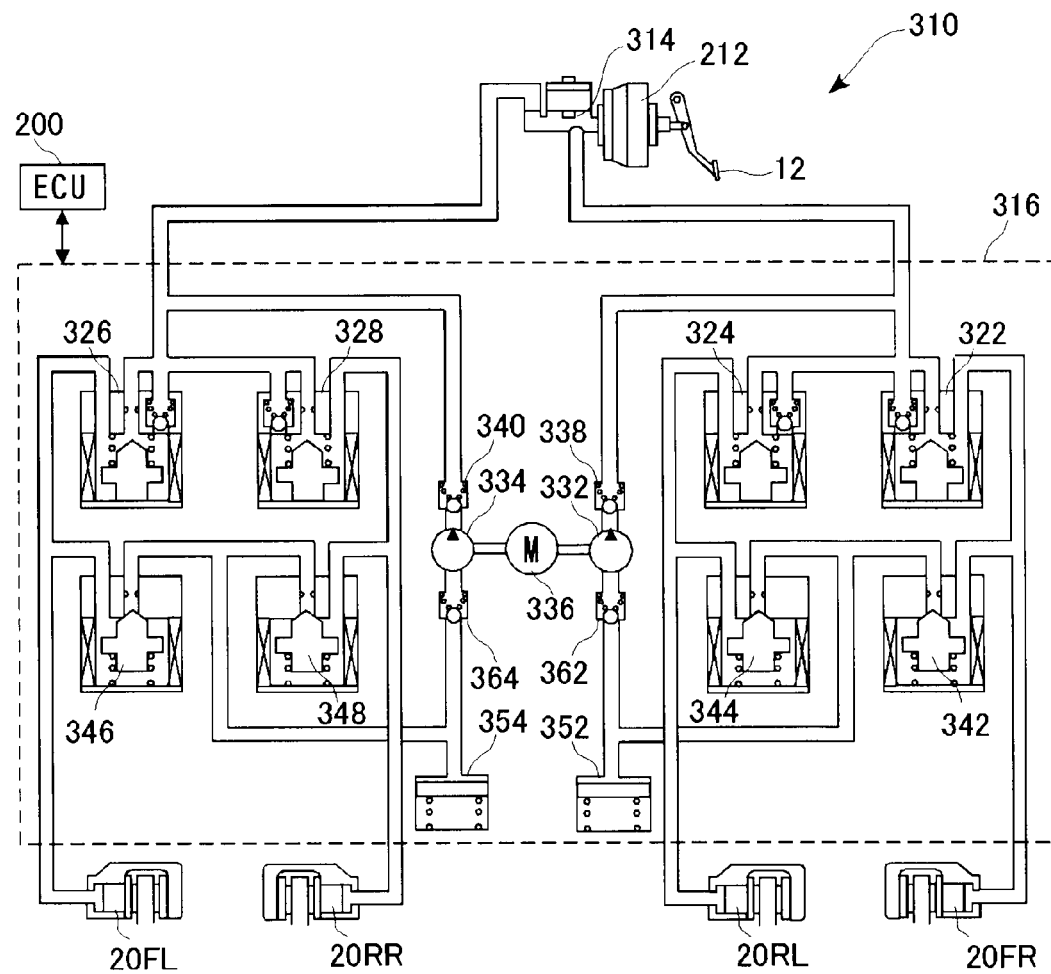
FIG. 10 is a systematic view illustrating a braking apparatus according to a third embodiment, centered on the fluid pressure circuit thereof.

Subsequently, a third embodiment according to the present invention will be described. In the embodiment, the reservoir is built in the fluid pressure actuator, and the fail-safe control is executed by using the brake fluid retained in the built-in reservoir. FIG. 10 is a systematic view illustrating a braking apparatus according to the third embodiment, centered on the fluid pressure circuit thereof. In the embodiment, the same or like parts as in the first embodiment or the second embodiment are denoted with the same reference numerals, if necessary.

A braking apparatus 310 is configured as an apparatus in which the control for preventing lock of a wheel from occurring when a vehicle is rapidly braked or steered (ABS: Anti-lock Brake System) can be executed. The fluid pressure circuit in a fluid pressure actuator 316 is configured as a diagonal system in which the system for the right front wheel FR and the left rear wheel RL and the system for the left front wheel FL and the right rear wheel RR are independent from each other. Thereby, even if any failure occurs in one of the two systems, the function of the other system can be surely maintained. The electrical booster 212 is provided in a master cylinder 314.

Pressure-increasing valves 322 and 324, which are normally-open electromagnetic control valves, are connected, in parallel, with the output port on one side of the master cylinder 314. The wheel cylinder 20FR for the right front wheel FR is connected with the pressure-increasing valve 322 through a pipeline, and the wheel cylinder 20RL for the left rear wheels RL is connected with the pressure-increasing valve 324 through a pipeline. The discharge port of a fluid pressure pump 332 is connected between the pressure-increasing valves 322 and 324 and the master cylinder 314. Also, pressure-increasing valves 326 and 328, which are normally-open electromagnetic control valves, are connected, in parallel, with the discharge port on the other side of the master cylinder 314. The wheel cylinder 20FL for the left front wheel FL is connected with the pressure-increasing valve 326 through a pipeline, and the wheel cylinder 20RR for the right rear wheel RR is connected with the pressure-increasing valve 328 through a pipeline. The discharge port of a fluid pressure pump 334 is connected between the pressure-increasing valves 326 and 328 and the master cylinder 314. The fluid pressure pumps 332 and 334, which are driven by an electrical motor 336, are connected with the master cylinder 314 through check valves 338 and 340, respectively. When these fluid pressure pumps 332 and 334 are operated, the brake fluid whose pressure is increased to a predetermined value is supplied to the wheel cylinders 20FR to 20RR.

Further, a pressure-reducing valve 342, which is a normally-closed electromagnetic control valve, is connected with the wheel cylinder 20FR, and a pressure-reducing valve 344, which is a normally-closed electromagnetic control valve, is connected with the wheel cylinder 20RL. The ports on the downstream sides of the pressure-reducing valves 342 and 344 are connected with a reservoir 352 and also connected with the suction port of the fluid pressure pump 332 through a check valve 362. Also, a pressure-reducing valve 346, which is a normally-closed electromagnetic control valve, is connected with the wheel cylinder 20FL, and a pressure-reducing valve 348, which is a normally-closed electromagnetic control valve, is connected with the wheel cylinder 20RR. The ports on the downstream sides of the pressure-reducing valves 346 and 348 are connected with a reservoir 354 and also connected with the suction port of the fluid pressure pump 334 through a check valve 364. Each of the reservoirs 352 and 354 includes a piston and a spring, and houses the brake fluid flowing into from the wheel cylinders 20FR to 20RR through the pressure-reducing valves 342 to 348. The fluid pressure in the wheel cylinders 20FR to 20RR can be reduced by discharging the brake fluid therefrom through the pressure-reducing valves 342 to 348.

Each of the pressure-increasing valves 322 to 328 and the pressure-reducing valves 342 to 348 is a two-port, two-position electromagnetic switching valve with a solenoid coil. Each of the pressure-increasing valves 322 to 328 and the pressure-reducing valves 342 to 348 is set to be at the illustrated first position when the solenoid coil is not powered, so that the wheel cylinders 20FR to 20RR communicate with the master cylinder 314. Each of the pressure-increasing valves 322 to 328 and the pressure-reducing valves 342 to 348 is set to be at the second position when the solenoid coil is powered, so that the wheel cylinders 20FR to 20RR are cut off from the master cylinder 314 and communicate with the reservoir 352 or 354. The check valves 338, 340, 362, and 364 permit the distribution of the brake fluid from the wheel cylinders 20FR to 20RR and the reservoir 352 and 354 to the master cylinder 314, but cut off the opposite flow.

It becomes possible to increase, reduce, or hold the brake fluid pressure in each of the wheel cylinders 20FR to 20RR by controlling the powering state of the solenoid coil in each of the pressure-increasing valves 322 to 328 and the pressure-reducing valves 342 to 348. That is, when the solenoid coil in each of the pressure-increasing valves 322 to 328 and the pressure-reducing valves 342 to 348 is not powered, the brake fluid is supplied from the master cylinder 314 and the fluid pressure pump 332 or 334 to the wheel cylinders 20FR to 20RR, and thereby the brake fluid pressure in the each of the wheel cylinders 20FR to 20RR is increased. On the other hand, when the solenoid coil in each of the pressure-increasing valves 322 to 328 and the pressure-reducing valves 342 to 348 is powered, the wheel cylinders 20FR to 20RR communicate with the reservoir 352 or 354, and thereby the fluid pressure in each of the wheel cylinders 20FR to 20RR is reduced. In addition, when the solenoid coil in each of the pressure-increasing valves 322 to 328 is powered and when that in each of the pressure-reducing valves 342 to 348 is not powered, the fluid pressure in each of the wheel cylinders 41 to 44 is held. And, it becomes possible to gently increase or reduce the braking fluid pressure in each of the wheel cylinders 20FR to 20RR by adjusting the interval between when the aforementioned solenoid is powered and when it is not powered.

The configuration of the brake apparatus ECU 200 and its periphery in the present embodiment is one in which the first EDU 156 in FIG. 3 functions as a motor driver for the electrical booster 212 and the second EDU 158 in FIG. 3 functions as a motor drive for the electrical motor 336. A certain amount of the brake fluid is always reserved in each of the reservoirs 352 and 354. The reserve of the brake fluid can be achieved by increasing pressure with the electrical booster 212 while the pressure-reducing valves 342 to 348 are being opened. That is, it can be achieved in the following way: when the operational position of the electrical booster 212 (the number of rotations of the motor 214) reaches a predetermined position after the electrical booster 212 has been turned on, the electrical booster 212 is turned off and the pressure-reducing valves 342 to 348 are closed; and subsequently the operational position of the electrical booster 212 is returned to the initial position by reversely rotating the motor 212.

If the STP signal is inputted while a signal from the CRU 150 is being interrupted, the second EDU 158 initiates the fail-safe control and drives the electrical motor 336. Thereby, the brake fluid retained in the reservoir 352 is sucked and discharged, and supplied to the wheel cylinder 20FR through the pressure-increasing valve 322 that is in an open state. The brake fluid is also supplied to the wheel cylinder 20RL through the pressure-increasing valve 324 that is in an open state. Similarly, the brake fluid retained in the reservoir 354 is sucked and discharged, and supplied to the wheel cylinder 20FL through the pressure-increasing valve 326 that is in an open state. The brake fluid is also supplied to the wheel cylinder 20RR through the pressure-increasing valve 328 that is an open state. That is, if the CPU 150, etc., is in a fail state, braking force is provided to the front wheels while the brake pedal 12 is being stepped on, and accordingly it becomes possible to stop the vehicle stably.

(Variation)

Figure 11A:
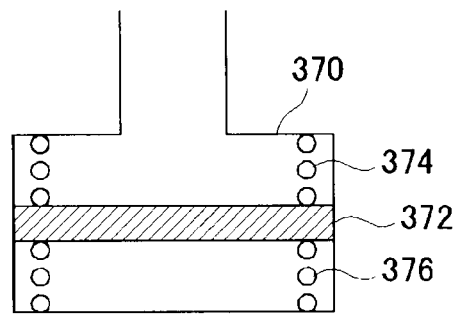
FIGS. 11(A) to 11(C) are views illustrating variations of a reservoir according to the third embodiment.
Figure 11B:
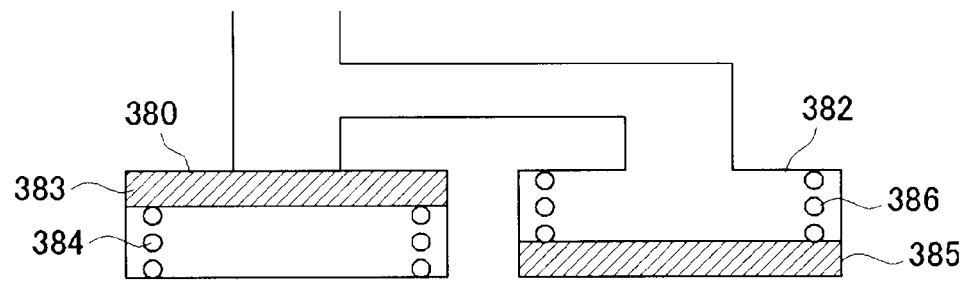
Figure 11C:
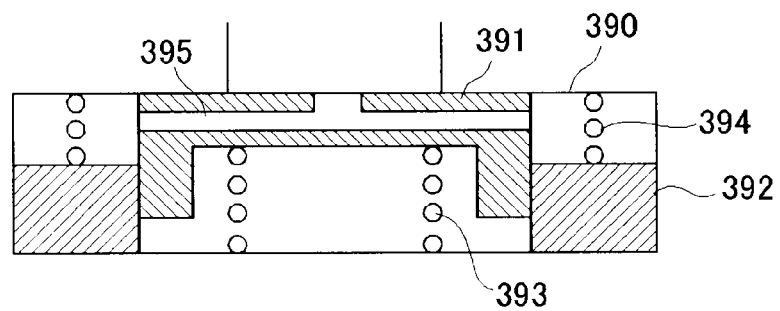

FIGS. 11(A) to 11(C) are views illustrating variations of the reservoir according to the third embodiment, each of which illustrates a variation different from each other.

That is, a method has been described in the aforementioned third embodiment, in which the electrical booster 212 is sequentially turned on because a certain amount of brake fluid is reserved in the reservoirs 352 and 354 illustrated in FIG. 10. In this variation, it may be made that the retention of the brake fluid is held by the configuration of the built-in reservoir, without the electrical booster 212 being operated as stated above.

Specifically, the reservoirs 352 and 354 may be replaced by a reservoir 370 in FIG. 11(A). That is, the reservoir 370 is provided with springs 374 and 376 on both the reservoir chamber side and the back pressure chamber side of a piston 372, respectively. With such a configuration, a reservoir chamber is always formed by the biasing force of the spring 374, so that the brake fluid is retained, and accordingly the retained brake fluid can be used when a fail state occurs.

Alternatively, the reservoirs 352 and 354 may be replaced by two reservoirs 380 and 382 illustrated in FIG. 11(B), respectively. That is, while the reservoir 380 is provided with a spring 384 on the back pressure side of a piston 383 in the same way as the reservoirs 352 and 354, the reservoir 382 is provided with a spring 386 on the reservoir chamber side of a piston 385. With such a configuration, a reservoir chamber is always formed in the reservoir 382, and accordingly the retained brake fluid can be used when a fail state occurs.

Alternatively, the reservoirs 352 and 354 may be replaced by a reservoir 390 illustrated in FIG. 11(C), respectively. The reservoir 390 is provided with a concentric double piston. That is, the reservoir 390 has a bottomed tubular first piston 391 and a ring-shaped second piston 392 such that the first piston 391 slides along the inner circumferential surface of the second piston 392. A spring 393 is provided on the back pressure side of the first piston 392 and a spring 394 is provided on the reservoir chamber side of the second piston 392. A communication channel 395 by which the reservoir chamber of the second piston 392 and the fluid pressure circuit communicate with each other is provided in the first piston 391. With such a configuration, the brake fluid is always retained in the space on the reservoir chamber side of the second piston 392, and accordingly the retained brake fluid can be used when a fail state occurs.

Fourth Embodiment

Figure 12:
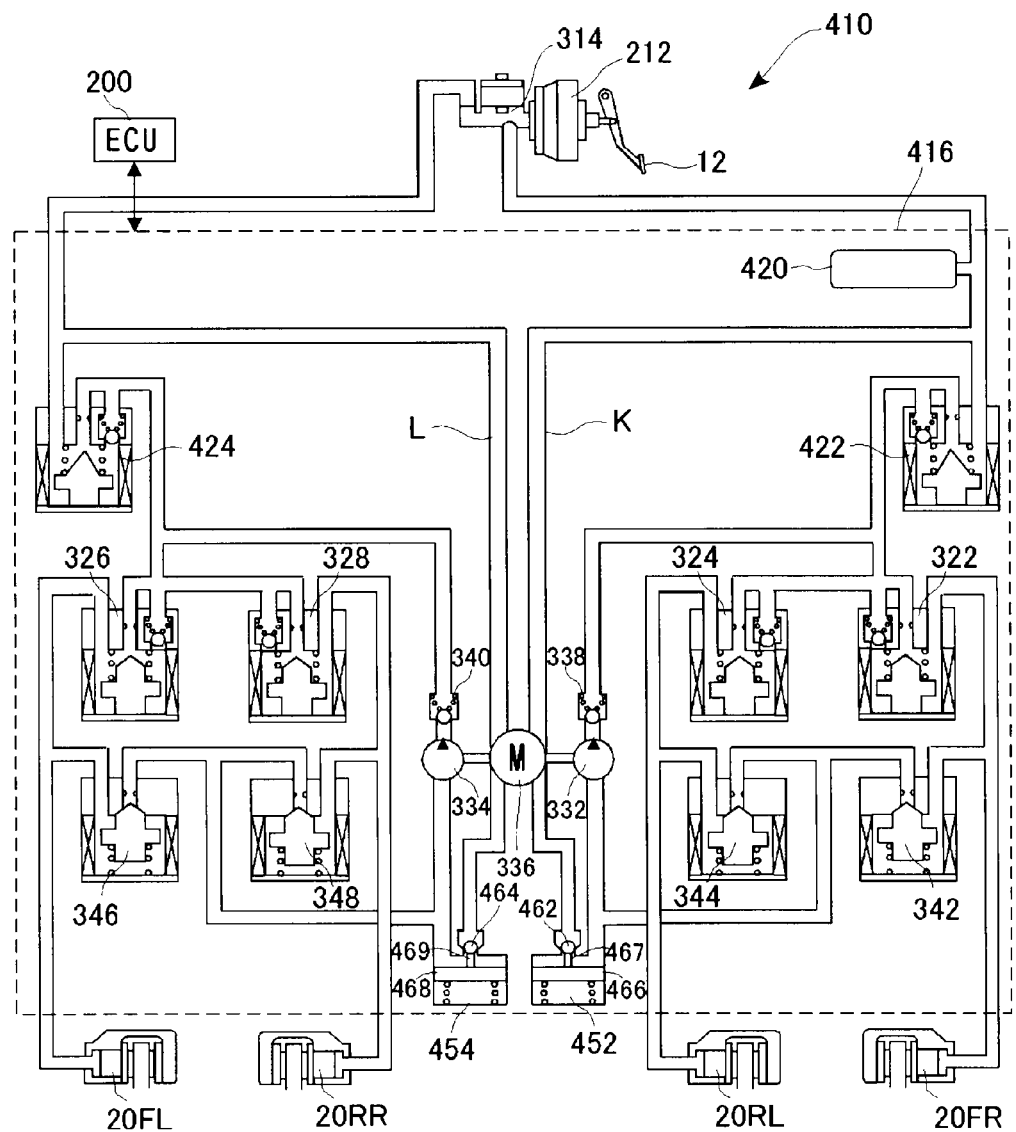
FIG. 12 is a systematic view illustrating a braking apparatus according to a fourth embodiment, centered on the fluid pressure circuit thereof.

Subsequently, a fourth embodiment according to the present invention will be described. The embodiment has a fluid pressure circuit configuration slightly more complicated than that in the third embodiment. FIG. 12 is a systematic view illustrating a braking apparatus according to the fourth embodiment, centered on the fluid pressure circuit thereof. In the present embodiment, the same or like parts as in the third embodiment will be denoted with the same reference numerals, if necessary.

A braking apparatus 410 is configured as an apparatus in which the control for suppressing a side-slip of a wheel during turning of a vehicle (VSC: Vehicle Stability Control) can be executed, and a fluid pressure circuit 416 having a fluid pressure circuit configuration similar to that in the third embodiment illustrated in FIG. 10. In the fluid pressure circuit 416, a master cut valve 422 is provided in the pipeline connecting the pressure-increasing valves 322 and 324 and the fluid pressure pump 332 with the master cylinder 314; and a master cut valve 424 is provided in the pipeline connecting the pressure increasing valves 326 and 328 and the fluid pressure pump 334 with the master cylinder 314. Each of the master cut valves 422 and 424 is composed of a normally-open linear control valve and is controlled so as to have the valve opening degree in accordance with an amount of power supply. A fluid pressure sensor 420 for detecting the master cylinder pressure is provided in the pipeline connecting the master cut valve 422 and the master cylinder 314.

Each of the reservoirs 452 and 454, which are built in the fluid pressure actuator 416, has a configuration different from that of each of the reservoirs 352 and 354. That is, the reservoir 452 is made to communicate with the pressure-reducing valves 342 and 344 and the fluid pressure pump 332, and is connected with the upstream side of the master cut valve 422 through a pipeline K. A valve seat is formed in the connection portion between the pipeline K and the reservoir 452, and with a ball valve body 462 being attached/detached to/from the valve seat, the pipeline K is cut off/opened. The ball valve body 462 is integrally fixed to a piston 466 in the reservoir 452 through a rod 467. Because the upstream side of the master cut valve 422 usually has higher pressure, the ball valve body 462 is made to be in a closed state. As a result, the piston 466 is pressed down by the ball valve body 462 such that a reservoir chamber is always formed in the reservoir 452.

Similarly, the reservoir 454 is made to communicate with the pressure-reducing valves 346 and 348 and the fluid pressure pump 334, and connected with the upstream side of the master cut valve 424 through a pipeline L. A valve seat is formed in the connection portion between the pipeline L and the reservoir 454, and with a ball valve body 464 being attached/detached to/from the valve seat, the pipeline L is cut off/opened. The ball valve body 464 is integrally fixed to a piston 468 in the reservoir 454 through a rod 469. Because the upstream side of the master cut valve 424 usually has higher pressure, the ball valve is made to be in a closed state. As a result, the piston 468 is pressed down by the ball valve body 464 such that a reservoir chamber is always formed in the reservoir 454.

If the STP signal is inputted while a signal from the CRU 150 is being interrupted, the second EDU 158 initiates the fail-safe control and drives the electrical motor 336. Thereby, the brake fluid retained in the reservoir 452 is sucked and discharged, and supplied to the wheel cylinder 20FR through the pressure-increasing valve 322 that is in an open state. The brake fluid is also supplied to the wheel cylinder 20RL through the pressure-increasing valve 324 that is in an open state. Similarly, the brake fluid retained in the reservoir 454 is sucked and discharged, and supplied to the wheel cylinder 20FL through the pressure-increasing valve 326 that is in an open state. The brake fluid is also supplied to the wheel cylinder 20RR through the pressure-increasing valve 328 that is an open state. That is, if the CPU 150, etc., is in a fail state, braking force is provided to the front wheels while the brake pedal 12 is being stepped on, and accordingly it becomes possible to stop the vehicle stably.

Fifth Embodiment

Figure 13:
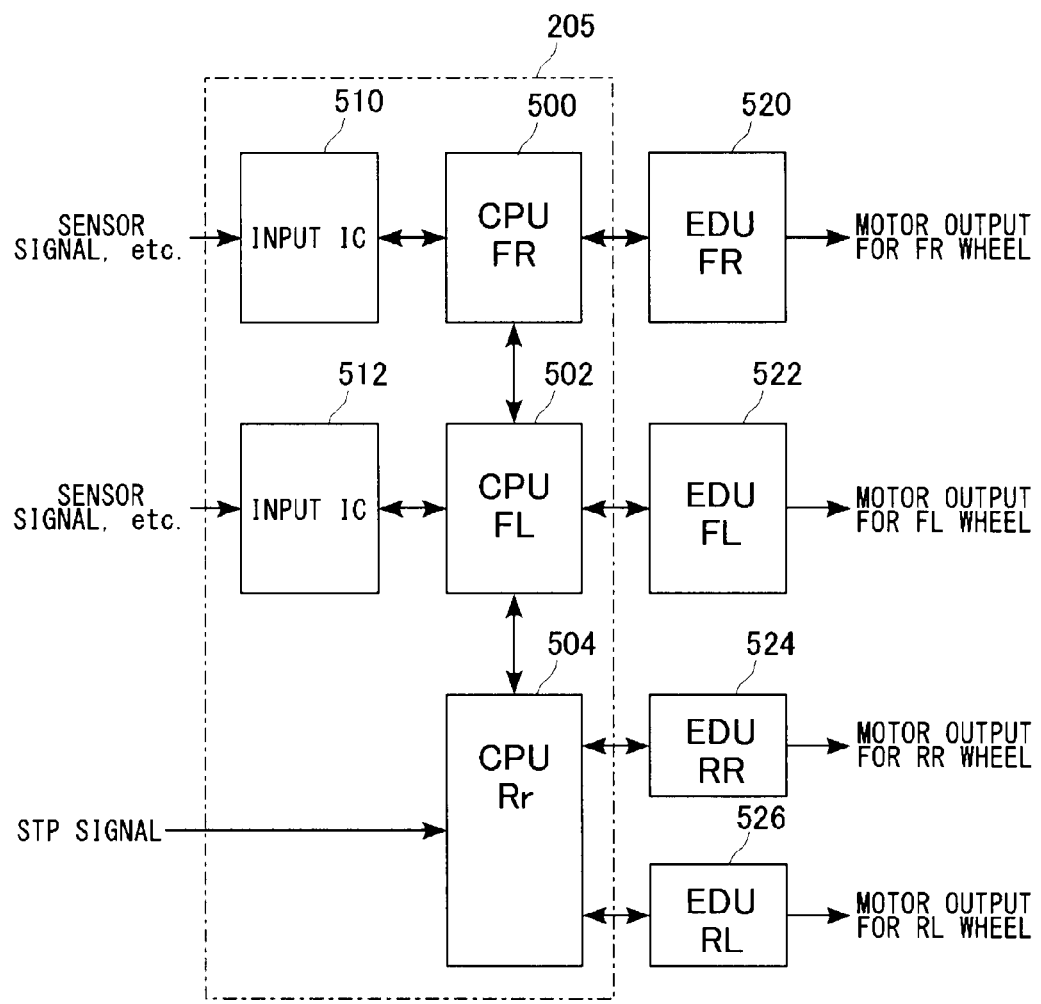
FIG. 13 is a view schematically illustrating the electrical configuration of a brake ECU and the major part of its periphery.

Subsequently, a fifth embodiment according to the present invention will be described. In the embodiment, the fail-safe control is applied to an electrical braking apparatus. FIG. 13 is a view schematically illustrating the electrical configuration of a brake ECU and the major part of its periphery.

In the braking apparatus according to the present embodiment, an in-wheel motor is arranged in each of the right front wheel FR, the left front wheel FL, the right rear wheel RR, and the left rear wheel RL. The drive of the in-wheel motor is controlled by a brake ECU 205. The brake ECU 205 calculates a motor command value (torque command value) based on the operation amount of the accelerator by a driver, which is inputted from the accelerator pedal, and outputs a command signal to the EDU, which is a motor driver for each wheel, so that the power supply to the in-wheel motor is controlled. When a deceleration request is inputted by a driver operating the brake pedal, the ECU executes regenerative braking by making the in-wheel motor function as an electrical generator, and the ECU can have a battery charged, if necessary. Because such a control of the in-wheel motor method itself is publicly known, detailed description thereof will be omitted.

As illustrated in FIG. 13, the brake ECU 205 is configured such that a microcomputer including a CPU 500 for the right front wheel, a CPU 502 for the left front wheel, and a CPU 504 for the rear wheels, is centered, and the ECU 205 includes, besides the CPUs, a ROM, a RAM, an input/output port, and a communication port, etc. Every CPU is connected with each other through a communication line such that signals can be mutually delivered. The CPU 500 calculates target braking force and a control command value for the right front wheel FR based on the signals, etc., which have been inputted from various sensors and switches through the input IC 510. The CPU 500 then outputs a command signal based on the calculation result to an EDU 520 to control the driving state of the in-wheel motor in the right front wheel FR. The CPU 502 calculates target braking force and a control command value for the left front wheel FL based on the signals, etc., which have been inputted from various sensors and switches through an input IC 512. The CPU 502 then outputs a command signal based on the calculation result to an EDU 522 to control the driving state of the in-wheel motor in the left front wheel FL. The information that has been inputted into the CPUs 500 and 502 through the input ICs 510 and 512 are also inputted into a CPU 504 through a communication line.

Figure 14A:
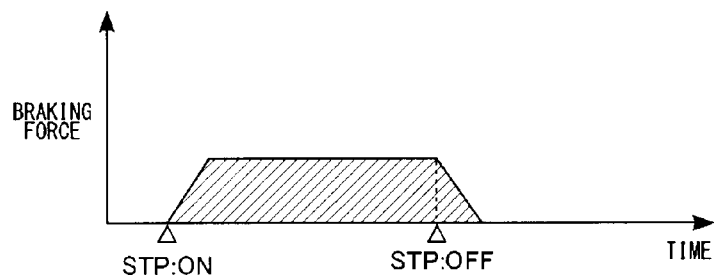
FIGS. 14(A) and 14(B) are timing charts illustrating fail-safe control methods.
Figure 14B:
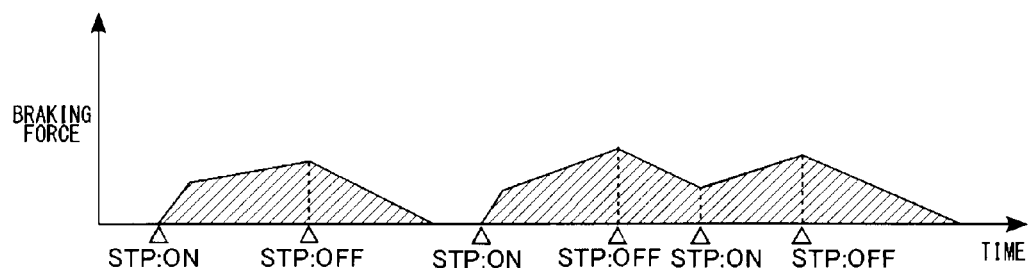

The CPU 504 calculates target braking force and a control command value for the right rear wheel RR based on the inputted information, and then outputs a command signal based on the calculation result to an EDU 524 to control the driving state of the in-wheel motor in the left right rear wheel RR. Also, the CPU 504 calculates target braking force and a control command value for the left rear wheel RL based on the inputted information, and then outputs a command signal based on the calculation result to an EDU 526 to control the driving state of the in-wheel motor in the left rear wheel RL. In the present embodiment, a stop lamp switch signal (STP signal) is inputted into the CPU 504 that controls the rear wheels. When the CPU 500 or 502, or the like is in a fail state, the CPU 504 controls the drive of the rear wheels in accordance with the presence or absence of the STP signal, so that at least the minimum braking force is secured. That is, when the CPU 500 or 502, or the like is in a fail state, the input of a signal from the CPU, which is associated with the fail, to the CPU 504 is interrupted. Accordingly, when a signal is not inputted from the CPUs 500 and 502 in spite of the STP signal being inputted by stepping-on of the brake pedal 12, the CPU 504 provides braking force by controlling the in-wheel motors in the rear wheels as the fail-safe processing FIGS. 14(A) and 14(B) are timing charts illustrating fail-safe control methods. While FIG. 14(A) illustrates a control method according to the present embodiment, FIG. 14(B) illustrates that according to a variation. The vertical axis of each view represents braking force, and the horizontal axis thereof represents elapsed time. In the embodiment, the fail-safe control in a fail state is executed in the pattern illustrated in FIG. 14(A). That is, when the STP signal is inputted, the CPU 504 controls the in-wheel motors in the rear wheels such that braking force is generated. The CPU 504 holds the braking force at a preset maximum value, and makes the braking force gradually approach zero when the input of the STP signal has been ended. In the embodiment, a restriction is provided such that excessive braking force may not be exerted on the rear wheels in a fail state, in which it is made that the integrated value of the braking force (which corresponds to the area portion represented by the diagonal lines in FIG. 14(A)) is not greater than or equal to a preset reference value. For example, when the integrated value of the braking force is equivalent to the braking value occurring when a pedal stroke is 10 mm, the same effect as in the case where the stepping-on of 10 mm is added to the brake operation of a driver, can be obtained.

In a variation, as long as a fail state is being continued, the braking control may be continued as illustrated in FIG. 14(B), in which, when the STP signal is turned on, the braking control is increased within a range where the ABS control or the VSC control is not operated, and when the STP signal is turned off, the braking control is relaxed.

Sixth Embodiment

Figure 15:
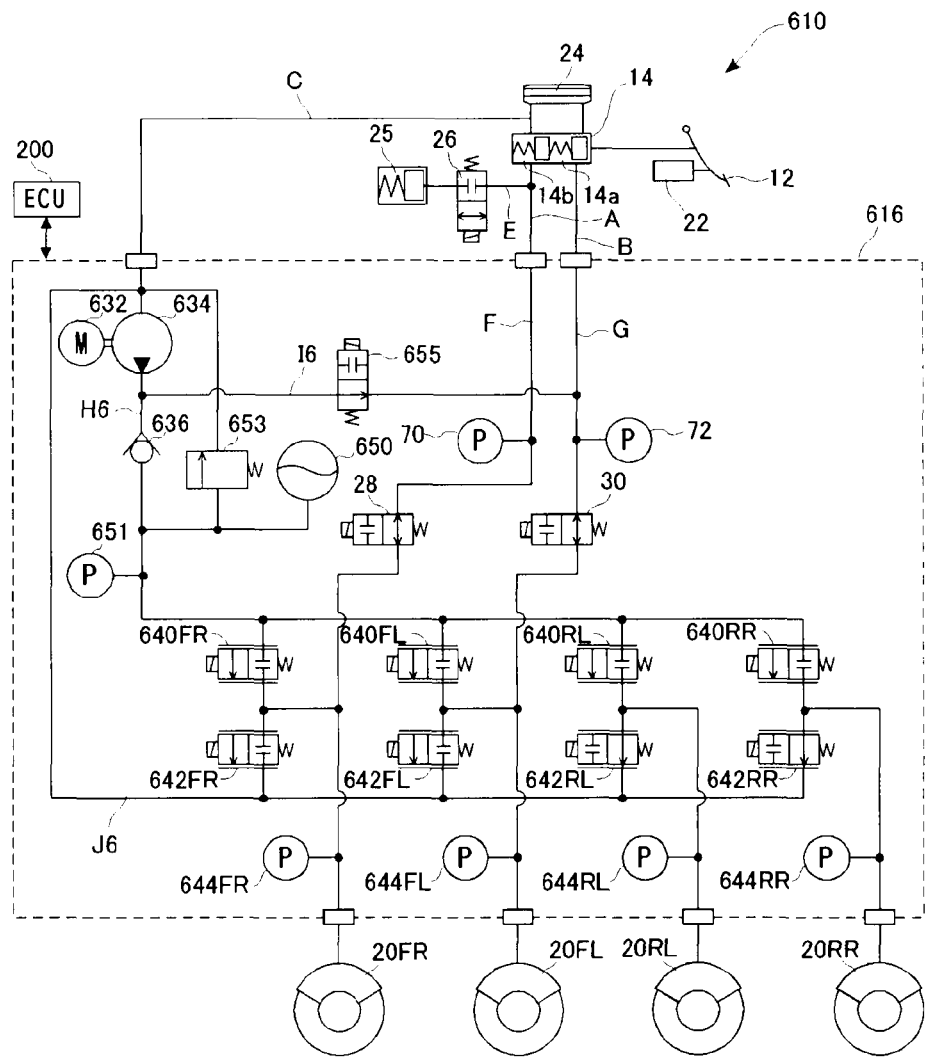
FIG. 15 is a systematic view illustrating a braking apparatus according to a sixth embodiment, centered on the fluid pressure circuit thereof.
Figure 16:
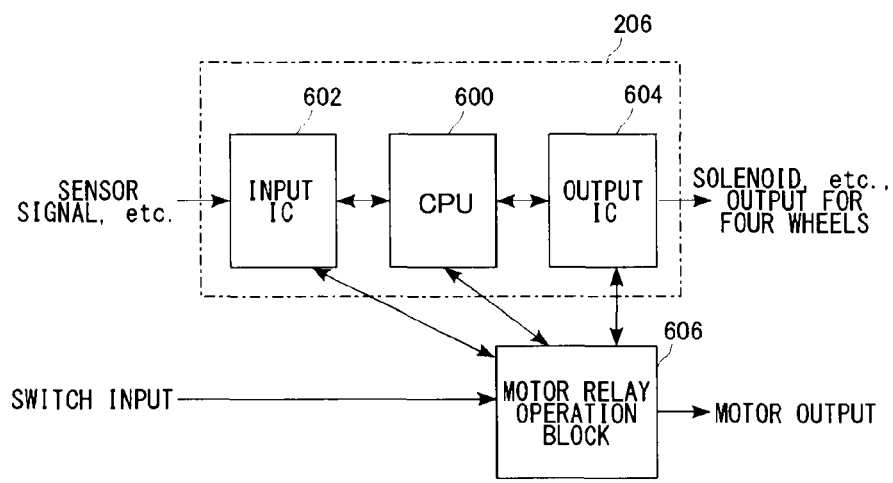
FIG. 16 is a view schematically illustrating the electrical configuration of a brake ECU and the major part of its periphery.

Subsequently, a sixth embodiment according to the present invention will be described. The configuration of a fluid pressure circuit in the embodiment is different from that in the first embodiment, etc. FIG. 15 is a systematic view illustrating a braking apparatus according to the sixth embodiment, centered on the fluid pressure circuit thereof. In the embodiment, the same or like parts as in the first embodiment are denoted with the same reference numerals, if necessary. FIG. 16 is a view schematically illustrating the electrical configuration of a brake ECU and the major part of its periphery.

A braking apparatus 610 includes a fluid pressure actuator 616 of a different type from that in the braking apparatus 10 in the first embodiment. The suction port of a pump 634, which is driven by a motor 632, is connected with one end of the pipeline C whose other end is connected with the reservoir 24. The discharge port of the pump 634 is connected with a high-pressure pipeline H6 that forms a high-pressure channel, and an accumulator 650 and a relief valve 653 are connected with the high-pressure pipeline H6. The accumulator 650, the pump 634, and the motor 632 form a fluid pressure power source in which the fluid pressure of the brake fluid is accumulated. The communication between the suction port of the pump 634 and the high-pressure pipeline H6 is substantially cut off, while the pump 634 is not being driven. In the present embodiment, a gear pump that is rotationally driven by the motor 632 is adopted as the pump 634. A motor with a brush is adopted as the motor 632. A component that converts the pressure of the brake fluid into the pressure energy of the encapsulated gas, such as nitrogen, or the like, is adopted as the accumulator 650.

The accumulator 650 usually retains the brake fluid whose fluid pressure (hereinafter, referred to as the "accumulator pressure") is increased to a predetermined range (for example, approximately 8 to 12 MPa) by the pump 634. The outlet port of the relief valve 653 is connected with the high-pressure pipeline H6 such that, when the fluid pressure in the high-pressure pipeline H6 is abnormally increased to, for example, approximately 25 MPa, the relief valve 653 is made to be opened and the brake fluid with high pressure is returned into the reservoir tank 24 through the high-pressure pipeline H6. In addition, an accumulator pressure sensor 651 for detecting the fluid pressure of the operating fluid in the high-pressure pipeline H6 (the fluid pressure is equal to the accumulator pressure in the present embodiment), is provided in the high-pressure pipeline H6.

The high-pressure pipeline H6 is connected with the wheel cylinder 20FR for the right front wheel, the wheel cylinder 20FL for the left front wheel, the wheel cylinder 20RR for the right rear wheel, and the wheel cylinder 20RL for the left rear wheel, through the pressure-increasing valves 640FR, 640FL, 640RR, and 640RL. Hereinafter, the pressure-increasing valves 640FR to 640RL are collectively referred to as the "pressure-increasing valve 640". Any of the pressure-increasing valve 640 is a normally-closed electromagnetic flow control valve (linear valve) that is in a closed state when not powered and is used for increasing the pressure in the wheel cylinder 20, if necessary. A disk brake unit is provided for each of the non-illustrated wheels of a vehicle. Each of the brake disk units generates braking force by pressing a brake pad against a disk with an operation of the wheel cylinder 20.

The wheel cylinder 20FR for the right front wheel and the wheel cylinder 20FL for the left front wheel are connected to a hydraulic pressure supply and discharge pipe J6 through pressure-reducing valve 642FR or 642FL, respectively. Each of the pressure-reducing valves 642FR and 642FL is a normally-closed electromagnetic flow control valve (linear valve) used for reducing the pressure in each of the wheel cylinders 20FR and 20FL, if necessary. On the other hand, the wheel cylinder 20RR for the right rear wheel and the wheel cylinder 20RL for the left rear wheel are respectively connected with the hydraulic pressure supply and discharge pipe J6 through pressure-reducing valve 642RR or 642RL, which are normally-open electromagnetic flow control valves. Hereinafter, the pressure-reducing valves 642FR to 642RL are appropriately and collectively referred to as the "pressure-reducing valve 642".

Cylinder pressure sensors 644FR, 644FL, 644RR, and 644RL each detecting the wheel cylinder pressure, which is the pressure of the brake fluid acting on the corresponding wheel cylinder 20, are provided near the wheel cylinders 20FR to 20RL for the right front wheel, the left front wheel, the right rear wheel, and the left rear wheel, respectively. Hereinafter, the cylinder pressure sensors 644FR to 644RL are appropriately and collectively referred to as the "cylinder pressure sensor 644".

A bypass pipeline I6 (which functions as a "connecting flow channel") connecting the high-pressure pipeline H6 and the pipeline G is provided, and a communication valve 655 that is a normally-open electromagnetic flow control valve (which functions as an "opening/closing valve") is provided in the bypass pipeline I6. Also, a check valve 636 is provided between the connection point with the communication valve 655 in the high-pressure pipeline H6 and the accumulator 650 in order to regulate the flow of the brake fluid with high pressure, which is accumulated in the accumulator 650, toward the master cylinder 14 through the bypass pipeline I6.

The aforementioned cut-off valves 28 and 30, the pressure-increasing valves 640FR to 640RL, the pressure-reducing valves 642FR to 642RL, the pump 634, the accumulator 650, and the communication valve 655, etc., form the fluid pressure actuator 616 in the braking apparatus 610. The fluid pressure actuator 616 is controlled by a brake ECU 206 illustrated in FIG. 16.

The brake ECU 206 is configured such that a microcomputer including an CPU 600 for outputting control commands to actuators, such as electromagnetic control valves for controlling each of the wheel cylinder pressures in four wheels, is centered, and the ECU 206 includes, besides the CPU, a ROM, a RAM, an input/output port, and a communication port, etc. The CPU 600, an input IC 602, and an output IC 604 are connected with a motor relay operation block 606 that forms a drive circuit for the motor 632, through communication lines. The motor relay operation block 606 is composed of an analog circuit that can turn on/off the motor 632 by a command inputted from the CPU 600 and a switch input in accordance with whether an accumulator pressure is within a preset range.

The CPU 600 calculates target braking force and a control command value for each wheel based on the signals inputted from various sensors including the fluid pressure sensors through the input IC 602, etc., then outputs a command signal based on the calculation result to each electromagnetic control valve, etc., for each wheel through the output IC 604. The STP signal is also inputted into the motor relay operation block 606.

In the present embodiment, when the CPU 150, etc., is in a fail state, a serial signal, which is to be originally inputted from the CPU 600, is not inputted into the motor relay operation block 606 even when a driver issues a braking request by stepping on the brake pedal 12. When a signal is not inputted from the CPU 600 in spite of the STP signal being inputted by stepping-on of the brake pedal 12, the motor relay operation block 606 drives the motor 632 as the fail-safe processing to provide braking force to a predetermined wheel.

That is, when the CPU 600, etc., in the brake ECU 206 is in a fail state, each actuator, such as an electromagnetic control valve that forms the fluid pressure actuator 616, is not basically powered, but is made to be in a normal state. In such a case, when the brake pedal 12 is stepped on, the motor relay operation block 606 assumes that it is in a fail state when an input of a serial signal from the CPU 600 is interrupted in spite of the STP signal being inputted, and then drives the motor 632.

At the time, due to the operation of the pump 634, the brake fluid is pumped up from the reservoir tank 24 and discharged. Because the communication valve 655 is in an open state, the discharged brake fluid is introduced into the primary chamber 14a through the bypass pipeline I6 and the pipelines G and B. As a result, the master cylinder pressure is increased. At the time, because the cut-off valve 30 is in an open state, the brake Froude is supplied to the wheel cylinder 20FL in the left front wheel through the pipeline G. In addition, because the opening/closing valve 26 is in a closed state and the cut-off valve 28 is in an open state, the brake fluid in the secondary chamber 14b is pushed out to be supplied to the wheel cylinder 20FR in the right front wheel through the pipelines A and F. That is, even if the CPU 150, etc., is in a fail state, braking force is provided to the front wheels (which may be the driving wheels) while the brake pedal 12 is being stepped on, and accordingly it becomes possible to stop the vehicle stably.

(Variation)

Figure 17:
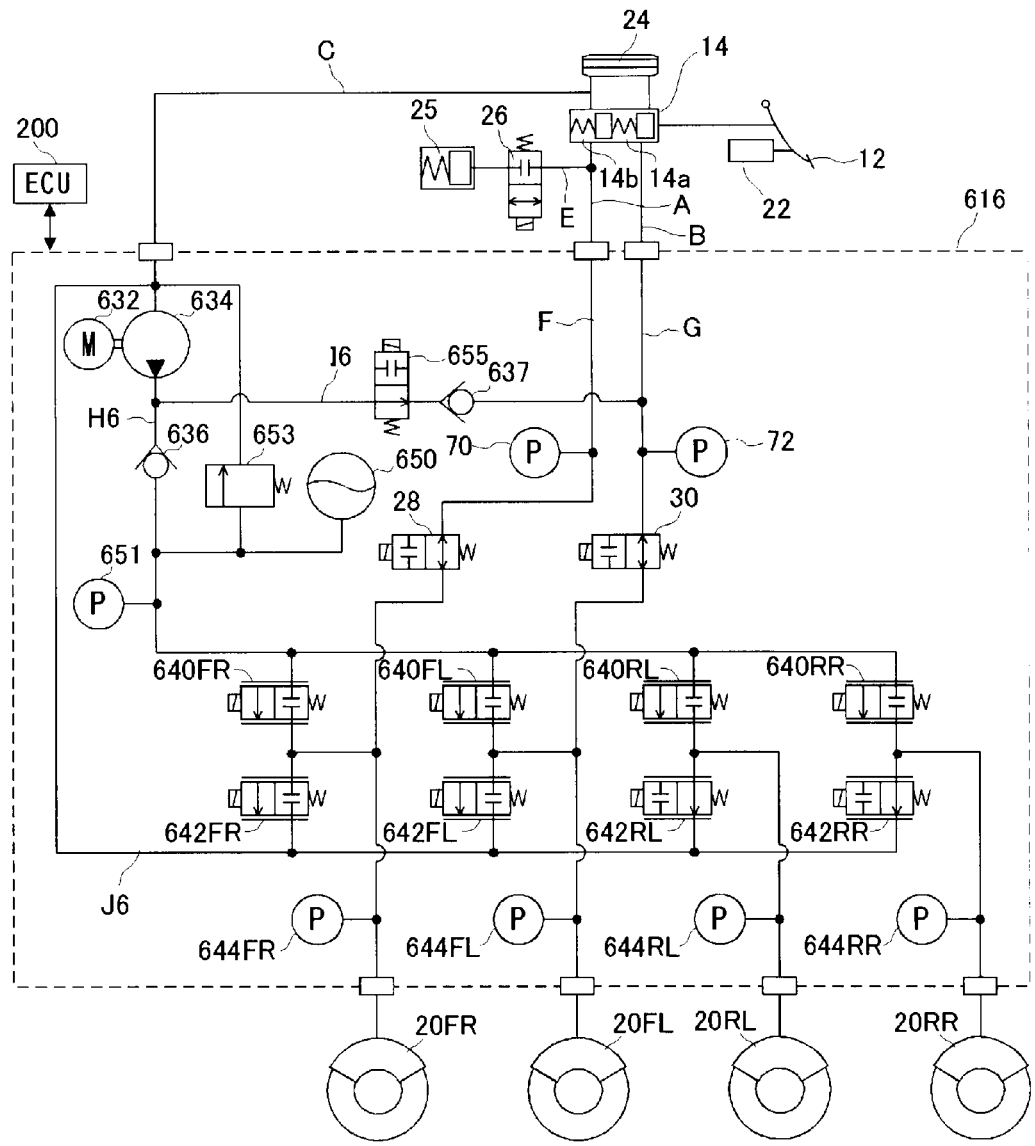
FIG. 17 is a view illustrating a variation of the sixth embodiment.

FIG. 17 is a view illustrating a variation of the sixth embodiment. In the present variation, a check valve 637 is provided on the master cylinder side of the communication valve 655 in the bypass pipeline I6. The check valve 637 is used for preventing the reverse flow of the brake fluid from the master cylinder 14 side toward the high-pressure pipeline H6. With such a configuration, when a fluid pressure power source including the pump 634 is in a fail state, without a failure in the CPU 150, etc., the fail-safe control using a manual fluid pressure source can be surely executed.

That is, when it is determined in the present variation that there is an abnormal state in the response of the wheel cylinder pressure control while the braking control using a fluid pressure power source is being executed, fail-safe processing is executed in which braking force is provided mechanically using a manual fluid pressure power source. At the time, the brake ECU 206 stops the supply of the control current to every electromagnetic control valve. As a result, the supply channel of the brake fluid is divided into two channels: the channel extending from the master cylinder 14 through the pipelines A and F; and the channel extending from the master cylinder 14 through the pipelines B and G. As a result, because braking force is provided to the front wheels while the brake pedal 12 is being stepped on, it becomes possible to stop the vehicle stably. According to the variation, it can be prevented by the check valve 637 that the brake fluid may flow out toward the high-pressure pipeline H6 through the bypass pipeline I6 when such fail-safe control is executed, and accordingly the fail-safe control can be made to function normally.

Seventh Embodiment

Figure 18:
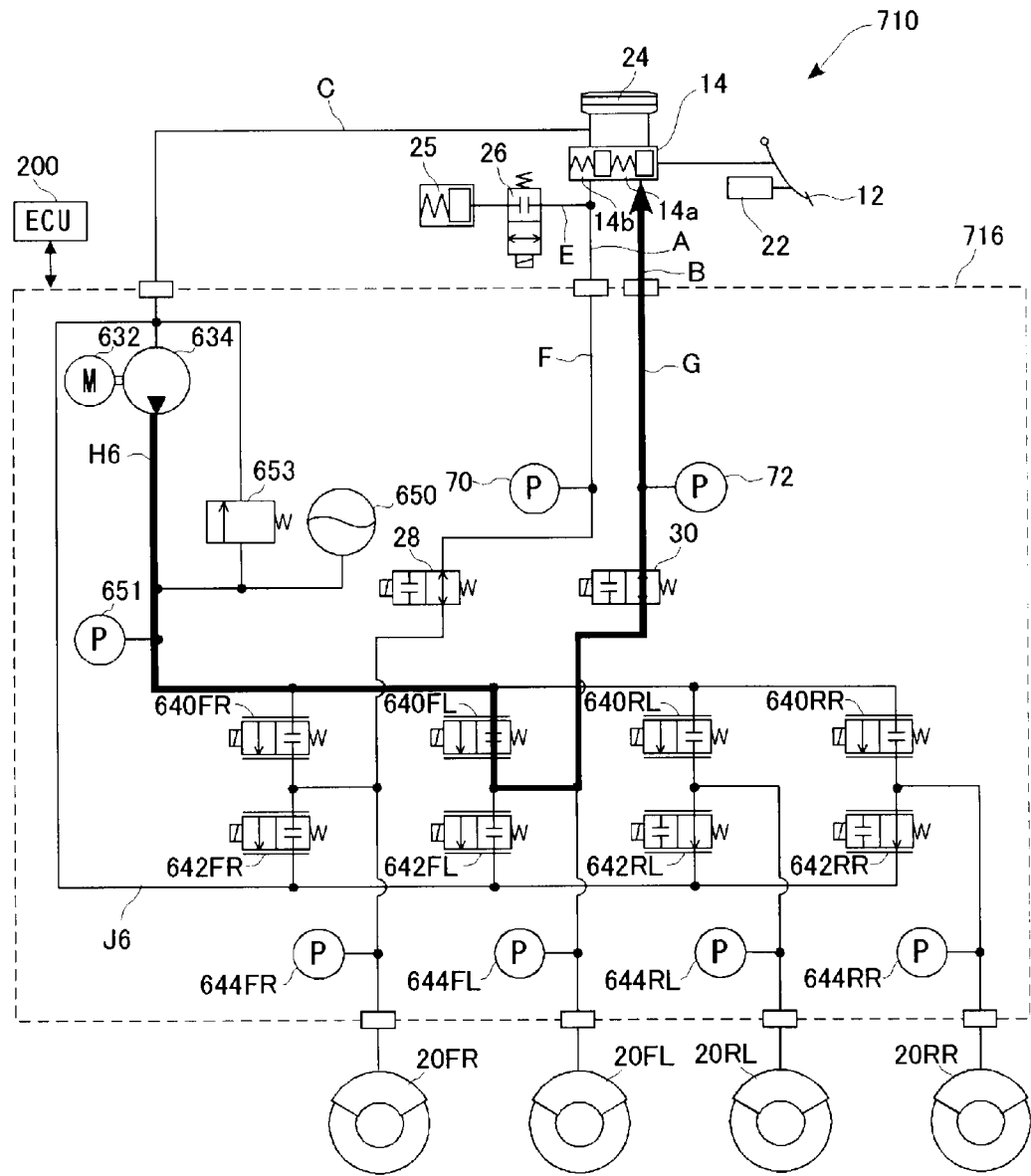
FIG. 18 is a systematic view illustrating a braking apparatus according to a seventh embodiment, centered on the fluid pressure circuit thereof.

Subsequently, a seventh embodiment according to the present invention will be described. In the embodiment, the fail-safe control can be achieved by adjusting the valve-opening characteristic of a specific pressure-increasing valve. FIG. 18 is a systematic view illustrating a braking apparatus according to the seventh embodiment, centered on the fluid pressure circuit thereof. In the embodiment, the same or like parts as in the sixth embodiment will be denoted with the same reference numerals, if necessary, and descriptions thereof will be omitted.

The bypass pipeline I6, the communication valve 655, and the check valve 636, which have been provided in the sixth embodiment, are not provided in a fluid pressure actuator 716 in a braking apparatus 710. However, the valve-opening pressure (the pressure at which the valve portion starts opening: anterior-posterior differential pressure) is set to be lower than those of other pressure-increasing valves 640FR, 640RR, and 640RL. The valve opening pressure is set to be lower than that of the relief valve 653.

When the CPU 600, etc., in the brake ECU 206 is in a fail state in such a configuration, the EDU 206 assumes that it is in a fail state when an input of a serial signal from the CPU 600 is interrupted in spite of the STP signal being inputted, and then intermittently drives the motor 632. At the time, the motor 632 is driven such that the accumulator pressure converges near the valve-opening pressure of the pressure-increasing valve 640FL. In other words, such a drive pattern is preset by experiments, etc. As a result, when the CPU 600, etc., is in a fail state, only the pressure-increasing valve 640FL is always made to be opened. At the time, the brake fluid that has passed through the pressure-increasing valve 640FL is introduced into the primary chamber 14a through the pipelines G and B, as illustrated by the arrow in FIG. 18. As a result, the master cylinder pressure is increased. Because the cut-off valve 30 is in an open state at the time, the brake fluid is also supplied to the wheel cylinder 20FL in the left front wheel. In addition, because the opening/closing valve 26 is in a closed state and the cut-off valve 28 is in an open state, the brake fluid in the secondary chamber 14b is pushed out, and is supplied to the wheel cylinder 20FR in the right front wheel through the pipelines A and F. That is, even if the CPU 600, etc., is in a fail state, braking force is provided to the front wheels (which may be the driving wheels) while the brake pedal 12 is being stepped on, and accordingly it becomes possible to stop the vehicle stably.

Alternatively, it may be made that, when the CPU 600, etc., is in a fail state, the motor 632 is driven such that the accumulator pressure is increased to a level greater than or equal to the valve-opening pressure of at least one of a plurality of pressure-increasing valves 640, which increase the pressure of the wheel cylinder 20 leading to the master cylinder, without reducing the valve-opening pressure of a specific pressure-increasing valve 640.

(Variation)

In the seventh embodiment, the discharge of the pump 634 is consumed by the accumulator 650 immediately after the CPU 600 is in a fail state. Accordingly, it can be considered that, when it is determined that it is in a fail state, the pump 634 is made to be intermittently driven in spite of the accumulation state in the accumulator 650; however, there still remains the possibility that sufficient response in executing the fail-safe control cannot be obtained even with the aforementioned measures. Therefore, when it determines that it is in a fail state, it may be made that: even if the accumulator pressure is within a preset range, the pump 634 is being turned on for a certain period of time; and after sufficient fluid pressure has been acquired, the pump 634 is made to be intermittently driven at preset intervals. Alternatively, it may be made that, when the power supply voltage is smaller than or equal to a preset value before it is determined that it is in a fail state, the accumulator pressure is made to be increased.

In the seventh embodiment, when the accumulator pressure is increased by driving the pump 634, heat is usually generated with the increase in the pressure, and when the drive of the pump 634 is stopped, the temperature is decreased, resulting in a decrease in the accumulator pressure. That is, when the increasing time of the accumulator pressure by the drive of the motor 634 is short, the pressure is substantially increased in an adiabatic change. It is assumed that, at the time, the fluid pressure (accumulator pressure) in the accumulator 650 is P1, the volume of the fluid is V1, and the temperature thereof is T1. When the pump 634 is turned off in this state, the temperature is decreased so as to approach the external ambient temperature T0. Assuming that, at the time, the fluid pressure (accumulator pressure) in the accumulator 650 is P2, the volume of the fluid is V2, and the temperature thereof is T0, P1·V1/T1=P2·V2/T0 is satisfied, P2=P1·T0/T1 holds. Herein, because T1>T0, P2<P1 holds. That is, the accumulator pressure is decreased. Accordingly, in the variation, it may be made that the duty-ratio of the current supplied to the pump 634 is increased immediately after the intermittent drive has been initiated, and thereafter the duty-ratio is gradually reduced. With such a manner, the temperature gradually approaches the ambient temperature T0 as stated above; however, the change in the temperature becomes gradually gentler as the temperature approaches T0 over time. Accordingly, the speed at which the accumulator pressure is decreased becomes gradually gentler. In addition, it can also be considered that the duty-ratio is increased once in the middle of the reduction thereof; however, it is desirable to gradually change the duty-ratio in terms of the stability of the fail-safe control itself.

In addition, in the seventh embodiment, because the brake fluid reversely flows into the master cylinder 14 in the fail-safe control, there is the possibility that the brake pedal 12 may be pushed back before the stop lamp is turned off in spite of the intention of a diver. Accordingly, there is the possibility that trouble may occur in the specification in which stepping-on of the brake pedal 12 is specified as a condition for engine start-up and shift change. Therefore, in the variation, it may be set that, when the CPU 600 is in a fail state, ON of the ignition switch and ON of the shift change may be permitted within a preset period of time that is longer than that during a normal state (for example, five seconds), even if the stop lamp switch is switched from ON to OFF.

Eighth Embodiment

Figure 19:
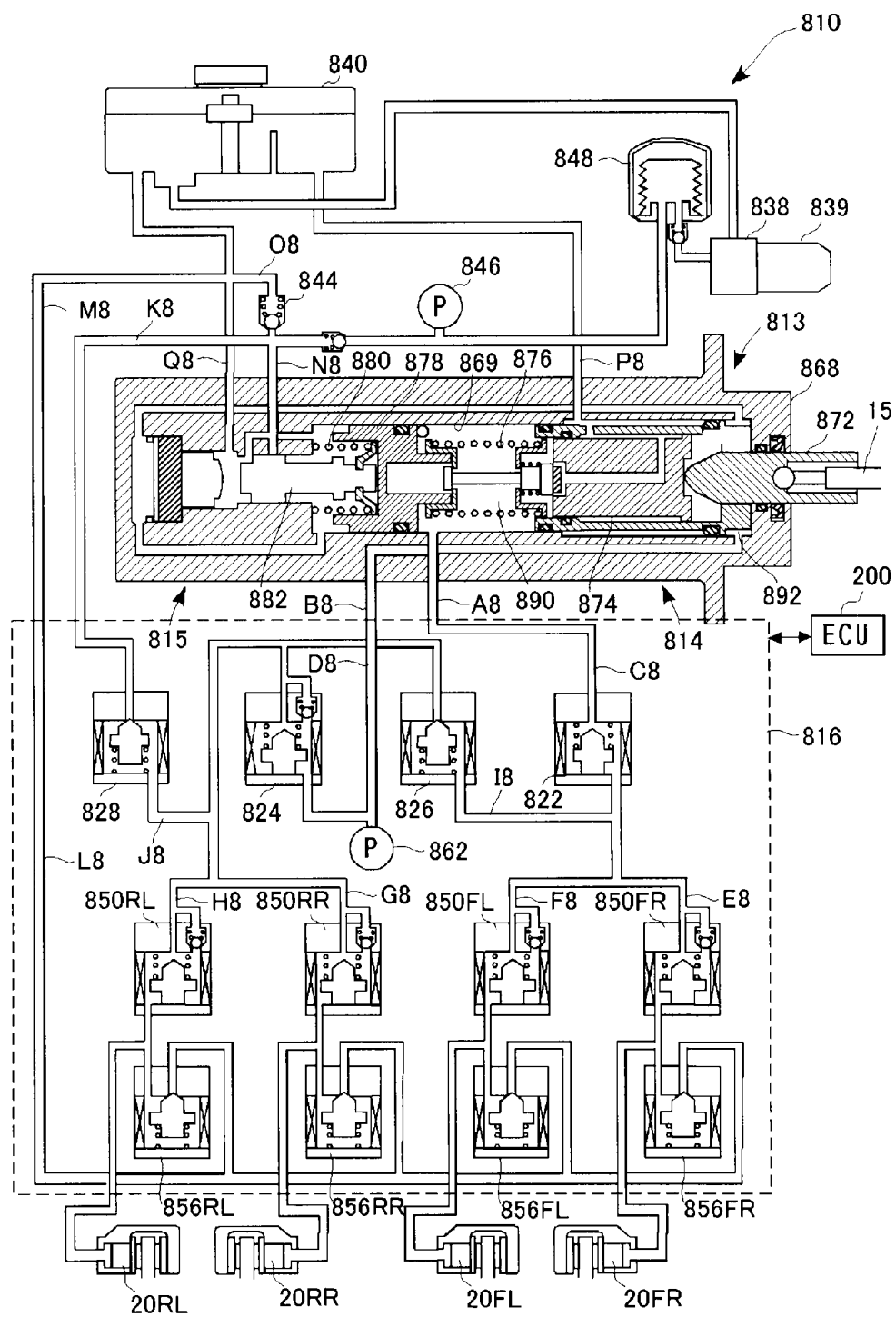
FIG. 19 is a systematic view illustrating a braking apparatus according to an eighth embodiment, centered on the fluid pressure circuit thereof.

Subsequently, an eighth embodiment according to the present invention will be described. In the embodiment, the configuration of a fluid pressure circuit is different from that in the first embodiment, etc. FIG. 19 is a systematic view illustrating a braking apparatus according to the eighth embodiment, centered on the fluid pressure circuit thereof. In the embodiment, the same or like parts as in the first embodiment will be denoted with the same reference numerals, if necessary. A braking apparatus 810 is configured as a so-called hydro booster braking apparatus in which the operating force of the stepping-on of the brake pedal (not illustrated) is assisted by using the accumulator pressure. The braking apparatus 810 has a hydro booster unit 813, a reservoir 840, a pump 838, an accumulator 848, a fluid pressure actuator 816, and the wheel cylinder 20.

The hydro booster unit 813 includes a master cylinder unit 814 and a brake booster unit 815. The master cylinder unit 814 has a master cylinder within it. The master cylinder unit 814 pressure-feeds the brake fluid to the fluid pressure actuator 816 by the master cylinder pressure, which is increased in response to the stepping-on operation of the brake pedal. The brake booster unit 815 assists the stepping-on operation of the brake pedal (not illustrated) by using the accumulator pressure accumulated in the accumulator 848, and also pressure-feeds the brake fluid to the fluid pressure actuator by the regulator pressure increased by using the accumulator pressure.

The fluid pressure actuator 816 has a switch valve 822 for the front wheels, a switch valve 824 for the rear wheels, a communication valve 826, and a switch valve 828. The fluid pressure actuator 816 has: a pressure-increasing valve 850FR for the right front wheel, a pressure-increasing valve 850FL for the left front wheel, a pressure-increasing valve 850RR for the right rear wheel, and a pressure-increasing valve 850RL for the left rear wheel (hereinafter, these are collectively referred to as the "pressure-increasing valve 850", if necessary); and a pressure-reducing valve 856FR for the right front wheel, a pressure-reducing valve 856FL for the left front wheel, a pressure-reducing valve 856RR for the right rear wheel, and a pressure-reducing valve 856RL for the left rear wheel (hereinafter, these are collectively referred to as the "pressure-reducing valve 856", if necessary). The pressure-increasing valve 850 is composed of a normally-open electromagnetic opening/closing valve, and the pressure-reducing valve 856 is composed of a normally-closed electromagnetic opening/closing valve.

The master cylinder unit 814 is connected with a pipeline C8 for the front wheels in the fluid pressure actuator 816 through a master piping A8. On the other hand, the brake booster unit 815 is connected with a pipeline D8 for the rear wheels through a regulator piping B8. The pipeline C8 branches into pipelines E8 and F8, which are connected with the wheel cylinders 20FR and 20FL, respectively. On the other hand, the pipeline D8 branches to pipelines G8 and H8, which are connected with the wheel cylinders 20RR and 20RL, respectively. The pressure-increasing valve 850FR and the pressure-reducing valve 856FR are provided in the pipeline E8. The pressure-increasing valve 850FL and the pressure-reducing valve 856FL are provided in the pipeline F8. The pressure-increasing valve 850RR and the pressure-reducing valve 856RR are provided in the pipeline G8. The pressure increasing valve 850RL and the pressure-reducing valve 856RL are provided in the pipeline H8. The pipeline C8 and the pipeline D8 are connected by a bypass pipeline I8, and a communication valve 826 is provided in the bypass pipeline I8. The bypass pipeline I8 is connected with the pipeline C8 on the upstream side of the branch point of the pipeline E8 and the pipeline F8. The switch valve 824 is provided on the slightly upstream side of the connection point between the pipeline D8 and the bypass pipeline I8, and a fluid pressure sensor 862 is provided on the upstream side of the switch valve 824. The pipeline D8 branches into an communication pipeline J8 on the upstream side of the branch point of the pipeline G8 and the pipeline H8, and is connected with the accumulator 848 through an accumulator piping K8. The pressure-reducing valve 856 is connected with the reservoir 840 through return pipelines L8 and M8.

The pump 838 is driven by the motor 839 to pump up the brake fluid retained in the reservoir 840 and to supply it to the accumulator 848. The accumulator 848 accumulates the brake fluid discharged from the pump 838 in a high-pressure state. The accumulator piping K8 is connected with the brake booster unit 815 by a piping N8. The accumulator piping K8 is connected with the reservoir 840 in the middle thereof through a piping O8, in the middle of which the relief valve 844 is placed. The reservoir 840 is connected with the master cylinder unit 814 through a piping P8, and connected with the brake booster unit 815 through a piping Q8.

The hydro booster unit 813 has a housing 868, a push rod 15, a power piston 872, a master cylinder piston 874, a first return spring 876, a regulator piston 878, a second return spring 880, and a spool valve 882. A cylinder 869 is formed in the housing 868. A booster chamber 892, which is a fluid chamber, is formed between the end surface in the extension direction of the power piston 872 and the end surface in the compression direction of the cylinder 869. A master cylinder 890, which is a fluid chamber, is formed between the master cylinder piston 874 and the regulator piston 878. The push rod 15 is linked to the brake pedal. For convenience, the direction where the push rod 15 is moved forward when the brake pedal is stepped on is referred to as the "compression direction", and the direction where the push rod 15 is moved forward when the stepping-on of the brake pedal is released is referred as the "extension direction".

When the brake pedal is not stepped on, the master cylinder piston 874, the regulator piston 878, and the spool valve 882 are transferred to the extension direction by the biasing force of the second return spring 880. This is assumed to be the initial state. In the initial state, the communication between the flow channel leading to the piping N8 and the cylinder 869 is blocked by the spool valve 882. Accordingly, it is in a state in which the communication between the accumulator 848 and the booster chamber 892 is blocked.

On the other hand, when a stepping-on operation of the brake pedal is executed, the regulator piston 878 is pushed in the compression direction earlier than the master cylinder 890 is compressed, and accordingly the spool valve 882 is also moved forward in the compression direction. Thereby, the block of the communication between the flow channel leading to the piping N8 and the cylinder 869 is released. Thereby, the accumulator 848, which is held at high-pressure, and the booster chamber 892 communicate, and accordingly the fluid pressure in the booster chamber 892 is increased. Thereby, because the booster chamber 892 is pushed in the compression direction, the operating force needed when a driver steps on the brake pedal is assisted. The brake fluid supplied from the accumulator 848 to the booster chamber 892 is supplied to the pipeline B8 for the rear wheels. In addition, when the regulator piston 878 is moved forward in the compression direction by a predetermined distance from the initial state, further movement in the compression direction is regulated by a locking portion provided in the cylinder 869. Accordingly, the distance between the regulator piston 878 and the master cylinder piston 874 is made small due to the movement of the master cylinder piston 874 in the compression direction, and hence the master cylinder 890 is compressed and the pressure thereof is increased. Thereby, the operating fluid is supplied from the master cylinder 890 to the pipeline A8 for the front wheels.

In such a configuration, when the CPU 150, etc., in the brake ECU 200 is in a fail state, the EDU assumes that it is in a fail state when an input of a serial signal from the CPU 150 is interrupted in spite of the STP signal being inputted, and then drives the motor 839. At the time, because the normally-closed switch valve 828 is in a closed state, the accumulator pressure is introduced into hydro booster unit 813 thorough the accumulator piping K8 and the piping N8. Because the brake pedal is in a state of being stepped on, the brake fluid with high-pressure is supplied from the accumulator 848 to the booster chamber 892, as stated above, and further supplied to the fluid pressure actuator 816 through the pipeline B8. Also, the operating fluid is supplied from the master cylinder 890 to the pipeline A8.

At the time, because the normally-open switch valve 822, the pressure-increasing valve 850FR, the pressure-increasing valve 850FL are in open states, the brake fluid is supplied to the wheel cylinders 20FR and 20FL in the front wheels. Also, because the normally-open switch valve 824, the pressure-increasing valve 850RR, and the pressure-increasing valve 850RL are in open states, the brake fluid is supplied to the wheel cylinders 20RR and 20RL in the rear wheels. That is, even if the CPU 150, etc., is in a fail state, braking force is provided to the front wheels (which may be the driving wheels) while the brake pedal is being stepped on, and accordingly it becomes possible to stop the vehicle stably.

Ninth Embodiment

Figure 20:
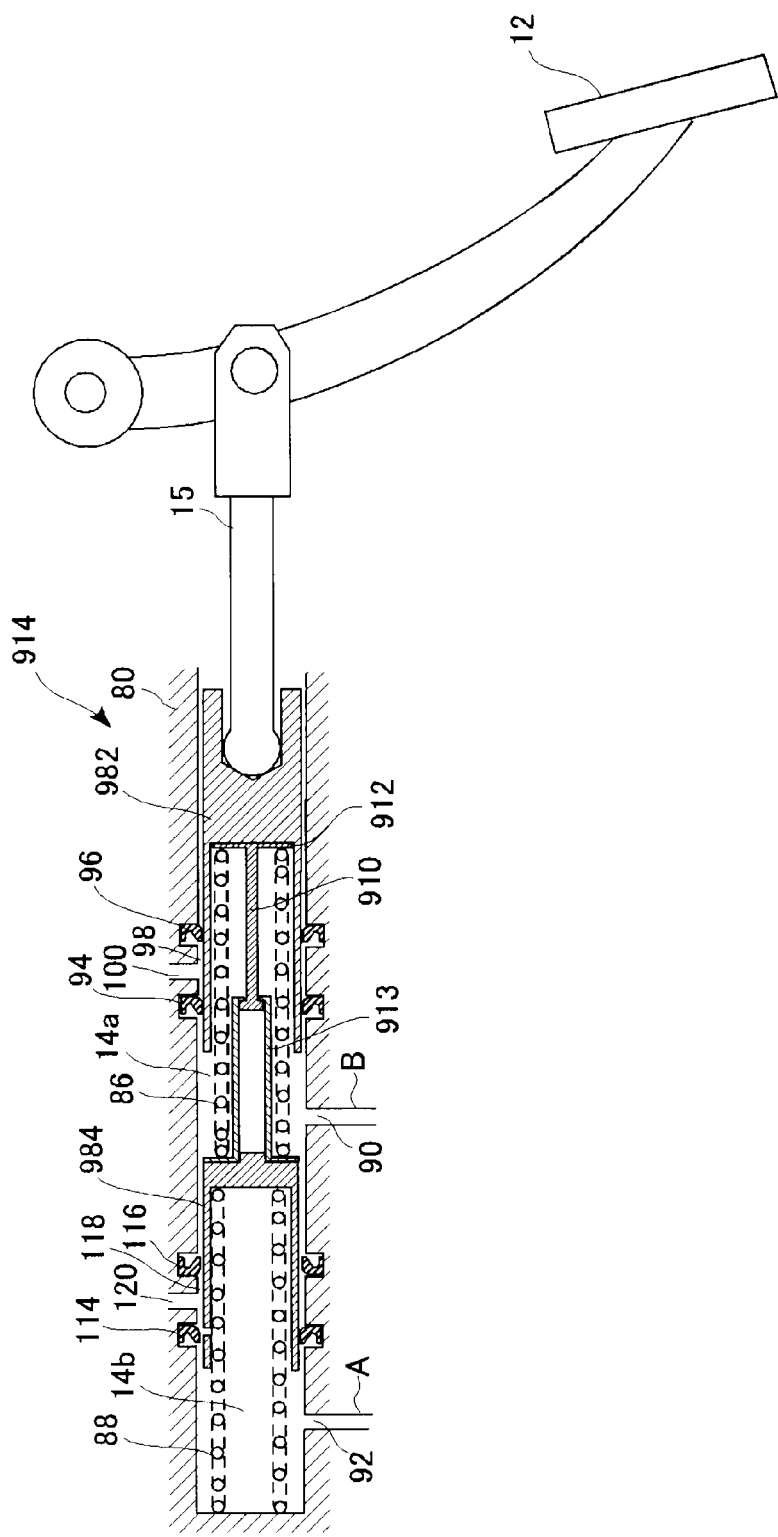
FIG. 20 is a partial sectional view illustrating the configuration of a master cylinder according to a ninth embodiment.

Subsequently, a ninth embodiment according to the present embodiment will be described. In the embodiment, the configuration of a master cylinder is different from that in the first embodiment, etc. FIG. 20 is a partial sectional view illustrating the configuration of the master cylinder according to the ninth embodiment. The same or like parts as in the first embodiment will be denoted with the same reference numerals, if necessary. The master cylinder according to the embodiment can be replaced by the master cylinder 14 in the fluid pressure circuit illustrated in FIG. 1.

A master cylinder 914 is configured by slidably housing a first piston 982 and a second piston 984 in the bottomed tubular housing 80. The second piston 984 is arranged near to the bottom of the housing 80 and the first piston 982 is arranged near to the opening thereof. The push rod 15 linked to the brake pedal 12 is connected with the end portion of the first piston 982, the end portion being opposite to the second piston 984. The primary chamber 14*a* (first fluid pressure chamber) is formed between the first piston 982 and the second piston 984, and the secondary chamber 14*b* (second fluid pressure chamber) is formed between the second piston 984 and the bottom of the housing 80.

The first spring 86 configured to bias the first piston 982 and the second piston 984 in the direction where two pistons are away from each other (i.e., the direction where the first fluid pressure chamber is expanded), is provided between the two pistons 982 and 984. The second spring 88 configured to bias the second piston 984 in the direction where the second piston 984 is away from the bottom thereof (i.e., the direction where the second fluid pressure chamber is expanded), is provided between the second piston 984 and the bottom of the housing 80.

A so-called suspension structure (which corresponds to a "regulating structure") formed by a first retainer 912 to which a suspension pin 910 is fixed and a second retainer 913 slidable relative to the suspension pin 910, is provided between the first piston 982 and the second piston 984. That is, as illustrated in FIG. 20, while the front end portion of the bottomed tubular second retainer 913 is fixed to the second piston 984, the circular first retainer 912 is fixed to the first piston 982. The front end portion of the suspension pin 910 is enlarged in diameter to be slidably inserted into the second retainer 913. The bottom of the second retainer 913 forms a locking portion by which the front end portion of the suspension pin 910 can be locked. The first spring 86 is provided between the first retainer 912 and the second retainer 913. Accordingly, in the state in which the first retainer 912 and the second retainer 913 are stretched by the biasing force of the first spring 86, further force is not exerted on the secondary camber 14*b*.

In the present embodiment, the brake fluid is made to reversely flow into the secondary chamber 14*b*, not into the primary chamber 14*a*, when the CPU 150, etc., is n a fail state, which is different from the first embodiment. That is, when the brake pedal 12 is stepped on in the case where the CPU 150, etc., in the brake ECU 200 is in a fail state, the second EDU 158 assumes that it is in a fail state when an input of a serial signal from the CPU 150 is interrupted in spite of the STP signal being inputted, and then drives only the first motor 40 illustrated in FIG. 1.

At the time, because the pump 32 is operated, the brake fluid is pumped up from the reservoir tank 24 to increase the fluid pressure in the wheel cylinder 20FR in the right front wheel. Also, because the cut-off valve 28 is in an open state, part of the brake fluid is introduced into the secondary chamber 14*b* in the master cylinder 14 through the pipelines F and A. As a result, the master cylinder pressure is increased. At the time, because the cut-off valve 30 is in an open state, the brake fluid in the primary chamber 14*a* is pushed out, and is supplied to the wheel cylinder 20FL in the left front wheel through the pipelines B and G. That is, even if the CPU 150, etc., is in a fail state, braking force is provided to the front wheels (which may be the driving wheels) while the brake pedal 12 is being stepped on, and accordingly it becomes possible to stop the vehicle stably. When a suspension structure is adopted near to the primary chamber 14*a* in the master cylinder 914 as in the present embodiment, the fluid pressure is not efficiently transmitted to the secondary chamber 14*b* in the state where the first spring 86 is stretched, even when the brake fluid is made to reversely flow into the primary chamber 14*a* as in the first embodiment. Therefore, it is made that, in a configuration in which the master cylinder having such a suspension structure is adopted, the brake fluid is made to reversely flow into the fluid pressure chamber in which the suspension structure is not provided.

The present invention should not be limited to the aforementioned embodiments, and various modifications, such as design modifications, can be made with respect to the above embodiments based on the knowledge of those skilled in the art, and an embodiment with such a modification could fall within the scope of the present invention.

(Variation 1)

Figure 21:
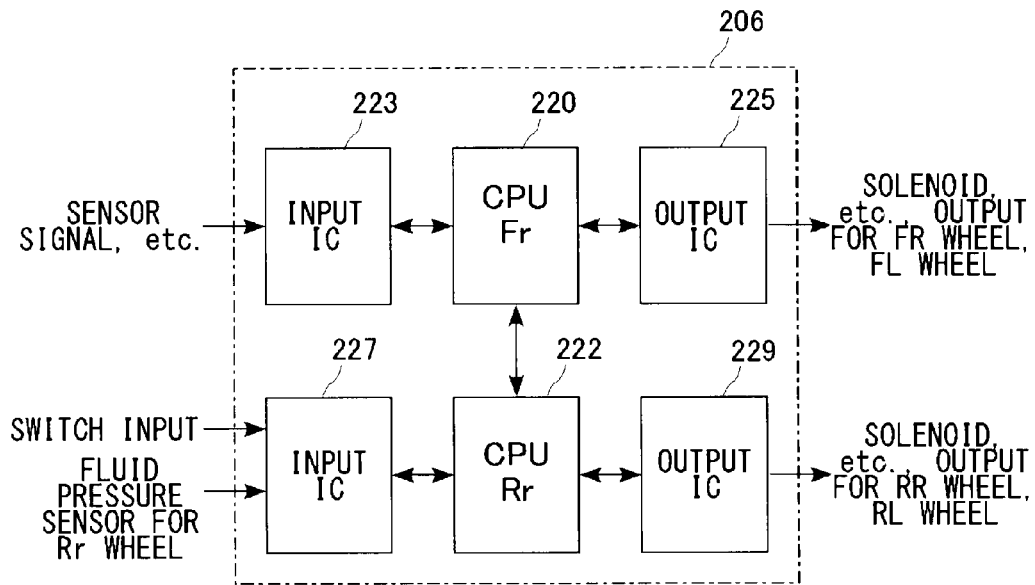
FIG. 21 is a view schematically illustrating the electrical configuration of a brake ECU according to a variation 1 and the major part of its periphery.

FIG. 21 is a view schematically illustrating the electrical configuration of a brake ECU according to a variation 1 and the major part of its periphery. In the present variation, the fail-safe control is applied to a fluid pressure braking apparatus. The variation can be applied to various fluid pressure circuits besides FIGS. 1, 10, 12, and 15 to 18.

The brake ECU 206 is configured such that a microcomputer including both a CPU 220 for outputting a control command to an actuator that controls the wheel cylinder pressures in the front wheels and a CPU 222 for outputting a control command to an actuator that controls the wheel cylinder pressures in the rear wheels, is centered, and includes a ROM, a RAM, an input/output port, and a communication port, etc., besides the CPU. Both the CPUs are connected with each other through a communication line such that signals can be mutually delivered. The CPU 220 is configured as the main CPU, and calculates target braking force and a control command value, which are for each of the right front wheel FR and the left front wheel FL, based on the signals, etc., inputted from various sensors including fluid pressure sensors through an input IC 223. Subsequently, the CPU 220 outputs, based on the calculation result, control commands to each of the electromagnetic control valves for the front wheels through an output IC 225. On the other hand, the CPU 222 calculates target braking force and a control command value, which are for each of the right rear wheel RR and the left rear wheel RL, based on the signals, etc., that are inputted from various sensors including a stop lamp switch and fluid pressure sensors for the rear wheels, through an input IC 227. Subsequently, the CPU 222 outputs, based on the calculation result, control commands to each of the electromagnetic control valves for the front wheels through an output IC 229. When one of the two CPUs determines that the other CPU is in a fail state because the signal input through the communication line is interrupted, the CPU controls the actuators that are to be originally controlled by the other CPU, and thereby at least the minimum braking force is secured.

In the present variation, the case where the fail-safe control is applied to a fluid pressure braking apparatus has been described; however, the fail-safe control may be applied to an electrical braking apparatus. That is, the configuration may be adopted in which the in-wheel motors for the front wheels are controlled by the CPU 220 and the those for the rear wheels are controlled by the CPU 222. And, it may be made that, when one of the two CPUs determines that the other CPU is in a fail state, the CPU controls the actuators that are to be originally controlled by the other CPU, and thereby at least the minimum braking force is secured.

(Variation 2)

Figure 22:
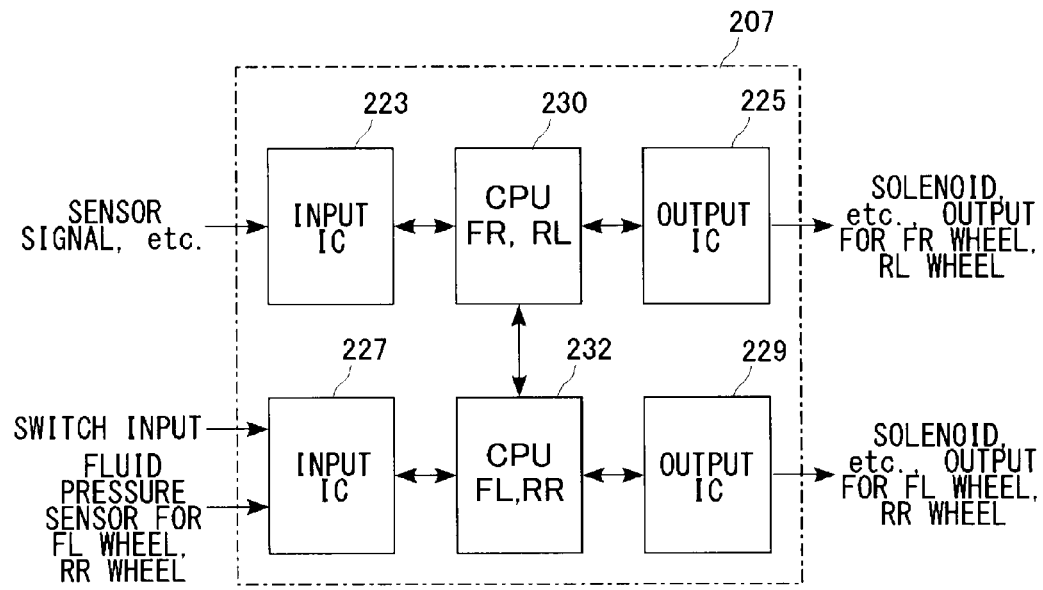
FIG. 22 is a view schematically illustrating the electrical configuration of a brake ECU according to a variation 2 and the major part of its periphery.

FIG. 22 is a view schematically illustrating the electrical configuration of a brake ECU according to a variation 2 and the major part of its periphery. The present variation is the same as the variation illustrated in FIG. 21, except that a brake ECU 207 includes both a CPU 230 that controls the right front wheel and the left rear wheel and a CPU 232 that controls the left front wheel and the right rear wheel. The variation can be applied to both of a fluid pressure braking apparatus and an electrical braking apparatus.

(Variation 3)

Figure 23:
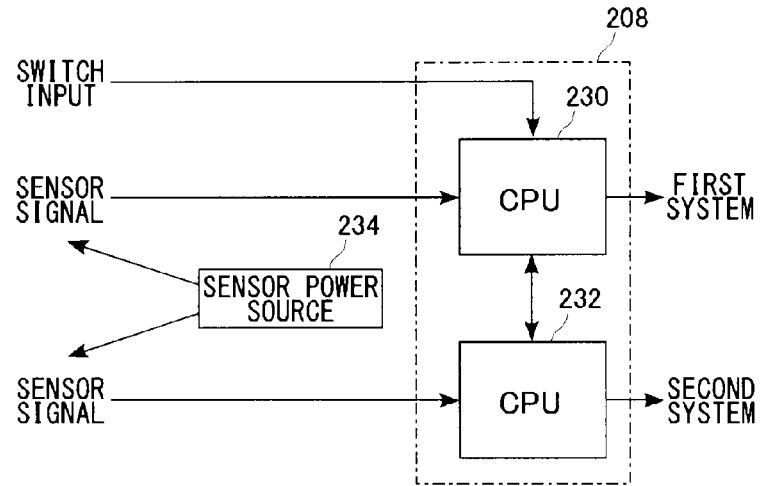
FIG. 23 is a view schematically illustrating the electrical configuration of a brake ECU according to a variation 3 and the major part of its periphery.

FIG. 23 is a view schematically illustrating the electrical configuration of a brake ECU according to a variation 3 and the major part of its periphery. In the present variation, the configuration for the fail-safe control that deals with the case where the power source for various sensors breaks down by any cause, not by failure in a CPU, is illustrated.

In the present variation, a configuration is supposed in which the actuator for braking control is divided into a first system and a second system, each of which is respectively controlled by a CPU 230 and a CPU 232 that are provided in a brake ECU 208. For example, It may be made that the braking control for the front wheels are executed by the first system and the that for the rear wheels are executed by the second system. Alternatively, it may be made that the braking control for the right front wheel and the left front wheel is executed by the first system and that for the left front wheel and the right rear wheel is executed by the second system. Both CPUs are connected by a communication line such that signals can be mutually delivered. A signal from a first sensor, which is necessary for controlling the actuator in the first system, and signals from various sensors including a stop lamp switch are inputted into the CPU 230. On the other hand, a signal from a second sensor, which is necessary for controlling the actuator in the second system, is inputted into the CPU 232. The first sensor and the second sensor commonly have a sensor power source 240, and hence, if the sensor power source breaks down, signal input from the sensors into the CPUs are interrupted.

In such a configuration, when a signal from the first sensor (for example, a signal from a stroke sensor), the signal being to be originally inputted along with the STP signal, is never inputted into the CPU 230 in spite of the STP signal being inputted, the CPU 230 initiates the fail-safe control to drive the actuator in the first system. Thereby, braking force is exerted on at least the first system, and accordingly it becomes possible to stop the vehicle stably. Alternatively, the CPU 230 may output a brake command to the CPU 232 in the case. It may be made that the CPU 232 initiates the fail-safe control to drive the actuator in the second system by the brake command being inputted from the CPU 230, while signal input from the second sensor is interrupted. It becomes possible to stop the vehicle more stably and rapidly by making braking force act on both of the first system and the second system, as stated above. Also, when a signal is not inputted into either of the CPUs due to failure in at least one the first sensor and the second sensor, not in a sensor power source 234, it may be made to execute similar fail-safe control.

(Variation 4)

Figure 24:
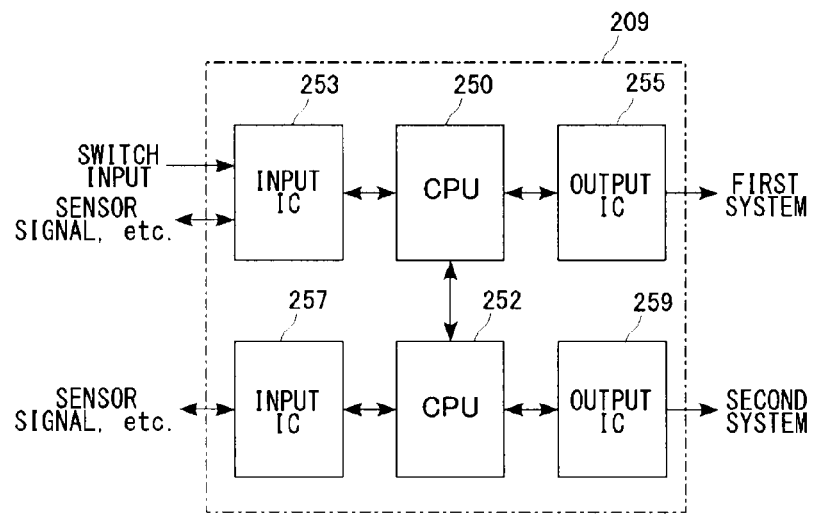
FIG. 24 is a view schematically illustrating the electrical configuration of a brake ECU according to a variation 4 and the major part of its periphery.

FIG. 24 is a view schematically illustrating the electrical configuration of a brake ECU according to a variation 4 and the major part of its periphery. In the present variation, the case is taken into consideration, in which the minimum operating voltage of a sensor is larger than that of a switch or an actuator (motor, etc.), and hence the sensor becomes inoperable earlier than others when the power supply voltage is decreased. The configuration that can deal with the case where a sensor does not work due to a decrease in the power supply voltage even if a plurality of sensor power sources are provided, is illustrated.

A brake ECU 209 is constituted such that a microcomputer including a CPU 250 for outputting a control command to an actuator that controls a first system and a CPU 252 for outputting a control command to an actuator that controls a second system, is centered. Both the CPUs communicate through a communication line and signals can be mutually delivered. The CPU 250 is configured as the main CPU, and calculates a control command value for the first system based on the signals, etc., inputted from various switches including a stop lamp switch and various sensors through an input IC 253. Subsequently, the CPU 250 outputs a command signal based on the calculation result to the actuator in the first system through an output IC 255. On the other hand, the CPU 252 calculates a control command value for the second system based on the signals, etc., inputted from various sensors through an input IC 257. Subsequently, the CPU 252 outputs a command signal based on the calculation result to the actuator in the second system through an output IC 259.

In such a configuration, when a signal from a sensor (for example, a signal from a stroke sensor), the signal being to be originally inputted along with the STP signal, is never inputted into the CPU 250 in spite of the STP signal being inputted, the CPU 250 initiates the fail-safe control to drive the actuator in the first system. Thereby, braking force is exerted on at least the first system, and accordingly it becomes possible to stop the vehicle stably. Alternatively, the CPU 250 may output a brake command to the CPU 252 in the case. It may be made that the CPU 252 initiates the fail-safe control to drive the actuator in the second system by the brake command being inputted from the CPU 250, while signal input from a sensor is interrupted.

(Variation 5)

Figure 25:
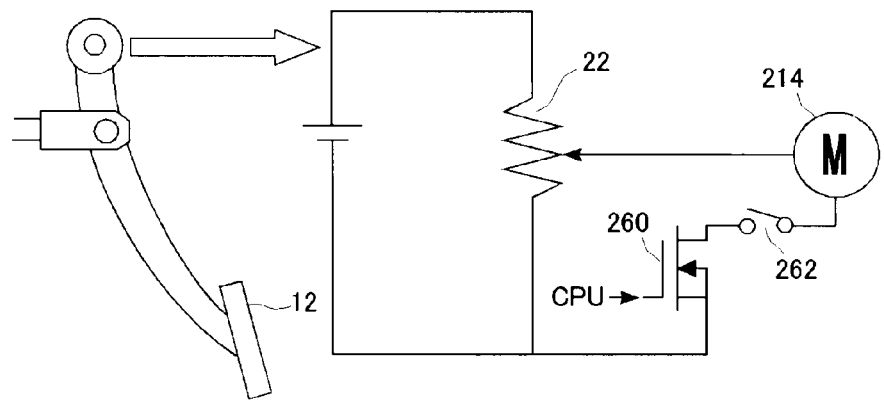
FIG. 25 is a view schematically illustrating the electrical configuration of the fail-safe control according to a variation 5.

FIG. 25 is a view schematically illustrating the electrical configuration of the fail-safe control according to a variation 5. The present variation can be applied to a fluid pressure circuit in which an electrical booster, which is illustrated, for example, in the second embodiment, is mounted. In the variation, the fail-safe control is executed by using the variable resistor in a stroke sensor. That is, a transistor switch 260 is turned off as long as the CPU in a brake ECU is in a normal operation and turned on when the CPU is in a fail state. When the CPU breaks down in spite of a stop lamp switch being turned on, the illustrated circuit is closed, and hence the current in accordance with the resistance value of the variable resistor in a stroke sensor 22 is supplied. Thereby, the minimum braking force can be secured even when the CPU, etc., is in a fail state.

(Variation 6)

In the aforementioned third and forth embodiments, a configuration in which a reservoir is built in an fluid pressure actuator has been described. However, the brake fluid retained in a reservoir that is installed outside an fluid pressure actuator, not in such a built-in reservoir, may be used. For example, it may be made that such an external reservoir and a fluid pressure actuator are connected by a piping hose, etc., and the brake fluid is pumped up by a pump, etc., to be used in the fail-safe control.

(Variation 7)

In the aforementioned second to fourth embodiments, the case where an electrical booster is provided in the master cylinder has been described; however, the electrical booster may be replaced by a vacuum booster. In the case, the vacuum booster as described in, for example, Japanese Patent Application Publication No. H9-86396 may be used. Alternatively, the electrical booster may be replaced by a hydro booster.

(Variation 8)

In the aforementioned embodiments, the case where fail in an CPU, etc., is determined based on an input of a stop lamp switch has been described; however, when a tread switch that is turned ON when tread force greater than or equal to predetermined force is exerted, or a master cylinder pressure sensor that is turned on when master cylinder pressure is greater than or equal to predetermined pressure, is provided, fail state may be determined by the tread switch or the master cylinder pressure switch, replacing these inputs from switches. Alternatively, for example, a brake ECU and an ECU in another system are configured to be capable of communicating with each other by using a communication protocol, such as CAN, and the fail-safe control may be executed based on the information acquired from the another system when the CPU, etc., is in a fail state. For example, it may be made that the brake EDU receives from the engine ECU the information on the state of the idle switch, which detects presence or absence of stepping-on of the accelerator pedal. And, it may be made that, when the idle switch is turned off while an input from the CPU is being interrupted, the EDU drives a motor, and when the idle switch is turned on, the EDU turns off the motor.

(Variation 9)

Although not referred to in the above embodiments, there is the possibility that, when the discharge flow rate of the pump is too large, for example, during the fail-safe control, the brake pedal 12 is pushed back quickly, and hence good controllability may not be obtained. Accordingly, it may be made that, during the fail-safe control, the rotation speed of a motor is more reduced than during a normal state. Alternatively, when a plurality of pistons form a pump, part of the pistons may be driven. Alternatively, the pump efficiency may be reduced by increasing the valve-opening pressure.

(Variation 10)

Hereinafter, the applicability of the aforementioned embodiments to a publicly-known technique will be briefly described with reference to FIGS. 26 to 32. Each view illustrates the applicability of each embodiment to a publicly-known technique. For convenience, the accompanying drawing of the Patent Application Publication in which the relevant publicly-known technique is disclosed is reprinted in each view, and the relevant major part is indicated by the dashed-dotted line. The reference numerals in each view are the same as in the Patent Application Publication, which have no relationship with the reference numerals in FIGS. 1 to 25.

Figure 26:
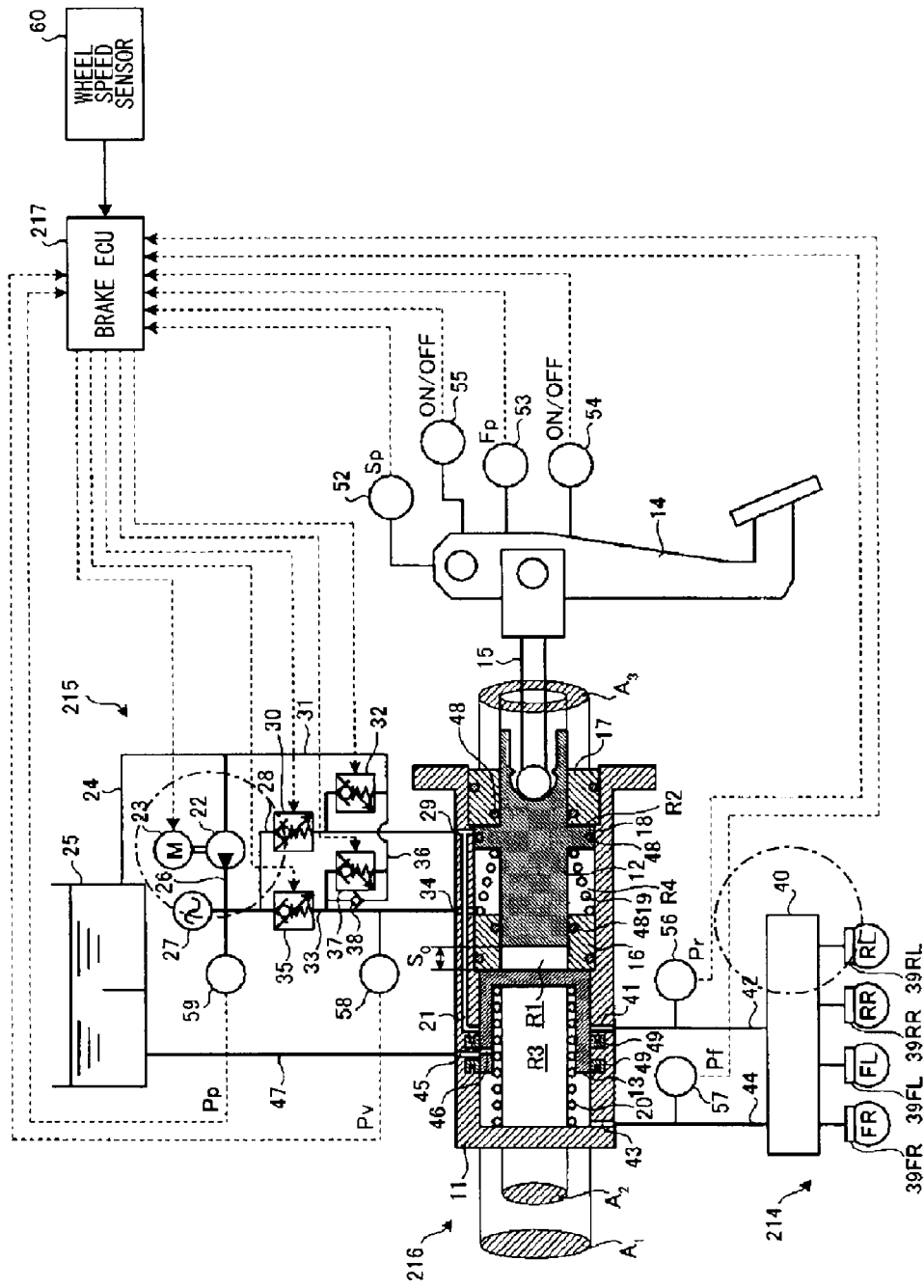
FIG. 26 is a view illustrating the applicability of each embodiment to a publicly-known technique.

FIG. 26 illustrates the braking apparatus described in Japanese Patent Application Publication No. 2007-55588. In the braking apparatus, the oil pressure from an oil pressure source 215 is adjusted to predetermined pressure in an oil pressure adjustment unit 216 (master cylinder) and then supplied to an ABS 40 such that the fluid pressure in each of the wheel cylinders 39FR, 39FL, 39RR, and 39RL is controlled. The oil pressure of the oil pressure source 215 can be supplied by driving an oil pressure pump 22. The oil pressure pump 22 is linked to a reservoir tank 25 on one side and linked to an accumulator 27 on the other side.

Even to the configuration of such a fluid pressure circuit, for example, the aforementioned second embodiment, third embodiment, or variation thereof can be applied. Specifically, it may be made that a motor 23 is driven with an input of the STP signal, occurring when an CPU, etc., in an brake ECU 217 is in a fail state, being a trigger, so that the oil pressure pump 22 is operated, and thereby the increased fluid pressure is supplied to an ABS 40 or finally to the wheel cylinder through the oil pressure adjustment unit 216. Alternatively, it may be made that the built-in reservoir and the fluid pressure pump in the third embodiment, the fourth embodiment, or the variation thereof are installed in the ABS 40 such that the fluid pressure pump is driven when an CPU, etc., is in a fail state to supply the fluid pressure to the wheel cylinder.

Figure 27:
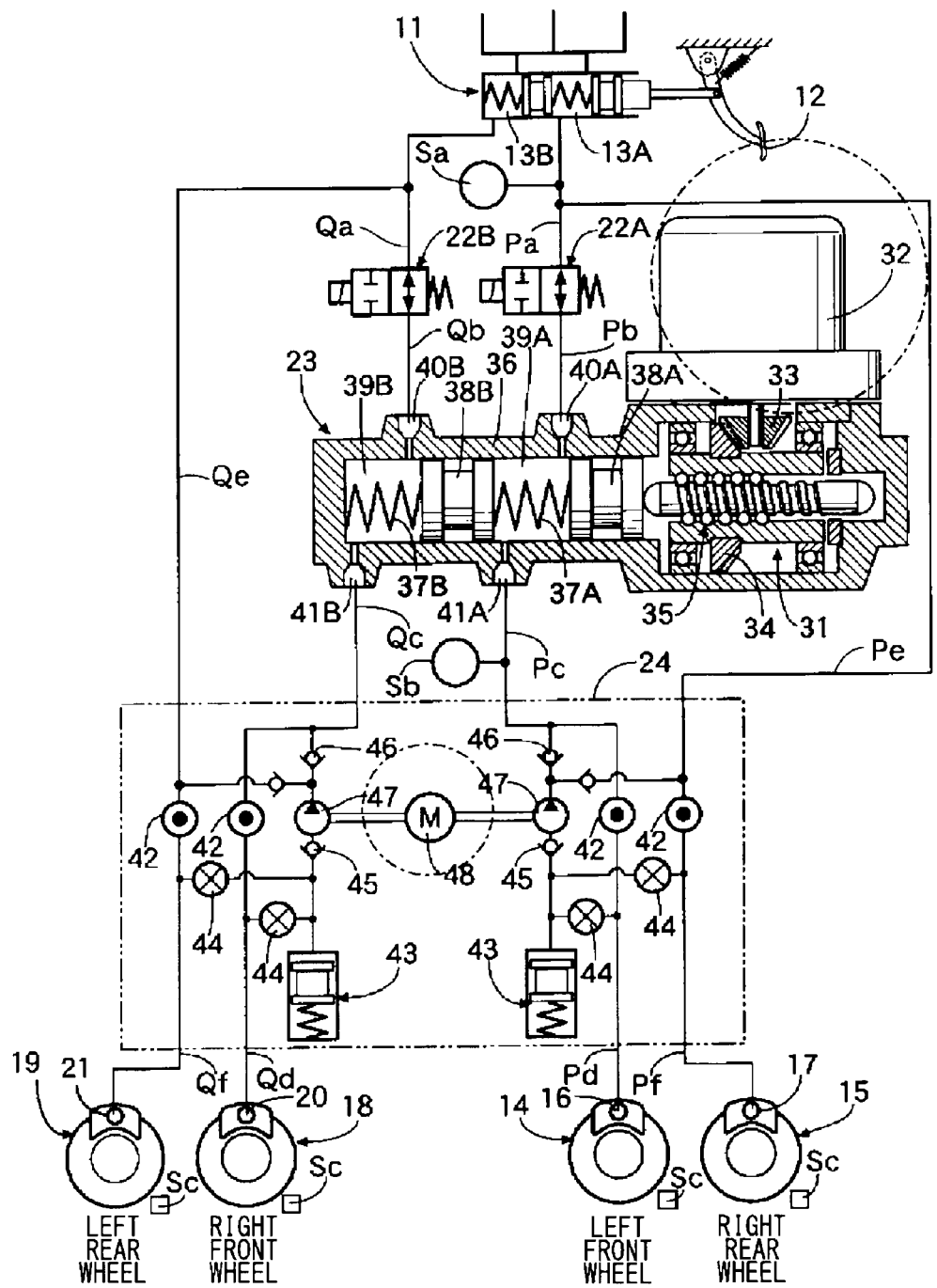
FIG. 27 is a view illustrating the applicability of each embodiment to a publicly-known technique.

FIG. 27 illustrates the braking apparatus described in Japanese Patent Application Publication No. 2008-62782. In the braking apparatus, the wheel cylinder pressure is controlled by an ABS apparatus 24, and a motor cylinder 23 is provided between a master cylinder 11 and the ABS apparatus 24. When an electric motor 32 provided in the motor cylinder 23 is driven, an actuator 31 formed by a bevel gear and a ball screw mechanism is driven, thereby the brake fluid whose pressure increased is discharged toward the ABS apparatus 24. When the in-vehicle battery is in a full-charge state and the braking force needed for the front wheels cannot be covered only with the regenerative braking force, then motor cylinder 23 is operated to cover the deficiency in the braking force. A fluid pressure pump 47 driven by an electrical motor 48 is arranged in the ABS apparatus 24.

Even to the configuration of such a fluid pressure circuit, for example, the aforementioned first to third embodiments and the variations thereof can be applied. Specifically, it may be made that an electrical motor 32 is driven with an input of the STP signal, occurring when a CPU, etc., in an brake ECU is in a fail state, being a trigger, so that the fluid pressure whose pressure is increased by the motor cylinder 23 is supplied to the ABS apparatus 24 and finally to the wheel cylinders for the front wheels. Also, it may be made that the brake fluid is made to reversely flow into the master cylinder 11 such that the pressure thereof is increased, and then the brake fluid is supplied to the wheel cylinders for the rear wheels. Alternatively, it may be made that the brake fluid is accumulated in a built-in reservoir 43 by driving an electrical motor 48, and when an CPU, etc., is in a fail state, the fluid pressure is supplied to the wheel cylinder by driving the fluid pressure pump 47.

Figure 28:
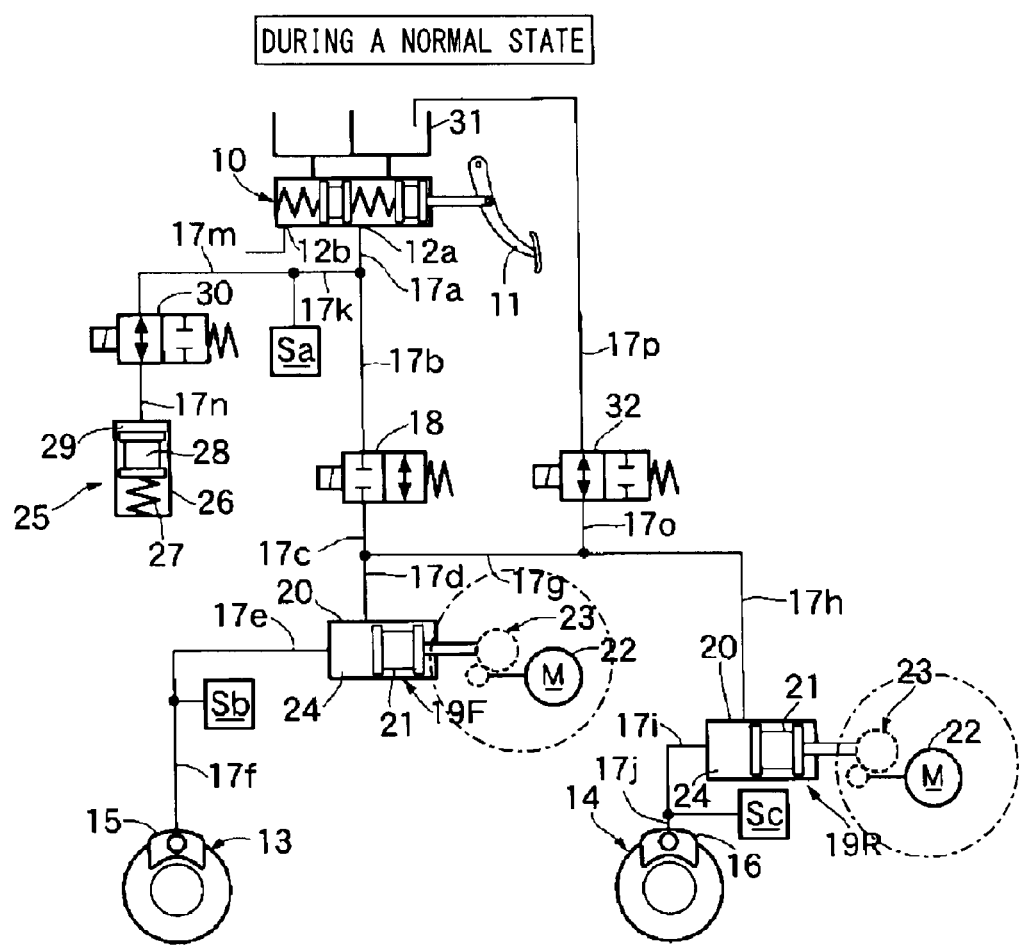
FIG. 28 is a view illustrating the applicability of each embodiment to a publicly-known technique.

FIG. 28 illustrates the braking apparatus described in Japanese Patent Application Publication No. 2007-245823. The braking apparatus has a motor cylinder 19F for the front wheels, and the motor cylinder 19R for the rear wheels. The pressure of each of the motor cylinders is increased by operating the piston with an electrical motor 22, and the brake fluid whose pressure is increased is supplied to the wheel cylinders. In the configuration of such a fluid pressure circuit, it may be made that a plurality of electrical motors 22 are driven with an input of the STP signal, occurring when an CPU, etc., in an brake ECU is in a fail state, being a trigger, so that the fluid pressure whose pressure is increased by each motor cylinder is supplied to the wheel cylinder.

Figure 29:
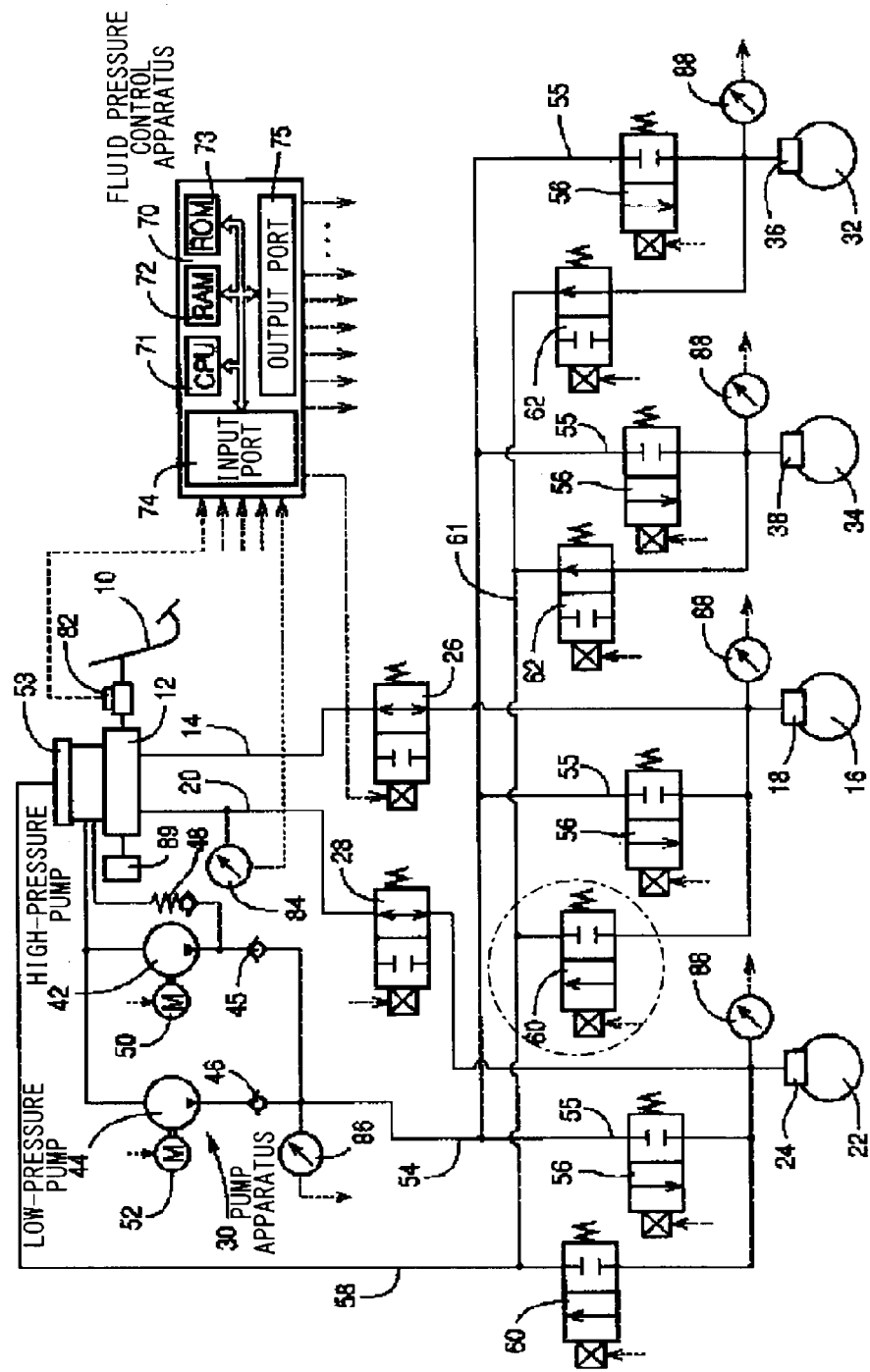
FIG. 29 is a view illustrating the applicability of each embodiment to a publicly-known technique.

FIG. 29 illustrates the braking apparatus described in Japanese Patent Application Publication No. 2000-211497. An accumulator is not installed in the braking apparatus, and the operating fluid in a reservoir 53 is pumped up and the pressure thereof is increased by the drive of the fluid pressure pumps 42 and 44 to directly supply to the wheel cylinder. The fluid pressure pumps 42 and 44 are driven by electrical motors 50 and 52, respectively. A pressure-increasing valve and a pressure-reducing valve, which are used for switching the supply/discharge states of the operating fluid, are provided between these fluid pressure pumps and the wheel cylinders. In the present variation, at least one of the pressure-increasing valves that are normally-closed electromagnetic control valves (for example, at least one of the pressure-increasing valves for the front wheels) is changed to a normally-open valve. With such a measure, it may be made that at least one of the electrical motors 50 and 52 is driven with an input of the STP signal, occurring when a CPU, etc., in a brake ECU is in a fail state, being a trigger, so that the fluid pressure whose pressure is increased is supplied to the wheel cylinders through the pressure-increasing valve in an open state.

Figure 30:
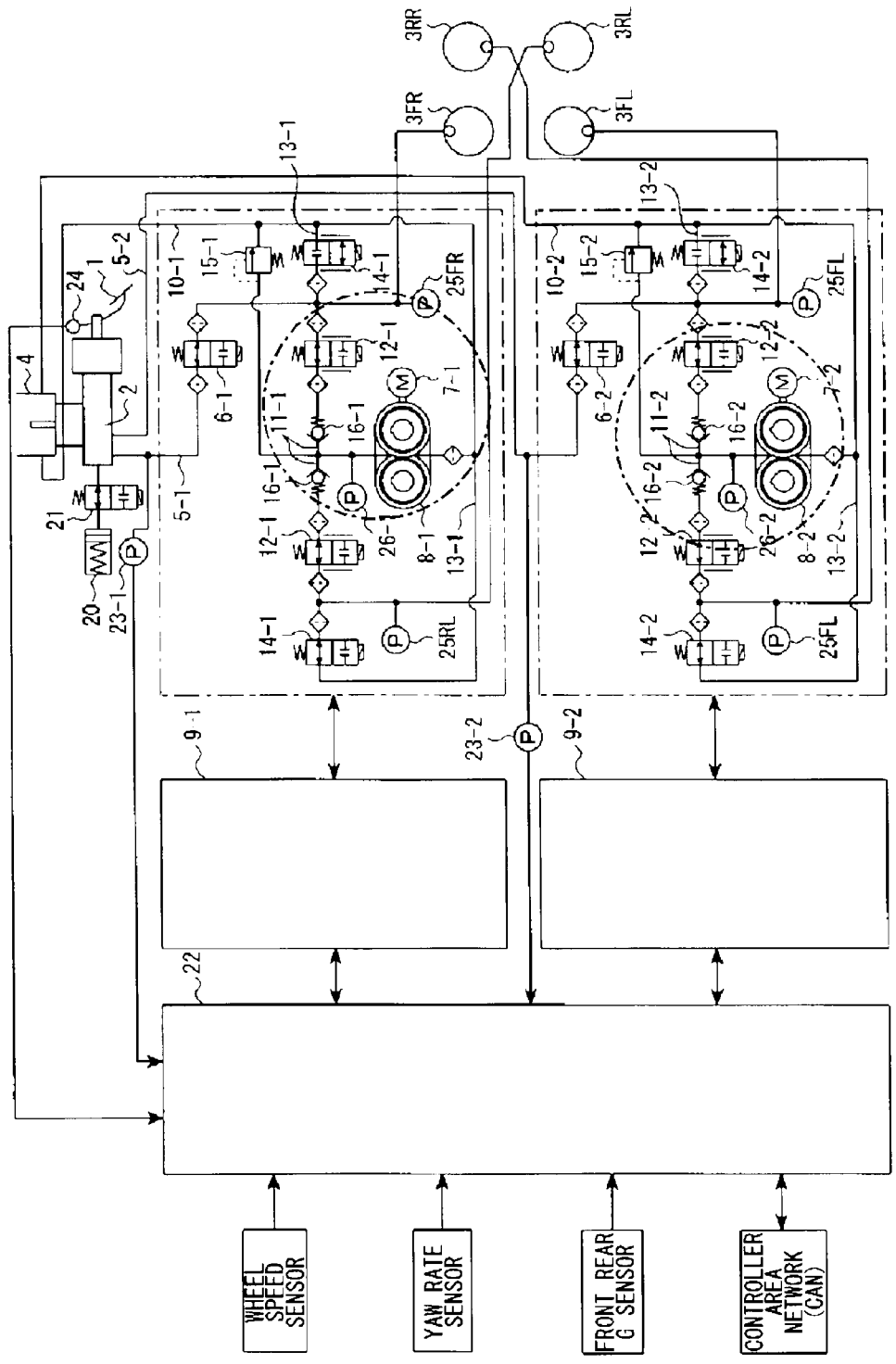
FIG. 30 is a view illustrating the applicability of each embodiment to a publicly-known technique.

FIG. 30 illustrates the braking apparatus described in Japanese Patent Application Publication No. 2008-24039. An accumulator is not installed in the braking apparatus, and the operating fluid in a reservoir 4 is pumped up and the pressure thereof is increased by the drive of the oil pressure pumps 8-1 and 8-2 to directly supply to the wheel cylinders. The oil pressure pumps 8-1 and 8-2 are driven by electrical motors 7-1 and 7-2, respectively. A holding valve and a pressure-reducing valve, which are used for switching the supply/discharge states of the operating fluid, are provided between these fluid pressure pumps and the wheel cylinders. In the present variation, because the holding valve is a normally-open electromagnetic control valve, at least one of the electrical motors 7-1 and 7-2 is driven with an input of the STP signal, occurring when a CPU, etc., in a brake ECU is in a fail state, being a trigger, so that the increased fluid pressure is supplied to the wheel cylinders through the holding valve in an open state.

Figure 31:
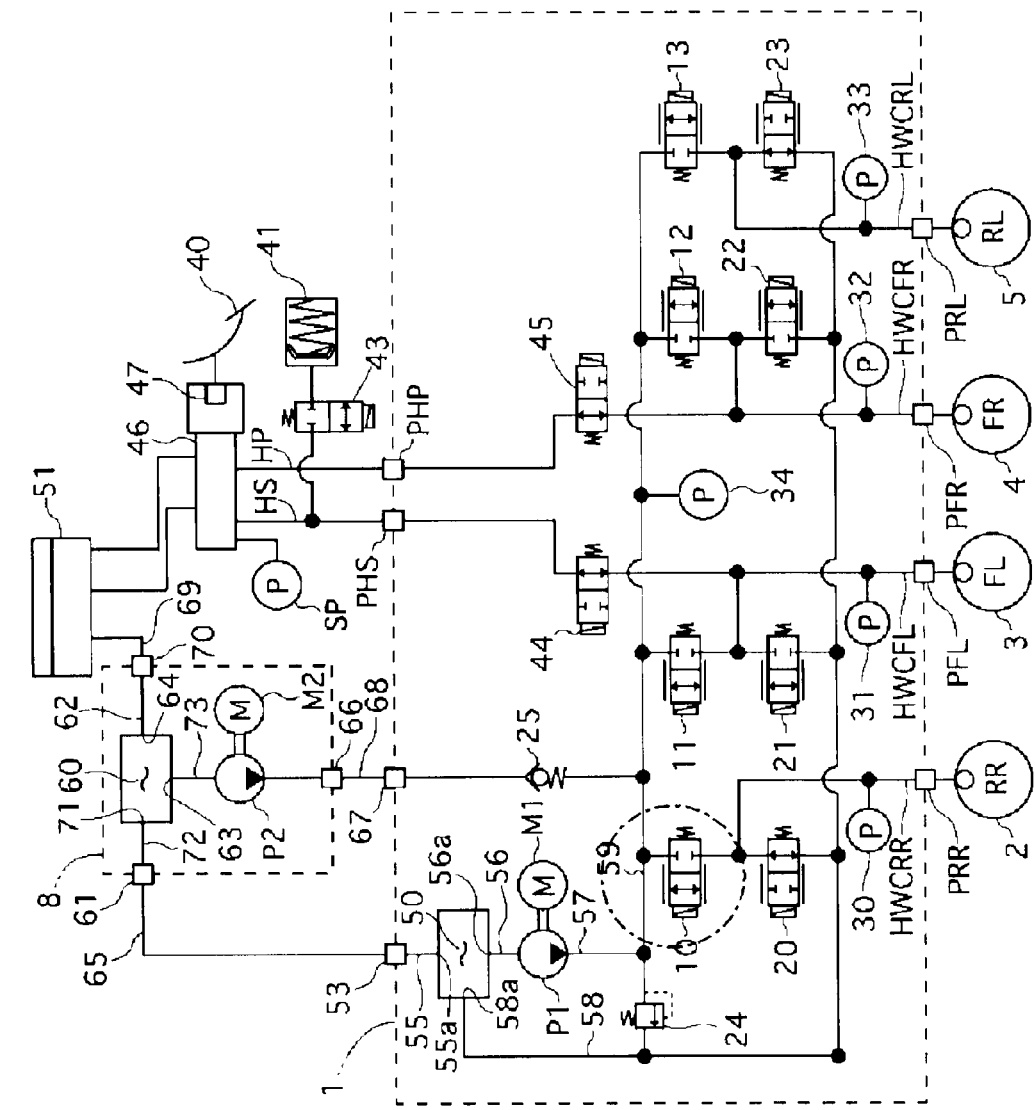
FIG. 31 is a view illustrating the applicability of each embodiment to a publicly-known technique.

FIG. 31 illustrates the braking apparatus disclosed in Japanese Patent Application Publication No. 2008-273440. An accumulator is not installed in the braking apparatus, and the operating fluid in a reservoir 51 is pumped up and the pressure thereof is increased by the drive of fluid pressure pumps P1 and P2 to directly supply to the wheel cylinders. The fluid pressure pumps P1 and P2 are driven by electrical motors M1 and M2, respectively. A pressure-increasing valve and a pressure-reducing valve, which are used for switching the supply/discharge states of the operating fluid, are provided between these fluid pressure pumps and the wheel cylinders. In the present variation, at least one of the pressure-increasing valves that are normally-closed electromagnetic control valves (for example, at least one of the pressure-increasing valves for the front wheels) is changed to a normally-open valve. With such a measure, it may be made that at least one of the electrical motors M1 and M2 is driven with an input of the STP signal, occurring when a CPU, etc., in a brake ECU is in a fail state, being a trigger, so that the fluid pressure whose pressure is increased is supplied to the wheel cylinders through the pressure-increasing valve in an open state.

Figure 32:
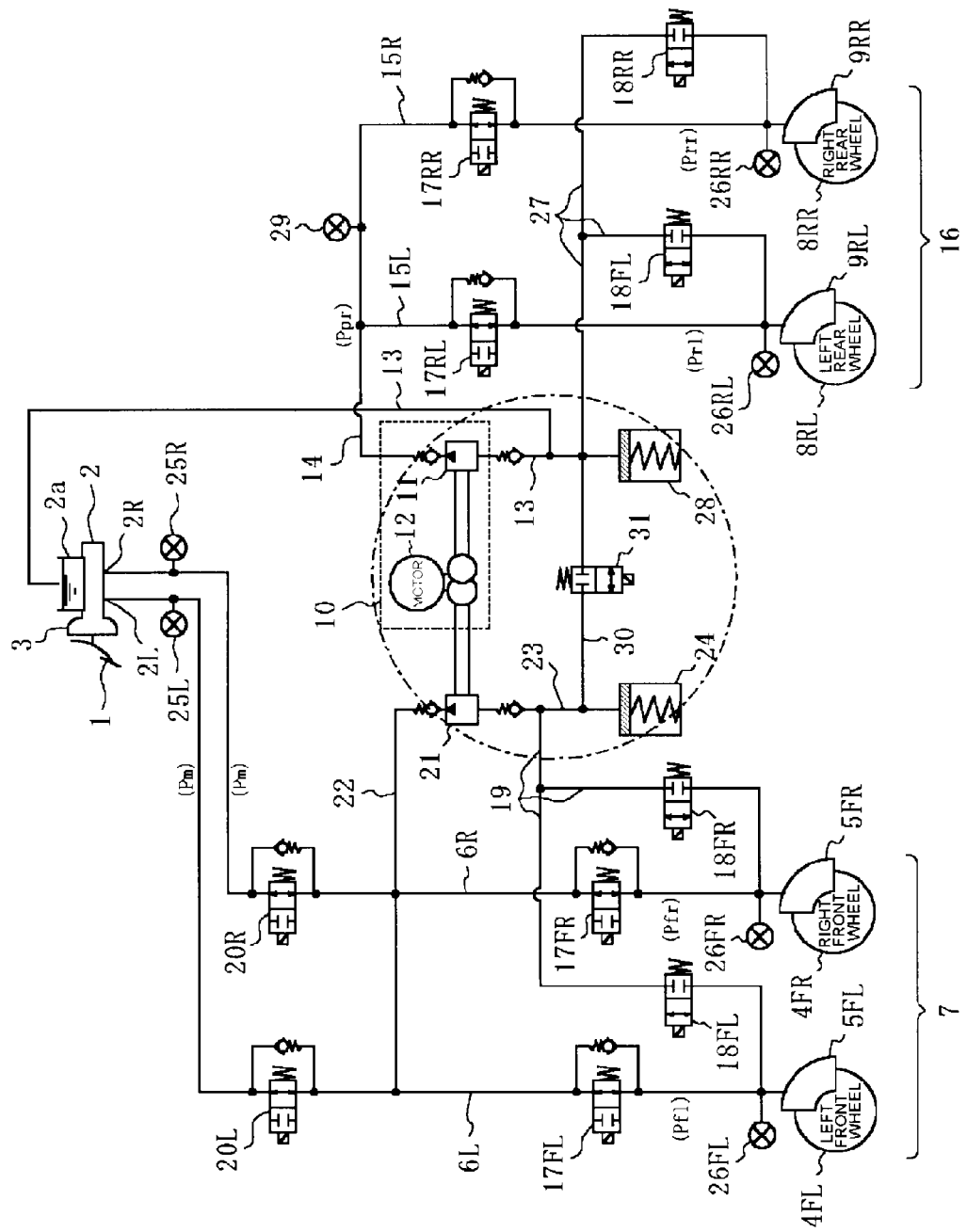
FIG. 32 is a view illustrating the applicability of each embodiment to a publicly-known technique.

FIG. 32 illustrates the braking apparatus described in Japanese Patent Application Publication No. 2005-199744. Built-in reservoirs 24 and 28 are provided in the braking apparatus, and the operating fluid is pumped up and the pressure thereof is increased by the drive of fluid pressure pumps 11 and 21 to be supplied to the wheel cylinders. The fluid pressure pumps 11 and 21 are driven by a single common motor 12. In the present variation, the aforementioned embodiments 3 to 5 are applied to such a fluid pressure circuit. In the case, the built-in reservoirs 24 and 28 can be replaced by any one of the reservoirs illustrated in FIGS. 11(A) to 11(C).

The invention claimed is:

1. A braking apparatus that generates braking force by driving a motor, comprising:
   a reservoir to retain operating fluid;
   a wheel cylinder provided in each of a plurality of wheels;
   a brake pedal operated by a driver;
   an operating state detector configured to detect an operating state of the brake pedal;
   a master cylinder including both a fluid pressure chamber into/from which the operating fluid can be introduced or discharged, and a piston configured to slide in the direction where the pressure of the operating fluid in the fluid pressure chamber is increased/reduced in accordance with a stepping-on operation of the brake pedal;
   a fluid pressure circuit that is provided between the master cylinder and the wheel cylinder provided in each of the plurality of wheels, and that includes both a first system flow channel connecting the reservoir and at least one of the plurality of wheel cylinders and a second system flow channel connecting at least one of the plurality of wheel cylinders and the master cylinder, and the fluid pressure circuit supplies the operating fluid to each of the wheel cylinders;
   a pump provided in the first system flow channel and driven by the motor to increase the fluid pressure of the operating fluid to be supplied from the reservoir to one of the wheel cylinders; and
   a control unit configured to control a driving state of the pump in order to drive, when a predetermined fail condition for braking control has been satisfied, the motor in accordance with information detected by the operating state detector, and configured to execute fail-safe control for providing braking force by supplying the operating fluid discharged from the pump to the fluid pressure chamber in the master cylinder.

2. The braking apparatus according to claim 1 comprising an opening/closing valve provided in a connection flow channel connecting the pump and the master cylinder, wherein
   the control unit cuts off the supply of the operating fluid from the pump to the fluid pressure chamber in the master cylinder by closing the opening/closing valve during a normal control operation, and permits the supply of the operating fluid discharged from the pump to the fluid pressure chamber in the master cylinder by opening the opening/closing valve when the fail condition has been satisfied.

3. The braking apparatus according to claim 1, wherein the master cylinder includes:
a housing in which a first fluid pressure chamber and a second fluid pressure chamber are formed within it as the fluid pressure chamber;
a first piston that is slidably provided in the housing and that receives operating force of the brake pedal at one end thereof; and
a second piston that is slidably provided in the housing and that forms the first fluid pressure chamber between one end thereof and the first piston and forms the second fluid pressure chamber between the other end thereof and the housing, and wherein
when the drive of the motor is initiated by the fail condition being satisfied, the operating fluid discharged from the pump is supplied to one of the first fluid pressure chamber and the second fluid pressure chamber, or to both of them.

4. The braking apparatus according to claim 3, wherein the operating fluid discharged from the pump is supplied to one of the first fluid pressure chamber and the second fluid pressure chamber, and thereby the operating fluid whose pressure has been increased in the other fluid pressure chamber is supplied to the wheel cylinder.

5. The braking apparatus according to claim 3, wherein when the volume of the operating fluid in the fluid pressure chamber is greater than or equal to a predetermined volume due to the introduction of the operating fluid discharged from the pump, the master cylinder is configured such that the piston slides in the direction where the stepping-on amount of the brake pedal is reduced, and thereby the fluid pressure chamber is capable of communicating with the reservoir.

6. The braking apparatus according to claim 1 comprising, as the operating state detector:
an operation amount sensor configured to detect an operation amount of the brake pedal; and
an operation detection switch that is turned on when an operation amount of the brake pedal exceeds a preset reference value such that a signal indicating that the brake pedal has been operated is outputted, wherein
the control unit controls braking force based on the information detected by the operation amount sensor during a normal control operation, and drives the motor in accordance with the state of the operation detection switch to provide braking force when the fail condition has been satisfied.

7. The braking apparatus according to claim 1 comprising:
an opening/closing valve provided in a connection flow channel connecting the pump and the master cylinder; and
a plurality of differential pressure regulating valves that are respectively provided between the plurality of wheel cylinders and the pump, and that are respectively opened/closed to adjust the flow rate of the operating fluid to be supplied to the wheel cylinders through the first system flow channel, wherein
the connection flow channel is provided so as to connect the pump and the master cylinder on the upstream side of the differential pressure regulating valves.

8. The braking apparatus according to claim 7 comprising an accumulator that is connected between the pump and the differential pressure regulating valve in the first system flow channel to accumulate pressure by introducing the operating fluid discharged from the pump, wherein
the connection flow channel is provided so as to connect a position between the pump and the accumulator in the first system flow channel, and the master cylinder, and wherein
a check valve configured to prevent the reverse flow of the operating fluid from the accumulator to the connection flow channel is provided between the connection point in the connection flow channel and the accumulator in the first system flow channel.

9. The braking apparatus according to claim 1 comprising a plurality of opening/closing valves that are respectively provided between the plurality of the wheel cylinders and the pump, and that are respectively opened/closed to adjust the flow rate of the operating fluid to be supplied to the wheel cylinders through the first system flow channel, and each of the opening/closing valves is opened when the differential pressure between the fluid pressure on the upstream side and that on the downstream side is greater than or equal to a predetermined valve-opening pressure that has been set for the each of the opening/closing valves.

10. The braking apparatus according to claim 9, wherein among the plurality of opening/closing valves, a specific opening/closing valve, a flow channel on the downstream side of which is connected with the second system flow channel, is only set so as to have valve-opening pressure lower than those of other opening/closing valves.

11. The braking apparatus according to claim 1 comprising:
an opening/closing valve provided in a connection flow channel connecting the pump and the master cylinder;
a plurality of differential pressure regulating valves that are respectively provided between the plurality of wheel cylinders and the pump, and that are respectively opened/closed to adjust the flow rate of the operating fluid to be supplied to the wheel cylinders through the first system flow channel; and
an accumulator that is connected between the pump and the differential pressure regulating valve in the first system flow channel to accumulate pressure by introducing the operating fluid discharged from the pump, wherein
in the state in which the motor has been driven by the fail condition being satisfied, the fluid pressure in the accumulator is supplied to the master cylinder through the opening/closing valve.

12. The braking apparatus according to claim 11, wherein the control unit controls the motor such that the discharge flow rate per unit time of the pump during a preset period of time after the drive of the motor has been initiated by the fail condition being satisfied, is larger than that after the preset period of time has elapsed.

13. The braking apparatus according to claim 12, wherein the control unit executes duty control as the power supply control for the motor, in which, after the continuous drive of the motor for a preset period of time, the motor is intermittently driven, and the duty ratio for a predetermined period of time after the intermittent drive has been initiated is set to be higher than that after the predetermined period of time has elapsed.

14. The braking apparatus according to claim 6, wherein the control unit executes duty control as the power supply control for the motor such that the duty-ratio is changed in accordance with the state of the operation detection switch.

15. The braking apparatus according to claim 1, wherein
the control unit controls the motor in a way in which, when the drive of the motor has been initiated by the fail condition being satisfied, the discharge amount of the pump is made smaller than in a normal control operation.

16. The braking apparatus according to claim 1, wherein
the master cylinder includes:
a housing in which a first fluid pressure chamber and a second fluid pressure chamber are formed within it as the fluid pressure chamber; a first piston that is slidably provided in the housing and that receives the operating force of the brake pedal at one end thereof;
a second piston that is slidably provided in the housing and that forms the first fluid pressure chamber between one end thereof and the first piston and forms the second fluid pressure chamber between the other end thereof and the housing; and
a regulating member configured to regulate the displace amount of the second piston toward the first piston, and wherein
when the drive of the motor is initiated by the fail condition being satisfied, it is made that the operating fluid discharged from the pump is supplied to the first fluid pressure chamber.

17. The braking apparatus according to claim 1, wherein
the master cylinder includes:
a housing in which a first fluid pressure chamber and a second fluid pressure chamber are formed within it as the fluid pressure chamber;
a first piston that is slidably provided in the housing and that receives the operating force of the brake pedal at one end thereof; and
a second piston that is slidably provided in the housing and that forms the first fluid pressure chamber between one end thereof and the first piston and forms the second fluid pressure chamber between the other end thereof and the housing, and wherein
the braking apparatus includes, as the second system flow channel, a first flow channel to be connected with the first fluid pressure chamber and a second flow channel to be connected with the second fluid pressure chamber, and wherein
the braking apparatus includes, as the pump, a first pump provided in the first flow channel and a second pump provided in the second flow channel, and wherein
the braking apparatus includes, as the motor, a first motor configured to drive the first pump and a second motor configured to drive the second pump, and wherein
when the fail condition is satisfied, the control unit drives one of the first motor and the second motor in accordance with the state of the operation detection switch, and subsequently stops the selected motor and drives the other motor.

18. The braking apparatus according to claim 1, wherein
the master cylinder includes:
a housing in which a first fluid pressure chamber and a second fluid pressure chamber are formed within it as the fluid pressure chamber;
a first piston that is slidably provided in the housing and that receives the operating force of the brake pedal at one end thereof;
a second piston that is slidably provided in the housing and that forms the first fluid pressure chamber between one end thereof and the first piston and forms the second fluid pressure chamber between the other end thereof and the housing; and
a regulating structure configured to regulate the spacing between the first piston and the second piston, and wherein
when the drive of the motor is initiated by the fail condition being satisfied, it is made that the operating fluid discharged from the pump is supplied to the second fluid pressure chamber.

19. The braking apparatus according to claim 6, wherein
the motor increases braking force by the positive rotation thereof, and reduces it by the reverse rotation thereof, and wherein
in the case where the fail condition has been satisfied, the control unit increases braking force by making the motor rotate positively when the operation detection switch is turned on, and reduces it by making the motor reversely rotate when the operation detection switch is turned off.

20. The braking apparatus according to claim 1, wherein
in the case where the drive of the motor has been initiated by the fail condition being satisfied, the control unit stops the drive of the motor when the number of rotations of the motor reaches the preset maximum value.

21. The braking apparatus according to claim 1, wherein
the reservoir is provide in the fluid pressure circuit as an internal reservoir, and wherein
the reservoir includes:
a reservoir housing in which a reservoir chamber into/from which the operating fluid can be introduced/discharged is formed;
a piston that is slidably provided in the reservoir housing and that changes the volume of the reservoir chamber by being displaced in accordance with the drive state of the pump; and
a biasing member configured to bias the piston toward the side where the reservoir chamber is expanded.

22. The braking apparatus according to claim 6, wherein
the control unit is configured to be capable of communicating with a specific control unit that controls another control target, different from the braking apparatus, in order to output, only when the operation detection switch is turned on, a specific signal indicating that the specific control unit is allowed to execute specific control; and when the drive of the motor has been initiated by the fail condition being satisfied, the control unit outputs the specific signal to the specific control unit even if the operation detection switch is turned off.

23. The braking apparatus according to claim 6, wherein
the control unit includes:
a drive circuit configured to drive the motor; and
a calculation circuit configured to calculate target braking force based on the information detected by the operation amount sensor and to output a control command to the drive circuit based on the target braking force, during a normal control operation, and it is configured such that an output signal of the operation detection switch is inputted into the drive circuit, and wherein
the drive circuit executes the fail-safe control when the fail condition has been satisfied by a signal indicating that the brake pedal has been operated being inputted from the operation detection switch, while the input from the calculation circuit is being interrupted.

* * * * *